United States Patent
Sugama et al.

(10) Patent No.: US 7,068,871 B2
(45) Date of Patent: Jun. 27, 2006

(54) OPTICAL WIRING SUBSTRATE, METHOD OF MANUFACTURING OPTICAL WIRING SUBSTRATE AND MULTILAYER OPTICAL WIRING

(75) Inventors: Akio Sugama, Kawasaki (JP); Masayuki Kato, Kawasaki (JP); Masatoshi Ishii, Kawasaki (JP); Shinya Sasaki, San Jose, CA (US); Tsuyoshi Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/949,906

(22) Filed: Sep. 24, 2004

(65) Prior Publication Data

US 2005/0041906 A1 Feb. 24, 2005

Related U.S. Application Data

(62) Division of application No. 10/086,945, filed on Feb. 28, 2002, now Pat. No. 6,810,160.

(30) Foreign Application Priority Data

Feb. 28, 2001 (JP) .............................. 2001-056009

(51) Int. Cl.
*G02B 6/12* (2006.01)
(52) U.S. Cl. .......................... 385/14; 385/50
(58) Field of Classification Search .................. 385/14, 385/16–24, 50, 129–132, 39
See application file for complete search history.

(56) References Cited

U.S. PATENT DOCUMENTS

| | | | |
|---|---|---|---|
| 5,381,506 A * | 1/1995 | Amick et al. ............... 385/129 |
| 5,841,917 A * | 11/1998 | Jungerman et al. ........... 385/17 |
| 6,058,228 A * | 5/2000 | Fasanella et al. ............. 385/17 |
| 6,236,786 B1 * | 5/2001 | Aoki et al. .................... 385/50 |
| 6,457,875 B1 | 10/2002 | Kropp et al. |
| 6,501,869 B1 * | 12/2002 | Athale .......................... 385/18 |
| 6,529,653 B1 * | 3/2003 | Miller ........................ 385/16 |
| 6,671,446 B1 * | 12/2003 | Nishida ..................... 385/129 |
| 6,823,099 B1 * | 11/2004 | Kim et al. .................... 385/18 |
| 6,842,573 B1 * | 1/2005 | Birnbach ..................... 385/50 |
| 2003/0053741 A1 * | 3/2003 | Hoke et al. .................. 385/17 |

FOREIGN PATENT DOCUMENTS

| JP | 40264409 | 9/1992 |
|---|---|---|
| JP | 06250031 | 9/1994 |
| WO | WO 99/15927 | 4/1999 |

OTHER PUBLICATIONS

A.D. Norte, et al., "Multiple-Layer Optical Interconnections Using Through-Wafer Hollow-Dielectric-Waveguide Vias," IEEE Photonics Technology Letters, vol. 6, No. 7, Jul. 1994, 4 pages.

* cited by examiner

*Primary Examiner*—Sarah Song
(74) *Attorney, Agent, or Firm*—Sheppard Mullin Richter & Hampton LLP

(57) ABSTRACT

An optical wiring substrate provides a slab optical waveguide having a refractive index different from a refractive index of other surrounding portions and a planar convex lens being provided continuously to a tip portion of an optical path of an optical wave guide including a core and cladding and formed on a substrate. The optical path of light passing through the planar convex lens is converted approximately by 90° with a mirror. The light reflected with the mirror is made as parallel light rays by use of a cylindrical lens.

6 Claims, 53 Drawing Sheets

1 Bisphenol A Diglycidyl

FIG. 42B

OPTICAL WIRING SUBSTRATE, METHOD OF MANUFACTURING OPTICAL WIRING SUBSTRATE AND MULTILAYER OPTICAL WIRING

CROSS-REFERENCE TO RELATED APPLICATIONS

This application is based upon and claims priority of Japanese Patent Application No. 2001-56009, filed in Feb. 28, 2001, and U.S. patent application Ser. No. 10/086,945, filed Feb. 28, 2002, now U.S. Pat. No. 6,810,160 the contents being incorporated herein by reference.

BACKGROUND OF THE INVENTION

1. Field of the Invention

The present invention relates to an optical wiring substrate utilized in information and communication systems that require high-speed and high-volume signal transmission, a method of manufacturing the optical wiring substrate and multilayer optical wiring.

2. Description of the Prior Art

In information and communication systems, optical signals suitable for high-speed and high-volume signal transmission are utilized. As for optical transmission between optical devices, optical fibers are utilized when the number of wires as optical wiring is small; meanwhile, when the number of wires is increased into several hundreds or thousands, an optical wiring substrate is utilized in which optical waveguides are provided on a substrate. Usually, a plurality of optical wiring substrates, are laid, in which a plurality of optical waveguides are optically connected with each other for performing transmission of optical signals.

In this case, since light has high rectilinearity, alignment precision becomes an issue when optical fibers or optical waveguides on the substrate are coupled with each other. For example, a predetermined tolerance for misalignment between single mode optical fibers is about 5 µm.

As for multimode optical fibers, a tolerance for misalignment between the optical fibers, each having a core diameter of several tens of micrometers, used for optical waveguides is within several tens percent of the core diameter.

There is also a case of coupling optical wiring substrates having optical waveguides formed thereon by use of a connector as another member. However, such a case may incur misalignment of 100 µm or greater. Optical signals are not propagated when such misalignment greater than the applied core diameter occurs.

Moreover, in the case when light emitted from an optical waveguide of one optical wiring substrate is made incident on an optical waveguide of the other optical wiring substrate, it is desirable that the light is rendered parallel in optical path. There is a conventional constitution in which an end face of a core 1 is formed into a hemispherical shape as shown in FIG. 1, which is intended for rendering parallel light rays passing through the end face. Nevertheless, completely parallel light rays could not be obtained since the light reflected intricately within the optical waveguide.

Furthermore, coupling of hundreds or thousands of optical waveguides on optical wiring substrates may be contemplated by use of optical fiber connectors each fabricated with precision as a connector. However, the number of optical fibers allowable for such a connector is limited to a range from one to about twelve. Accordingly, an enormous number of optical fiber connectors are required for such use, which is unrealistic.

Since high-speed data transmission is enabled with optical signals, optical communications play a major role in long-distance transmission such as a backbone communication system. In particular, a technology of transmitting different kinds of information simultaneously with different wavelengths in one optical fiber is developed, which is called wavelength division multiplexing (WDM). High-volume information is thereby transmitted in a high speed.

At a relay station of a backbone communication system, the information sent by WDM is separated into light rays, each having a single wavelength. Then destinations of the individual light rays are switched, and the light rays are again coupled in one optical fiber.

In this case, a destination of the light ray of any wavelength needs to be switched arbitrarily. That is, a cross-connect function of changing inputs of N channels into outputs of N channels is required.

As the multiplexing of the WDM develops, it is estimated that 100 or more waves will be sent in one optical fiber. For this reason, the cross-connect function is required for a capability of processing 1,000 channels or more.

However, an optical switch capable of processing several thousands of channels does not yet exist. Accordingly, practically used are small switches arranged in a multistage combination, as shown in FIG. 2.

FIG. 2 illustrates a state that optical transmission between input optical fibers 410 and output optical fibers 460 is performed by channel processing of 64 channels of inputs and outputs with two sets of cross-connect wiring 430 using a three-staged configuration of a first switch 420, a second switch 440 and a third switch 450, wherein each switch has 8×8 channels.

Each of the switches in respective stages includes a plurality of optical switches 470, each of which takes charge of a specific number of input optical fibers 410. In this case, the cross-connect optical wiring 430 must have an optical wiring structure in which wires between the switches of the respective stages are connected while intersecting one another.

Heretofore, Japanese Patent Laid-Open Hei 6(1994)-331910 discloses a switching device for coated optical fibers that performs connection switching in arbitrary combinations.

However, a problem has been pointed out that the switching device requires a huge space for accommodating optical fibers in a case of 1,000 channels or more.

Accordingly, materialization of an optical wiring substrate that has a cross-connect structure capable of processing transmission of high-speed and high-volume data signals with 1,000 channels or more is anticipated.

Meanwhile, Japanese Patent Laid-Open Hei 11(1999)-178018 discloses an optical connecting device of a structure in which a former stage substrate mounted with switches and a latter stage substrate are orthogonalized.

The optical connecting device simplifies wiring of the optical fibers therein. However, modes of mounting substrates are limited.

Moreover, in an optical cross-connect system in Japanese Patent Laid-Open Hei 10(1998)-243424, a technology is disclosed for constituting a cross-connect structure in which a two-dimensional fiber array composed by laminating N fibers each of which has M cores and another two-dimensional fiber array having M fibers X N cores are orthogonally jointed.

Although a compact cross-connect structure is realized, the optical cross-connect system bore a manufacturing problem of an increase of coupling loss unless the lamination was exercisable in a cross-core pitch of optical fibers.

Moreover, there is also a method of using a fiber sheet technology, in which optical fiber strands are laid into arbitrary wiring and fixed in a sheet form with resin or the like. In this case, compact arrangement is feasible because the optical fibers do not have protection coating.

However, as previously shown in FIG. 2, the optical fibers are accumulated at the central portion of the intersection structure. Whereas a minimum bend radius is defined for the optical fiber, control of the bend radius in a vertical direction generated by lamination of the optical fibers becomes difficult. For this reason, there has been a problem that characteristics of the optical transmission may not be ensured by this method.

Recently, in the field of communications, the optical transmission is becoming a main stream not only for a long-distance signal transmission but also for a short-distance signal transmission. In conventional technologies of electrical signal transmission, clock frequencies and data transmission speeds are increased owing to progress in CPUs. Therefore, signal transmission speeds are improved day by day.

However, cross-connect devices that take charge of switching signals in the electrical signal transmission technologies are hardly applicable to signal switching for the optical communications without modification. Accordingly, optical via holes are particularly composed between layers of multilayer wiring, thus forming interlayer transfer portion of the optical signals. This interlayer transfer portion has a requirement that orientation of an optical signal therein does not change when an optical path is changed from one layer to another layer via the substrate.

Moreover, the optical via holes that take charge of switching the optical signals in the multilayer wiring of the optical communications had a risk of causing cracks by stress applied to the inside due to occurrence of air voids by reason of temperature changes during manufacturing processes thereof In addition, in the event that the light enters into the optical via hole from the optical waveguide, the light tends to spread in a progression direction due to wave nature of the light, and thus effective progression of the light in the optical path is impeded.

Moreover, conventional optical waveguides, which are constituted on an optical wiring substrate for transmitting signals and data in a device for information and communication systems that requires high-speed and high-volume signal transmission, are produced by a process of depositing a cladding material on a substrate such as a silicon wafer, followed by patterning core members.

In this case, there have been disadvantages such as cambers and cracks of the substrate caused by stress due to thermal hysteresis during the manufacturing steps of the optical waveguides.

Conventional technologies as countermeasures against such cambers and cracks have been insufficient for multi-layer optical wiring substrates. For example, Japanese Patent Laid-Open Hei 8(1996)-29632 is effective in a case of just one layer, however, removed portions of a cladding layer are buried in a multi-layered case. Such burying may be avoided by interpolating a film between layers in the event of multi-layering. However, a problem has been pointed out that stress would occur during a thermal process due to air thermal expansion of air layers remaining at slit portions.

Moreover, Japanese Patent Laid-Open Hei 5(1993)-281424 is effective in a case of a ridge waveguide with just one layer. However, as for burying or multi-layering, a disadvantage of occurring cracks due to thermal expansion has been cited.

On the other hand, Japanese Patent Laid-Open Hei 6(1994)-214128 requires deposition of stress layers on both sides of an optical waveguide layer thereof in the case of multi-layering in order to retain balance of the stress. Actually, this is not practical because of requiring multi-layering on both upper and lower faces of a substrate.

Moreover, as a conventional technology for forming a lens on a substrate, known is a manufacturing method of a micro lens as an optical element used for an optical pick-up device for reproducing information out of an optical memory. In Japanese Patent Laid-Open Sho 60(1985)-155552, a planar micro lens is obtained by forming hemispheric hole portions by etching from two faces, filling a substance different from a substrate, and polishing the surface thereof. In Japanese Patent Laid-Open Hei 11(1999)-177123, a constitution of disposing lenses on both faces of a substrate is disclosed.

However, alignment has been difficult in the event of forming the lenses on the both faces of the substrate.

For example, as shown in FIG. 3A, in conventional manufacturing steps of a micro lens used for an optical disk device or the like, in the event of forming concave portions 62 on both upper and lower faces of a substrate 61, and of forming lenses by filling the concave portions 62 with transparent substance 63 as shown in FIG. 3B, a disadvantage of a position shift 64 due to failure in accurate alignment of the upper and lower concave portions 62. Particularly such position shift becomes great when such manufacturing method is used for a large substrate, therefore it is hardly applicable.

In addition, since the substrate needs to be made of an optical material, it has been disadvantageous to form the micro lenses with a large substrate in terms of strength and costs.

Furthermore, regarding optical signal transmission in a device for information and communication systems that requires high-speed and high-volume signal transmission, optical connection of waveguides of optical wiring substrates requires alignment with high precision at connecting positions thereof, and is also emphasized in terms of enhancing a beam-condensing function thereof.

It is cited that collimating lenses and condenser lenses are required in order to optically connect the optical waveguides with each other. Conventionally known is a structure shown in FIG. 4, in which a spherical lens 87 is placed at a tip portion, of which light from a core 86 on cladding 85 is emitted out.

However, the spherical lens 87 has been required to align with the core 86 at high-precision. Accordingly, in the case where numerous optical waveguides are provided on the wiring substrates, each spherical lens needs to be provided corresponding to each of the optical waveguides. Moreover, in the alignment thereof, the center of the core 86 is aligned with the center of the spherical lens 87 with high precision of micrometric accuracy. For this reason, the structure resulted in disadvantages of high manufacturing costs as well as complex manufacturing steps.

Moreover, along with improvements in operational frequencies of the CPUs in devices for information and communication systems that require high-speed and high-volume signal transmission, improvements in clock frequencies and data transfer speeds are brought about.

Recently, high band technologies such as low voltage differential signaling (LVDS) and waveform shaping technology have been developed in order to improve transmission speeds. Although performance of electric transmission have been improved, transmission in a region at 10 Gbps or higher remains difficult because of occurrence of waveform distortion in the electric signals and the like.

In addition, in the long-distance transmission primarily composed of optical communications, an electric transmissive portion of a cross-connect device that performs path switching cannot fully bear optical communication speeds.

Consequently, technological developments took place in order to effectuate optical communications also in short-distance transmission, and a connecting mode between an optical transceiver module and an optical fiber has been materialized.

Moreover, an optical wiring substrate used for optical connections in short-distance and high-speed signal transmission is also known. For example, in a case of constituting multilayer optical wiring by laminating an optical waveguide layer in which a plurality of optical waveguides are arranged parallel to the x-axis direction and an optical waveguide layer in which a plurality of optical waveguides are arranged parallel to the y-axis direction, positions of optical connections between the layers are defined as shown in FIG. 5.

In an optical wiring substrate composed of an optical waveguide layer, in which a plurality of optical waveguides 91 are arranged on an optical substrate 90 parallel to the x-axis direction, laminated with a plurality of optical waveguides 92 arranged parallel to the y-axis direction so that they are orthogonal to the plurality of optical waveguides 91, interlayer optical propagation is performed by forming optical via holes at arbitrary intersecting positions 93 illustrated with shades in FIG. 5, selected from respective intersecting points of the plurality of the waveguides along the x-axis and those along the y-axis.

The optical waveguide layer shown in FIG. 8, composed by laminating the plurality of optical waveguides 91 arranged parallel to the x-axis direction and the plurality of optical waveguides 92 arranged parallel to the y-axis direction in order to intersect with one another, can be obtained by laminating an optical waveguide layer shown in FIG. 6 that includes the plurality of optical waveguides 91 arranged parallel to the x-axis direction with an optical waveguide layer shown in FIG. 7 that includes the plurality of optical waveguides 92 arranged parallel to the y-axis direction.

Register marks 94 are illustrated on each of the optical waveguide layers, and the multilayer optical wiring shown in FIG. 8 is obtained by lamination of optical waveguide layers based on the register marks 94.

In the multilayer optical wiring, an intersection structure of optical waveguides and a technique for interlayer connection of optical waveguides should be taken into consideration in order to effectuate wiring arrangements as in a conventional printed substrate.

In the case of laminating the optical waveguide layers, it is difficult to form the optical via holes, which are interlayer optical transfer portions, onto a substrate having a size of several tens of centimeters or greater for each side, with high accuracy of positioning of several micrometers or less by means of alignment using a conventional photolithographic technology.

Regarding the example of the conventional art shown in FIG. 5, in the case where two optical waveguide layers are laminated, the intersecting positions of the optical waveguides between the layers where the optical via holes are to be formed are indiscernible, because the waveguide layers are transparent. For this reason, lamination is performed based on the register marks 94, and intersecting positions of the patterned optical waveguides are determined as positions for the optical via holes, and laser processing is executed.

However, even if the optical waveguides layers are laminated based on the register marks, the positions for processing the optical via holes may be shifted because of position shifting of the waveguide pattern attributed to a mask for forming the waveguides or position shifting attributed to thermal hysteresis during the process of laminating the waveguides. Such disadvantages become a case of a large size substrate.

SUMMARY OF THE INVENTION

An object of the present invention is to provide an optical wiring substrate in which light emitted from an optical waveguide thereof is made as parallel light rays in an optical path, and multilayer optical wiring having an optical connection structure capable of jointing a pair of the optical waveguides without requiring accurate setting of the precision of jointing positions of the pair of the optical waveguides.

In order to achieve the foregoing object, an optical wiring substrate of the invention comprises a substrate, an optical waveguide being formed on the substrate and composed of a core and cladding, a slab optical waveguide and a planar convex lens continuously formed at tip portions of optical paths of the waveguides, mirrors for reflecting the light which transmitted through the convex lenses toward a direction intersecting a face of the substrate, and a lens in which the light reflected with the mirror is made as parallel light rays.

With the above-described constitution, in the optical wiring substrate of the invention, the light emitted from the core of the optical waveguide overpasses the slab optical waveguide and the planar convex lens, whereby a horizontal component of the light is rendered as parallel light rays. The light from the planar convex lens is reflected by the mirror and passes through a lens, whereby the light is rendered as the parallel light rays.

The light transmitted in the optical path is thereby rendered substantially parallel, thus it is accurately condensed into another waveguide jointed therewith via the lens.

Moreover, multilayer optical wiring of the invention comprises a first optical wiring substrate which includes a first substrate, a first optical waveguide being formed on the substrate and composed of a core and cladding, a first slab optical waveguide and a first planar convex lens continuously formed at a tip portion of an optical path of the first optical waveguide, a first mirror for reflecting the light which transmitted through the first planar convex lens toward a direction intersecting a face of the substrate, and a first lens in which the light reflected with the first mirror is made as parallel light rays, and a second optical wiring substrate which includes a second lens disposed opposite to the first lenses for allowing the parallel light rays from the first lenses to be made incident and condensed, a second substrate, a second mirror for reflecting the light which transmitted through the second lenses toward a direction parallel to a face of the second substrate, a second optical waveguide being formed on the second substrate and composed of a core and cladding, and a second planar convex lens and a slab optical waveguide continuously formed at a tip portion of an optical path of the second waveguide for allowing the light reflected with the second mirror to pass therethrough, whereby optical signals are connected between the first optical wiring substrate and the second optical wiring substrate.

With the above-described constitution, in a multilayer wiring substrate of the invention, the parallel light rays obtained from the first optical waveguide via the first slab optical waveguide, the first planar convex lens, the first mirror and the first lens are accurately condensed with the second mirror into the second waveguide. Accordingly, an optical connection between the first and the second waveguides is performed without being bothered by alignment of the waveguides.

In addition, another object of the present invention is to provide an optical wiring substrate having an effective multi-channel cross-connect structure in which input optical wiring and output optical wiring with n channels are laid out on two upper and lower layers without dependence on the number of the channels, and are connected one by one to each other across the different layers at each interlayer transfer position.

In order to achieve the foregoing object, an optical wiring substrate of the invention comprises a substrate, a plurality of optical wiring of an input side having N pieces of input terminals laminated on one face of the substrate, and a plurality of optical wiring of an output side having N pieces of output terminals laminated on the other side of the substrate and orthogonalized with the N pieces of the input terminals on the substrate, wherein the plurality of optical wiring of the input side and the plurality of optical wiring of the output side are connected one by one to each other across the different layers at each interlayer transfer position.

With the above-described constitution, in the optical wiring substrate of the invention, a linear portion of the input optical wiring and a linear portion of the output optical wiring are disposed on separate layers, and interlayer transfer takes place at a flexion of the input optical wiring and the output optical wiring.

N-channel inputs are thereby exchanged into n-channel outputs without dependence on the number of the channels, which is also readily applicable to a case where a large-scale cross-connect function is required.

In addition, another object of the present invention is to provide a method of manufacturing an optical wiring substrate having the steps of manufacturing optical waveguides thereof by forming an under cladding layer, a core and an over cladding layer, respectively on both upper and lower faces of a substrate, which includes a step of forming an incline of approximately 45° as an optical via hole which reaches from the over cladding layer to the substrate.

In order to achieve the foregoing object, the method of manufacturing an optical wiring substrate of the invention comprises the steps of forming an under cladding layer on a substrate, forming a core layer on the under cladding layer, forming an optical waveguide pattern layer on the core layer, forming a core pattern as an optical waveguide by etching with the optical waveguide pattern layer as a mask, forming an over cladding layer after the core pattern is exposed by removing the optical waveguide pattern layer, forming an incline of approximately 45° as an optical via hole which reaches from the over cladding layer to the substrate, and forming a reflective film on the incline of approximately 45°.

With the above-described constitution, according to the method of manufacturing an optical wiring substrate of the present invention, the optical waveguide as optical wiring which has the incline of approximately 45° as the optical via hole can be readily manufactured on the substrate.

In addition, another object of the present invention is to provide an optical wiring substrate having manufacturing processes of optical via holes which take charge of cross-connect functions for switching optical signals in multilayer wiring of optical communications, capable of preventing cracks incurred by stress being applied inward due to air voids generated inside by temperature changes, enhancing focal power of light inside the optical via holes, and enhancing accuracy of a direction of light.

In order to achieve the foregoing object, an optical wiring substrate of the invention comprises a substrate, optical waveguides having different optical wiring layers on upper and lower faces of the substrate, optical via holes which connect the optical wiring layers, and a communicative portion which communicates the inside of the optical via holes with the outside.

With the above-described constitution, in the multilayer optical wiring substrate of the invention, light inducted into the optical via hole is condensed at an optical condenser, whereby the light inside the optical via hole is prevented from spreading due to the wave nature possessed by the light, thus reducing light loss.

In addition, another object of the present invention is to provide an optical wiring substrate, a multilayer optical wiring substrate and a method of manufacturing an optical wiring substrate, which are capable of avoiding occurrence of cambers and crack due to stress.

In order to achieve the foregoing object, an optical wiring substrate of the invention comprises a substrate, optical waveguides being formed on the substrate and composed of an under cladding layer, a core layer and an upper cladding layer, a pair of slits arranged substantially in parallel on both sides of the core layer, and at least one groove provided on the upper cladding layer for connecting the pair of slits.

Moreover, a multilayer optical wiring substrate of the invention comprises a substrate, a first optical wiring layer including optical waveguides being formed on the substrate and composed of an under cladding layer, a core layer and an upper cladding layer, a pair of slits arranged substantially in parallel on both sides of the core layer, and at least one groove provided on the upper cladding layer for connecting the pair of slits, and a second optical wiring layer of the same constitution as the first optical wiring layer, which is laminated on the first optical wiring layer and including at least a pair of slits, each slit communicating with one of the pair of the slits of the first optical wiring layer via the groove.

Moreover, a method of manufacturing an optical wiring substrate of the invention comprises the steps of forming an under cladding layer on a substrate, forming a core layer on the under cladding layer, forming a core pattern as optical waveguides by etching with an optical waveguide pattern layer formed on the core layer as a mask, forming an upper cladding layer after the core pattern is exposed by removing the optical waveguide pattern layer, forming a pair of slits substantially in parallel on both sides of the core layer so that the slits reach a surface of the substrate, and forming at least one groove on the upper cladding layer, which communicates with the pair of slits.

With the above-described constitution, the method of manufacturing an optical wiring substrate of the invention forms the pair of slits, which are substantially in parallel on the both sides of the core layer in the longitudinal direction thereof as to sever a plurality of the optical waveguide layers on the substrate, and the groove which communicates with the pair of slits, with an excimer laser. Accordingly, communication with outside air becomes feasible with the groove, thus relaxing stress incurred by volume changes with thermal expansion of air trapped in the respective slit portions of the layers especially in the case of multi-layering optical waveguides.

An optical wiring substrate of a multilayer constitution obtained by the above-described method of manufacturing an optical wiring substrate does not incur cambers or cracks.

In addition, another object of the present invention is to provide an optical wiring substrate and a method of manufacturing an optical wiring substrate, applicable to a large-size substrate without obstacles, upon propagation of light from one layer on a substrate to another layer thereon by performing accurate alignment of a pair of lenses provided on an optical interlayer transfer portion on the substrate.

In order to achieve the foregoing object, an optical wiring substrate of the invention comprises a substrate, an optical waveguide layer being formed on one face of the substrate, a photo acceptance portion being formed on the other face of the substrate, and an optical interlayer transfer portion provided on the substrate for switching optical paths from the one face to the other face, the interlayer transfer portion being composed of a through hole being formed on the substrate, and a lens being formed on at least one face of the substrate formed by layering two kinds of transparent substances each different in refractive index, which are filled in the through hole.

Moreover, a method of manufacturing an optical wiring substrate of the present invention comprises the steps of providing a through hole on a substrate, filling a first transparent substance having a specific refractive index in the through hole, forming concave faces respectively on both surfaces of the first transparent substance by polishing, and filling a second transparent substance having a refractive index higher than a refractive index of the first transparent substance in each of the both concave faces.

With the above-described constitution, according to the optical wiring substrate and the method of manufacturing the optical wiring substrate of the present invention, accurate alignment of lenses being formed on the both sides of the substrate becomes feasible, whereby a large amount of optical via holes and optical interlayer transfer portions which are optical interfaces, can be easily formed so that they are also readily applicable to a large-size substrate.

In addition, another object of the present invention is to provide an optical wiring substrate having a condenser function with easy aligning capability upon connecting a pair of optical waveguides of optical wiring and effective in the event of propagating light from one optical waveguide to another optical waveguide, which is particularly effective in the event of optically connecting a pair of opposed optical waveguides in a case where a plurality of optical waveguides are arranged.

In order to achieve the foregoing object, an optical wiring substrate of the present invention comprises an optical waveguide composed of a core of which a tip portion is formed into a convex shape and cladding contacting with the core and having a refractive index different from a refractive index of the core, the optical waveguide being supported on a substrate, and a cylindrical lens disposed opposite to the convex tip portion such that the center of the core coincides with the center of curvature of the cylindrical lens.

Moreover, an optical wiring substrate of the present invention has an optical connection structure for signals comprising a first optical waveguide composed of a core and cladding which has a refractive index different from a refractive index of the core and covers around the core, the first optical waveguide being supported on a substrate in a state that a tip portion of the core is exposed to air from the cladding, and a second optical waveguide composed of a core which has a tip portion exposed to air and is disposed in a position opposite to the tip portion of the first optical waveguide, and cladding which has a refractive index different from a refractive index of the core and covers around the core, the second optical waveguide being supported on a substrate for performing propagation of optical signals with the first optical waveguide.

These optical wiring substrates of the present invention have a condenser function with easy aligning capability upon connecting a pair of optical waveguides of optical wiring and effective in the event of propagating light from one optical waveguide to another optical waveguide. The optical wiring substrate can be obtained which is particularly effective in the event of optically connecting a pair of opposed optical waveguides in a case where a plurality of optical waveguides are arranged.

In addition, another object of the present invention is to provide a multilayer optical wiring substrate capable of confirming intersecting positions between layered optical waveguides with high precision, processing optical via holes, and reducing light loss upon connection of interlayer optical waveguides and dispersion of losses among channels.

In order to achieve the foregoing object, an optical wiring substrate of the present invention forms optical transmittance distributive regions axisymmetrically in a width direction of an optical waveguide layer which is composed of cores and cladding which has a refractive index different from a refractive index of the cores and covers around the cores.

Moreover, a multilayer optical wiring substrate of the invention comprises a first optical waveguide layer including a plurality of first optical waveguides parallelly arranged along an x axis, each of the first optical waveguides being composed of a first core and first cladding, and a first optical absorber with low optical transmittance arranged on both sides of the first optical waveguide axisymmetrically with respect to an axial center of the first core, and a second optical waveguide layer to be laminated on the first optical waveguide layer including second optical waveguides in parallel arranged along a y axis and arranged orthogonally with respect to the first optical waveguides of the first optical waveguide layer, each of the second optical waveguides being composed of a second core and second cladding, and a second optical absorber with low optical transmittance arranged on both sides of the second optical waveguide axisymmetrically with respect to an axial center of the second core.

With the above-described constitutions, the optical wiring substrate and the multilayer optical wiring substrate of the invention effectuate image recognition of intersecting positions by rendering optical transmittance in the intersecting positions of the optical waveguides higher than optical transmittance of other portions when viewed perpendicularly with respect to a face of an optical waveguide substrate. As a result, a plurality of intersecting positions between the optical waveguides can be detected individually and directly. And by determining the intersecting points as positions for forming optical via holes, processing of the optical via holes becomes feasible with less position shifts, which is of higher precision than a patterning process.

Moreover, a method of manufacturing an optical wiring substrate of the invention comprises the steps of forming a first cladding layer on a substrate, forming core portions by exposure treatment via a mask after forming a core layer on the cladding layer, forming a second cladding layer for covering the core portions, forming a third cladding layer on the second cladding layer with a substance having high optical absorptance, forming optical transmittance distributive regions axisymmetrically with respect to the cores after planarizing the third cladding layer.

With the above-described constitution, according to the method of manufacturing an optical wiring substrate of the present invention, optical absorbers can be formed between optical waveguides, whereby central positions of the optical waveguides can be recognized by a difference of optical transmittance of the optical absorbers.

BRIEF DESCRIPTION OF THE DRAWINGS

FIG. 3A and FIG. 3B are views showing manufacturing steps of a micro lens used for a conventional optical disk device and the like.

FIG. 42A to FIG. 42D are views showing manufacturing steps of an optical wiring substrate which is another example of the fifth embodiment of the present invention.

DESCRIPTION OF THE PREFERRED EMBODIMENTS

Now, embodiments of the present invention will be described with reference to the accompanying drawings.

Figure 1:
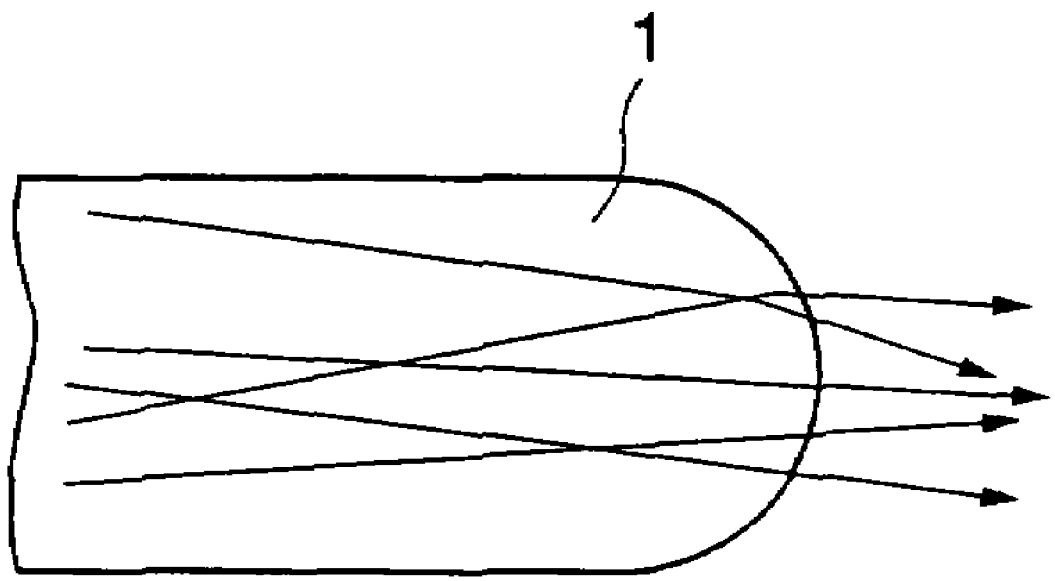
FIG. 1 is a view describing a traveling direction of light in an optical waveguide of a conventional optical wiring board.
Figure 2:
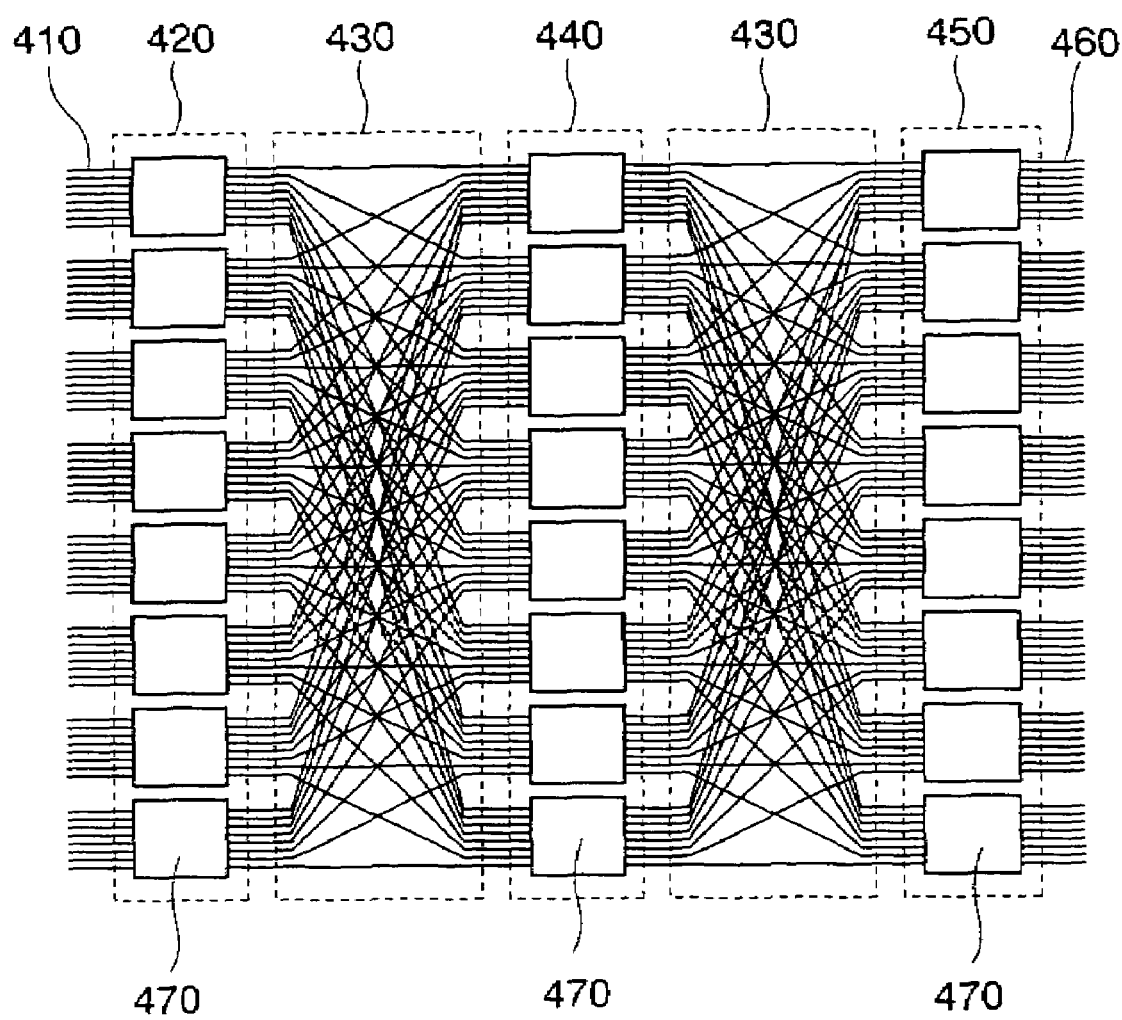
FIG. 2 is a view showing a configuration example of a conventional optical switch having a three-staged configuration, which performs a cross-connect function for multi-channel optical signals.
Figure 3A:
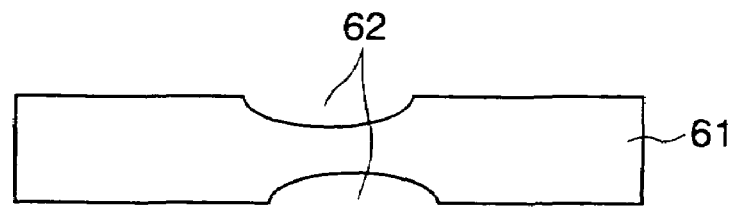
Figure 3B:
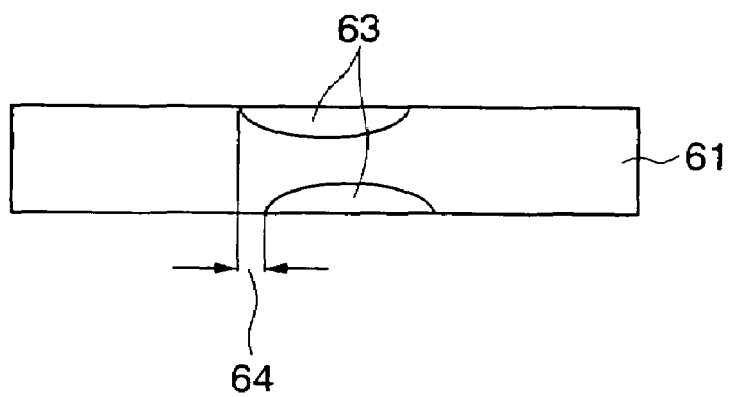
Figure 4:
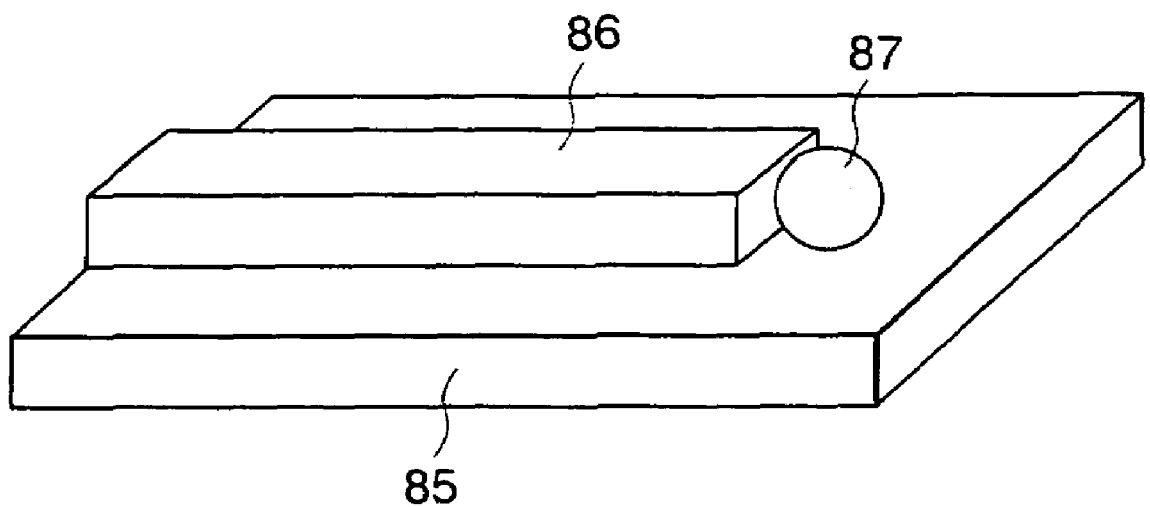
FIG. 4 is a perspective view showing an example of a conventional structure of an optical waveguide.
Figure 5:
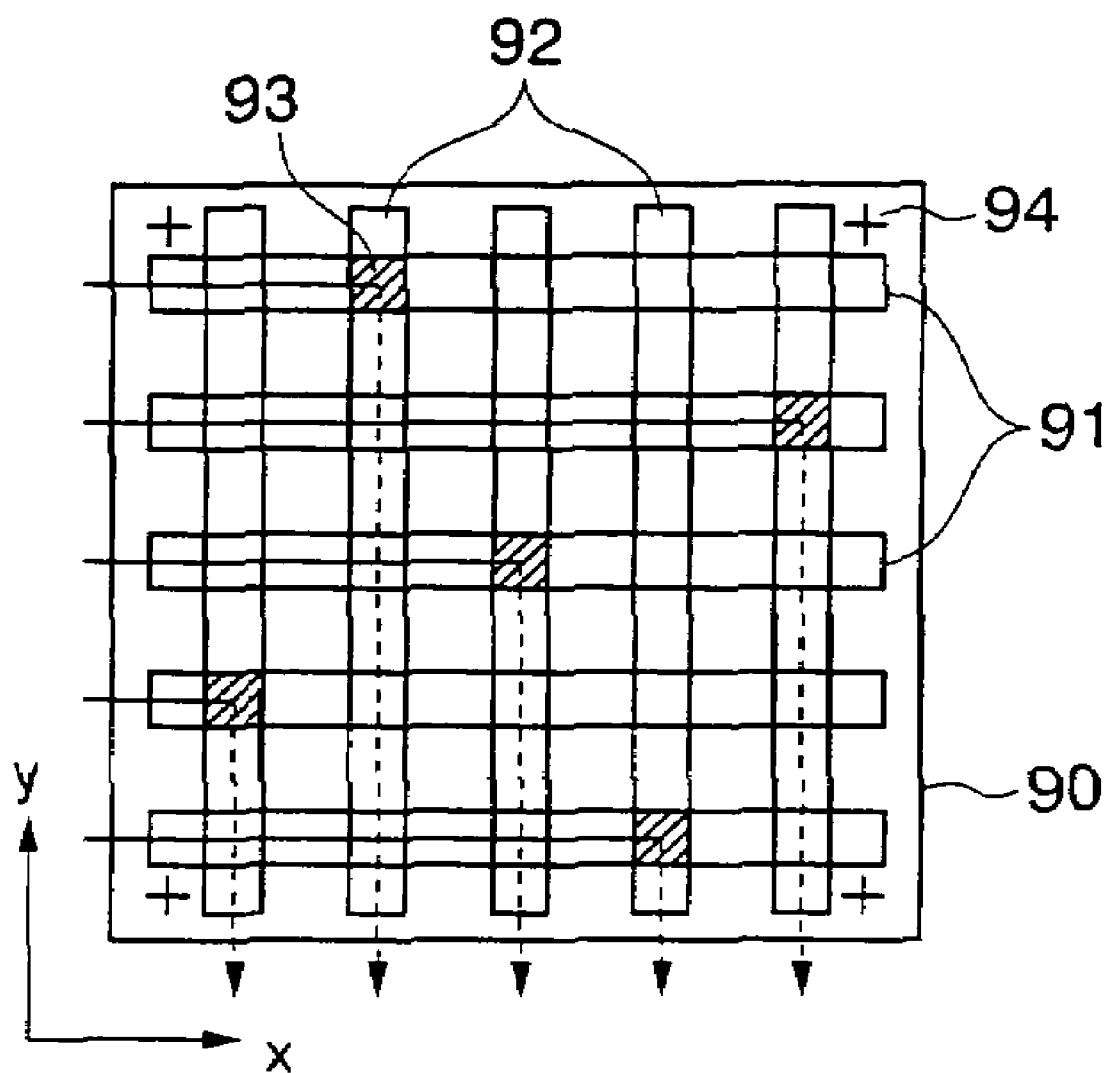
FIG. 5 is a schematic plan view showing optical connecting positions in a state that a plurality of optical waveguides are intersected with each other when optical waveguide layers are laminated in a conventional optical wiring substrate.
Figure 6:
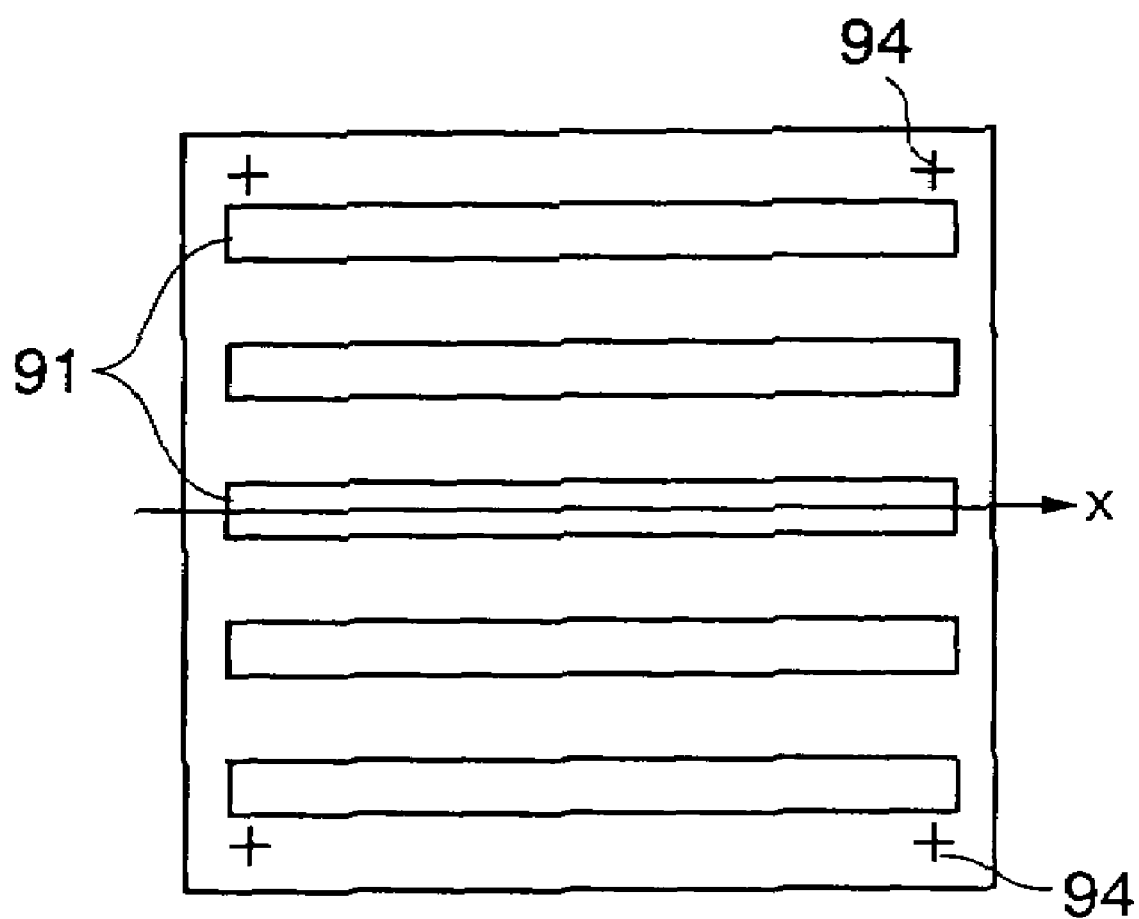
FIG. 6 is a plan view showing an arrangement example of a conventional optical waveguide layer in which a plurality of optical waveguides are arranged parallel to the x-axis direction.
Figure 7:
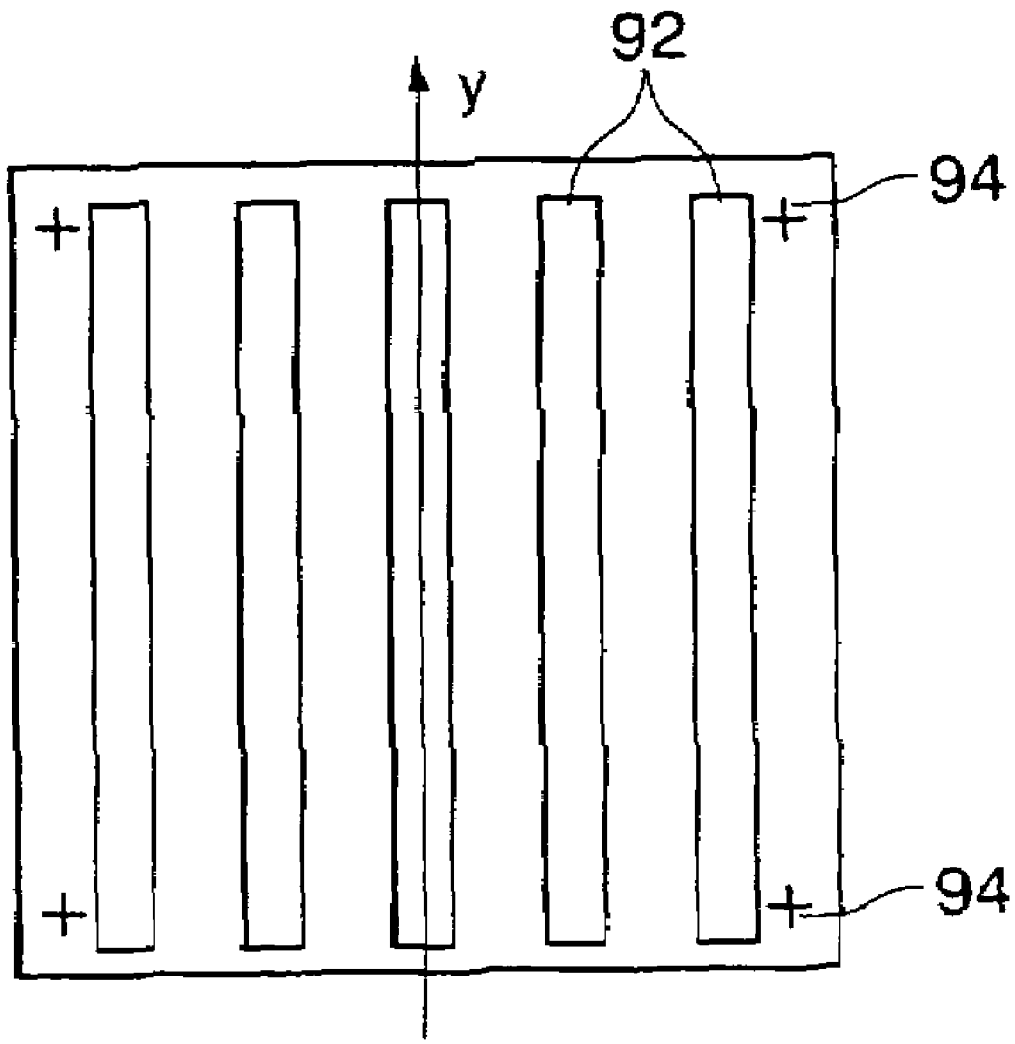
FIG. 7 is a plan view showing an arrangement example of a conventional optical waveguide layer in which a plurality of optical waveguides are arranged parallel to the y-axis direction.
Figure 8:
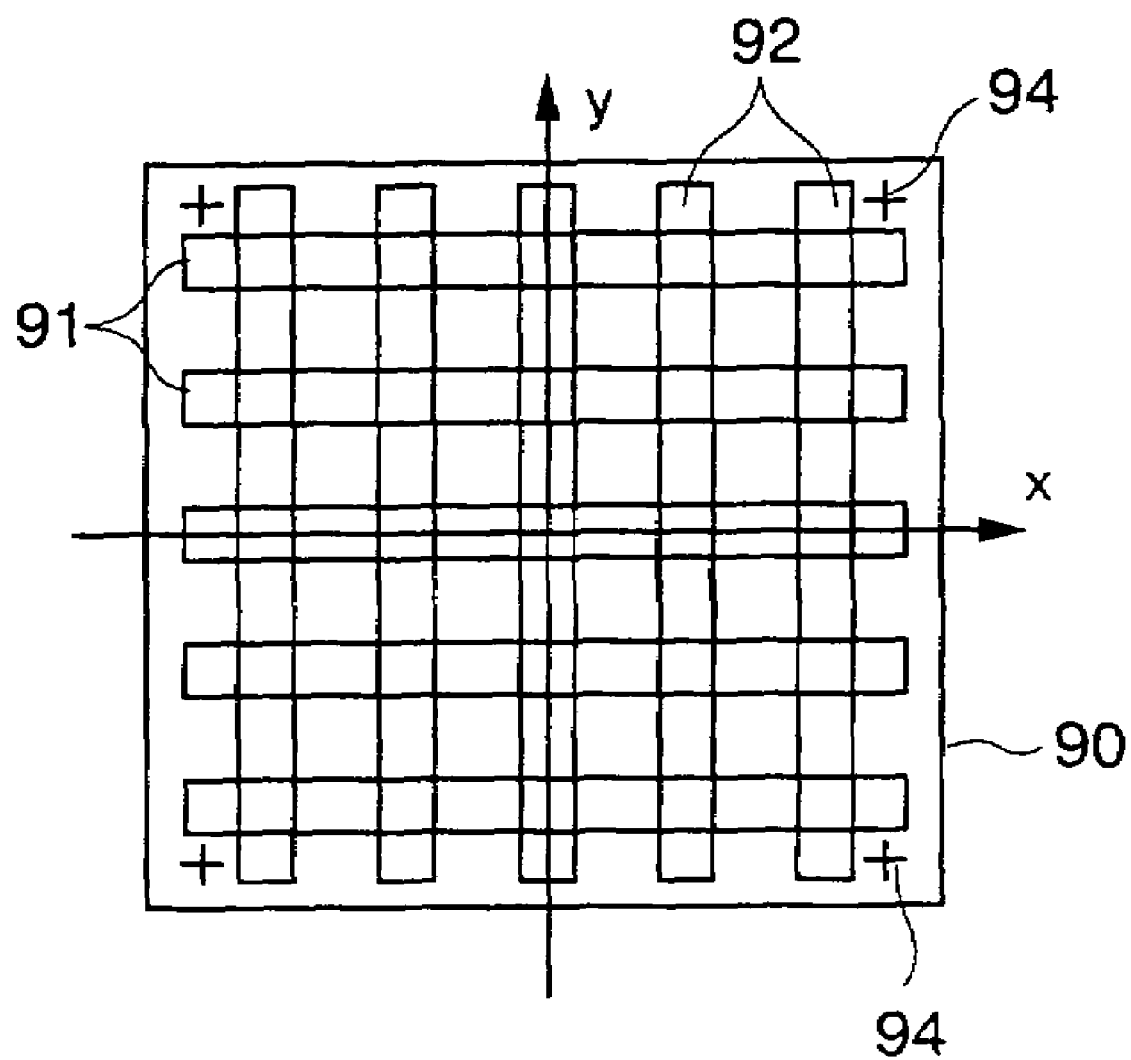
FIG. 8 is a plan view showing a conventional optical waveguide layer in which a plurality of optical waveguides are severally arranged parallel to the x-axis direction and the y-axis direction such that they are intersected one another.
Figure 9:
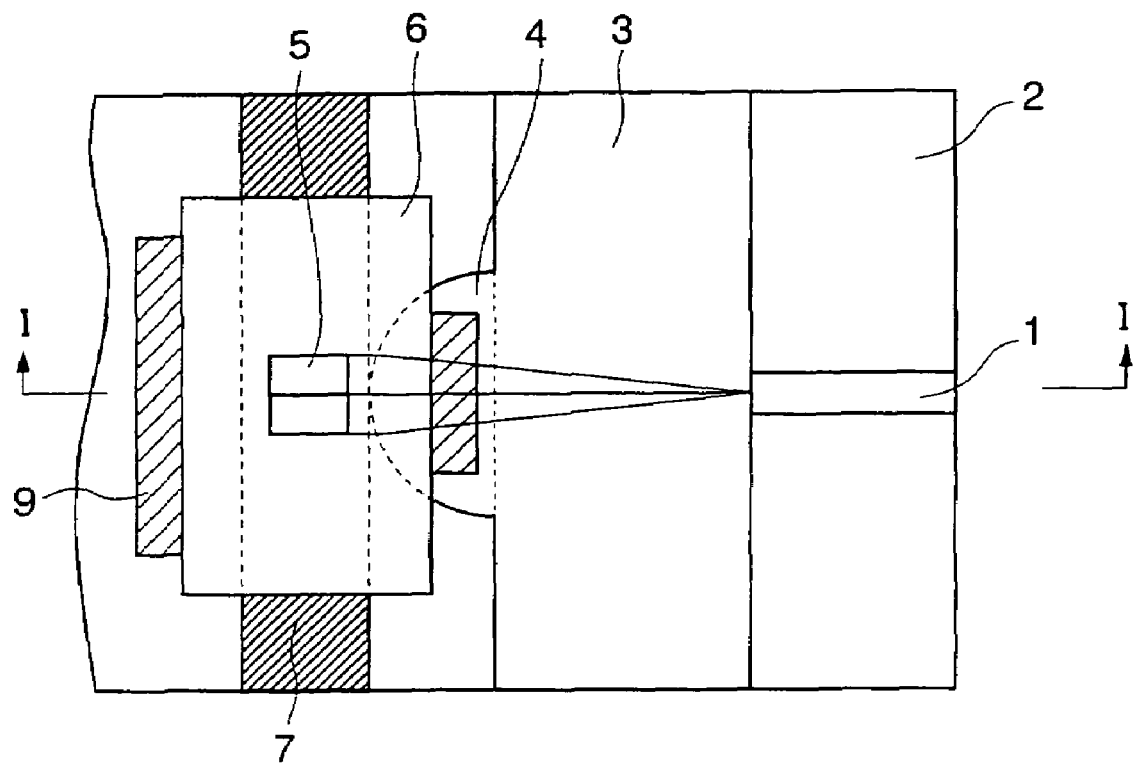
FIG. 9 is a schematic plan view showing a basic constitution of an optical wiring substrate according to a first embodiment of the present invention.
Figure 10:
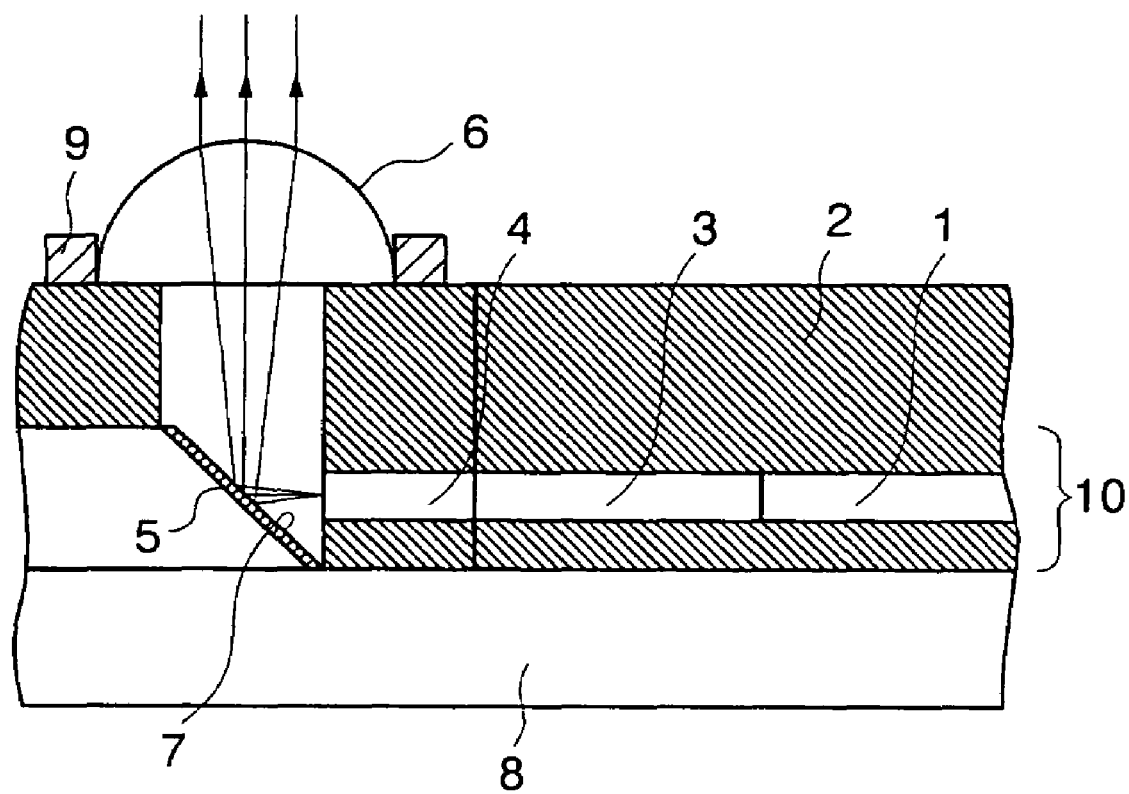
FIG. 10 is a cross-sectional view of FIG. 9 taken along a line I—I.

FIG. 9 is a schematic plan view showing a basic constitution of an optical wiring substrate of the present invention, and FIG. 10 is a cross-sectional view of FIG. 9 taken along a line I—I.

An optical waveguide 10 laid on a substrate 8 includes a core 1 and cladding 2. The core 1, which is a transmitting portion of optical signals, has a refractive index higher than that of the cladding 2.

As a material for the cladding in this case, fluorinated polyimide resin OP1-N3205 (refractive index=1.52, Hitachi Chemical) is used. As a material for the core, fluorinated polyimide resin OP1-N3405 (refractive index=1.53, Hitachi Chemical) is used.

On a tip portion of an optical path of the core 1 of the optical waveguide 10, a slab optical waveguide 3 and a planar convex lens 4 are continuously formed.

A traveling direction of the light emitted from the optical waveguide 10 via the slab optical waveguide 3 and the planar convex lens 4 is converted by approximately 90° with a 45-degree mirror 5 disposed on the optical path. On a surface of the 45-degree mirror 5, a metallic reflective film or a dielectric multilayer film 7 is formed in order to improve reflectivity thereof.

The dielectric multilayer film 7 in this case has a constitution of alternately layering a high-refractive substance and a low-refractive substance, wherein the products of film thicknesses and refractive indices are set at values of $\lambda/4$ or $\lambda/2$ (where $\lambda$ is a wavelength), respectively. ZnS (2.35) or $TiO_2$ (2.35) is used for the high-refractive substance, and meanwhile, $MgF_2$ (1.38) or $SiO_2$ (1.46) is used for the low-refractive substance.

A cylindrical lens 6 for accepting the light reflected with the mirror 5 is disposed in a position above the mirror 5 on a surface of the optical waveguide 10. Positioning for disposing the cylindrical lens 6 may be satisfactorily carried out either by providing a cavity on a surface of the cladding 2 or providing a positioning protrusion 9.

In the optical wiring substrate of the above-described constitution, the light traveling from the core 1 of the optical waveguide diverges in a lateral direction with respect to the traveling direction when passing through the slab waveguide 3, and via the planar convex lens 4, horizontal components of the light is then emitted as parallel light rays. In this case, an angle of divergence can be made small when the refractive index of the slab waveguide 3 is equal to or larger than the refractive index of the core 1, whereby the light of parallel rays with a small beam diameter is obtainable.

The traveling direction of the emitted light is converted by approximately 90° with the 45-degree mirror 5, and the parallel light rays can be obtained via the cylindrical lens 6. Here, a rod lens may substitute for the cylindrical lens 6.

Figure 11:
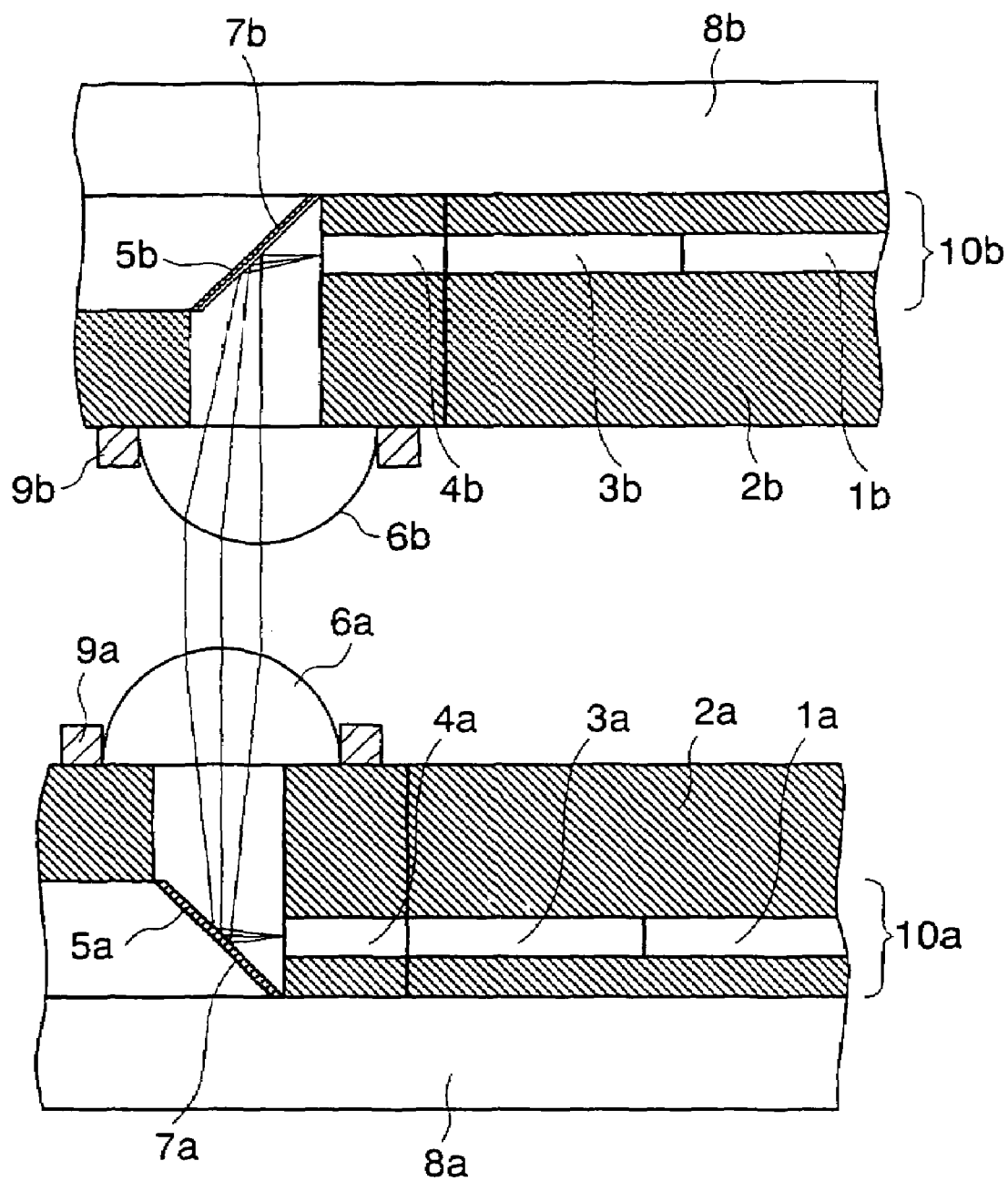
FIG. 11 is a partial cross-sectional view showing one optical connection structure of multilayer optical wiring according to the first embodiment of the present invention.

FIG. 11 is a cross-sectional view illustrating an optical connecting structure of multilayer optical wiring, in which light rays emitted from one optical waveguide are rendered parallel in the course of an optical path and are made incident on another optical waveguide, whereby optical waveguides can be coupled with each other without requiring severe setting of accuracy in coupling positions.

In FIG. 11, the optical wiring substrate including the one optical waveguide and the optical wiring substrate including the other optical waveguide individually have constitutions identical to the basic constitution of the optical wiring substrate as shown in FIG. 10. Accordingly, the same reference numerals with different indices are affixed thereon, and description for the constitutions thereof will be omitted.

In a position opposite to a cylindrical lens 6a constituting the one optical wiring substrate, which is present in an optical path, disposed is a cylindrical lens 6b constituting the other optical wiring substrate, thus forming an optical connecting structure of the multilayer optical wiring capable of coupling the optical waveguides with each other.

The parallel light rays obtained from the one cylindrical lens 6a are made incident on the cylindrical lens 6b constituting the other optical wiring substrate to be condensed and inducted toward the other optical waveguide via a 45-degree mirror 7b that converts the optical path thereof by approximately 90°. Subsequently, optical signals are transmitted via a planar convex lens 4b and a slab waveguide 3b into a core 1b, in series.

Figure 12:
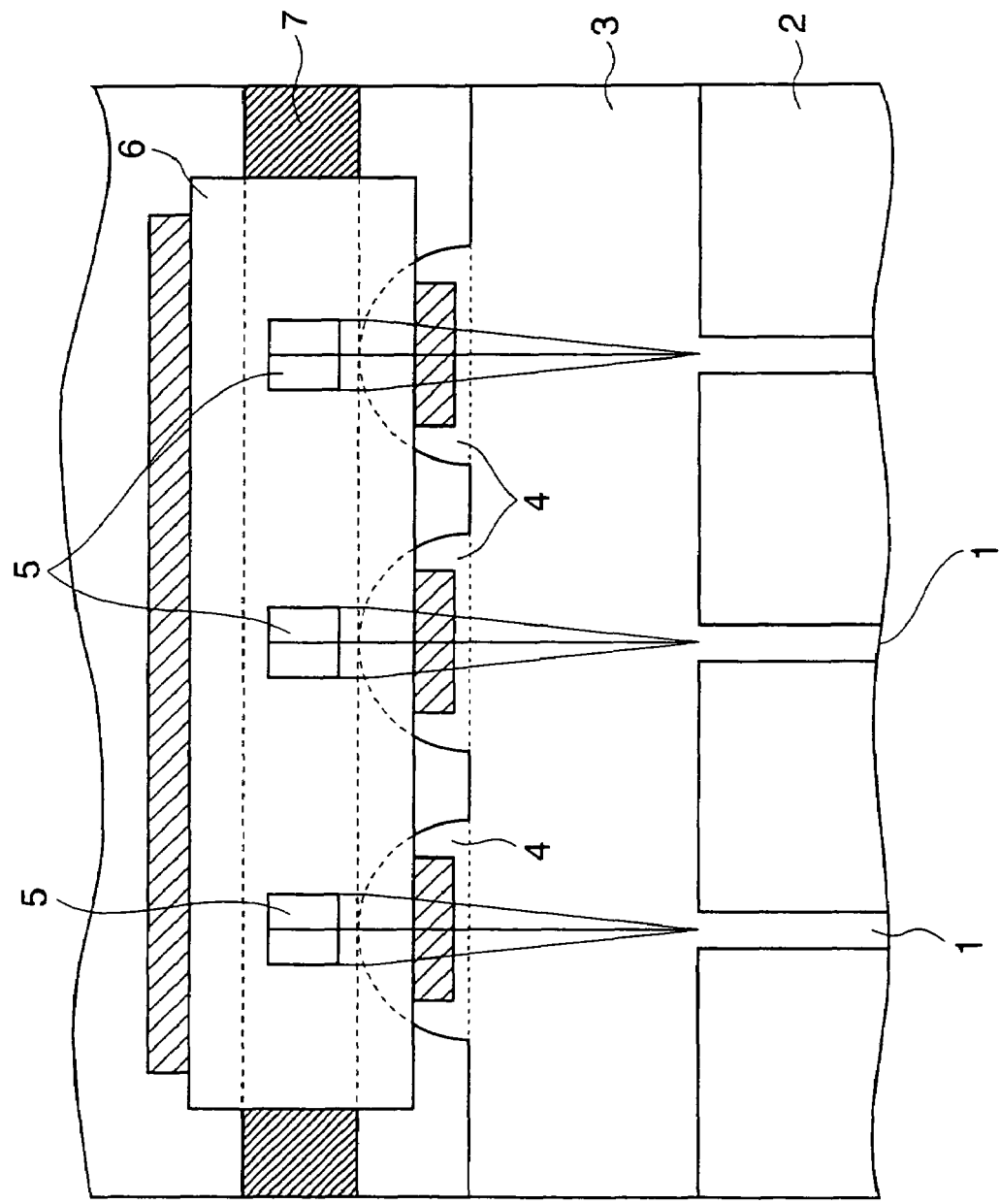
FIG. 12 is a schematic plan view showing one constitution of the optical wiring substrate according to the first embodiment of the present invention.

FIG. 12 is a plan view showing a constitution of an optical wiring substrate as a modified example of the first embodiment.

A plurality of optical waveguides, each of which includes the core 1, the slab optical waveguide 3, the planar convex lens 4 and the 45-degree mirror 5 are arranged in the single piece of cladding 2. Each ray of light from each 45-degree mirror 5 disposed in each optical waveguide is accepted by the one cylindrical lens 6 provided on the cladding in common, whereby each ray is emitted as parallel light ray. It is advantageous in terms of a cost because the one cylindrical lens 6 is adapted to the plurality of waveguides.

Next, a second embodiment of the present invention will be described with reference to FIG. 13 and FIG. 14.

Figure 13:
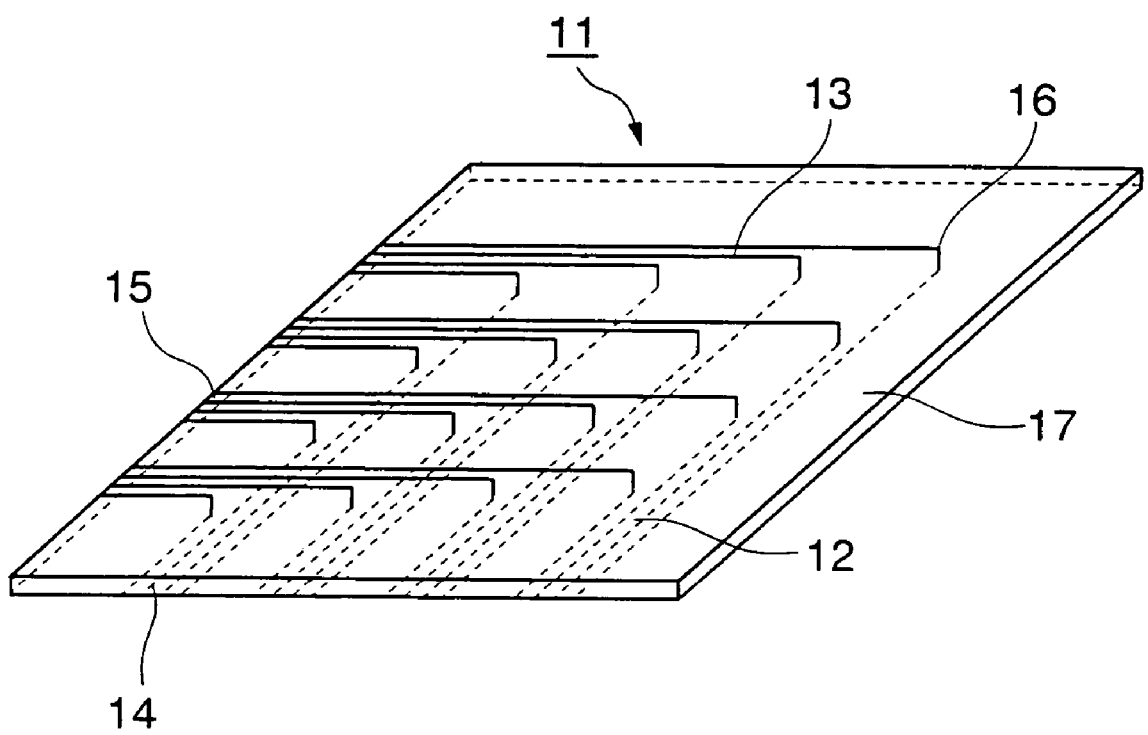
FIG. 13 is a perspective view schematically showing a basic constitution of an optical wiring substrate according to a second embodiment of the present invention.

FIG. 13 is a view schematically showing a basic constitution of an optical wiring substrate of the second embodiment. Optical wiring 12 and 13, each being composed of N channels, are formed on both faces of a substrate 17. The input optical wiring 12 that includes input terminals 14 is laid on a lower layer. Meanwhile, the output optical wiring 13 that includes output terminals 15 is laid on an upper layer.

Wires in the input wiring 12 and the output wiring 13 are linearly formed, and the wires in the input wiring 12 and those in the output wiring 13 are orthogonal to each other on different layers. For this reason, the input terminals and the output terminals are individually provided on sides of the rectangular substrate 17, the sides being not opposite to each other.

In the input wiring 12, each wire is perpendicularly bent at an interlayer optical transfer portion 16, and thus is connected with a wire of the output wiring 13.

Figure 14:
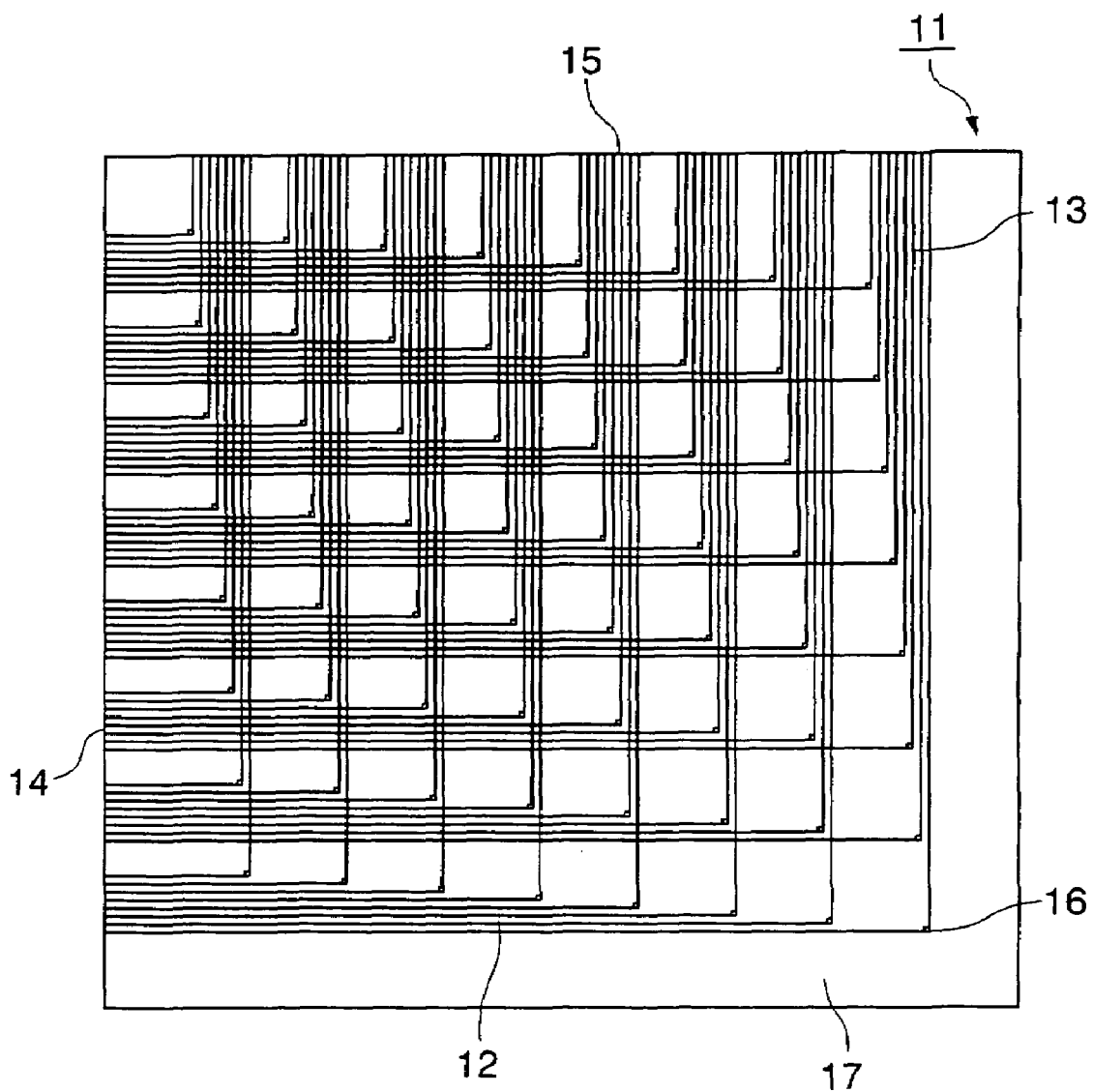
FIG. 14 is a plan view showing layout patterns of multi-channel optical waveguides of the optical wiring board according to the second embodiment of the present invention.

FIG. 14 is a plan view showing layout patterns of multi-channel optical waveguides, in which portions identical to those shown in FIG. 13 are affixed with the same reference numerals and thus description thereon will be omitted.

Next, a constitution of the interlayer optical transfer portion 16 (hereinafter referred to as an "optical via hole") and a method of manufacturing the same will be described with reference to FIG. 15 and FIG. 16A to FIG. 16H.

Figure 15:
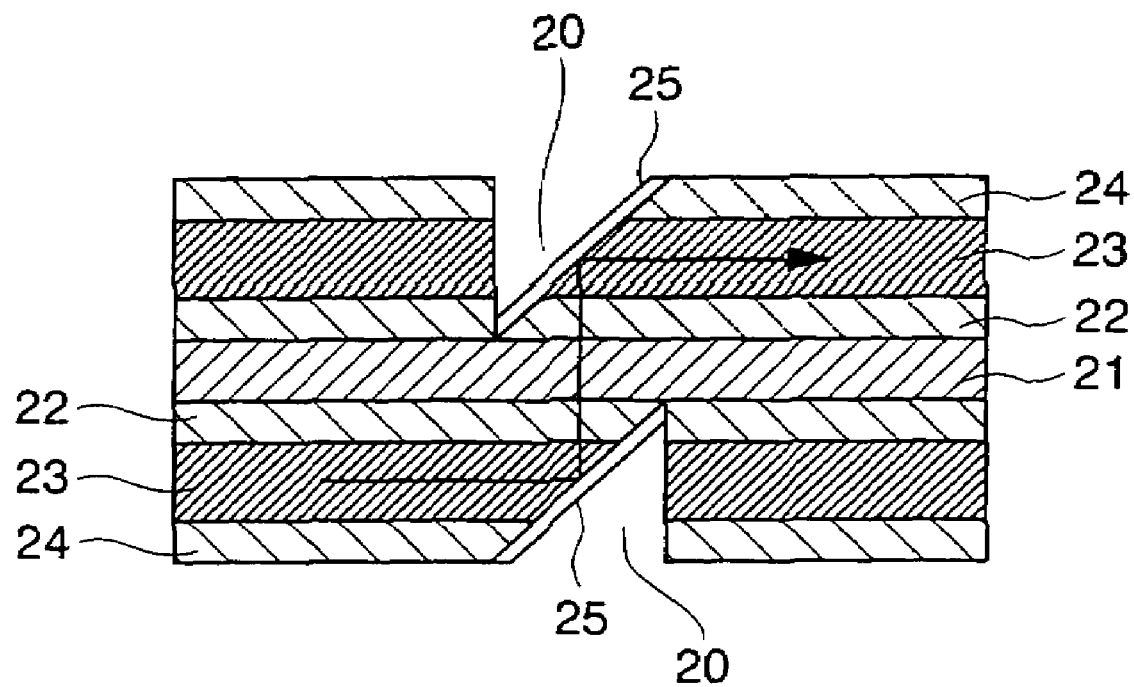
FIG. 15 is a cross-sectional view of the optical waveguides including an optical via hole portion of the optical wiring substrate according to the second embodiment of the present invention.

FIG. 15 shows a cross-sectional view of an optical waveguide including an optical via hole portion. It should be noted that an upper-layer optical waveguide and a lower-layer optical waveguide are illustrated as if they are disposed parallel across a substrate 21 for the sake of explanation. However, in reality, wiring directions of the both optical waveguides are rendered orthogonal to each other when looked down the substrate from the above.

The upper-layer optical waveguide and the lower-layer optical waveguide are respectively disposed on upper and lower faces of the substrate 21, each of the optical waveguides being composed of three layers, which are an under cladding 22, a core 23 and an over cladding 24.

The optical via hole corresponds to faces of grooves 20 of which reflective faces have inclinations of 45°, and reflective films 25 made of metal are formed on the inclined faces.

FIG. 16A to FIG. 16H are views showing manufacturing steps of the optical waveguides.

Figure 16A:
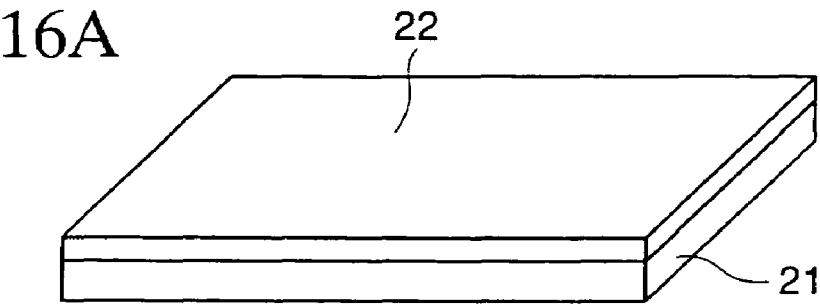
FIG. 16A to FIG. 16H are views showing manufacturing steps of the optical waveguides of the optical wiring substrate according to the second embodiment of the present invention.

FIG. 16A is a view showing a state that the cladding layer 22 is laminated on the substrate 21. As a material for the cladding layer in this case, fluorinated polyimide resin OP1-N3205 (refractive index=1.52, Hitachi Chemical) is used. The fluorinated polyimide resin is coated in a thickness from 5 to 15 μm by spin coating, and then cured by heating under a given condition.

Figure 16B:
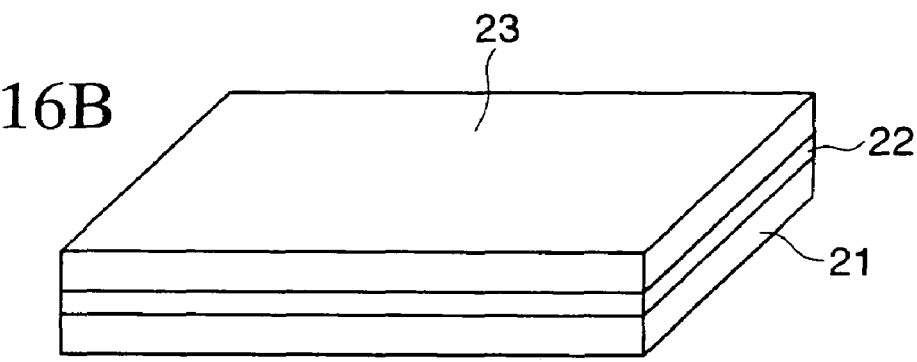

Next, the core layer 23 is laminated on the cladding layer 22 (FIG. 16B). As a material for the core layer, fluorinated polyimide resin Op1-N3405 (refractive index=1.53, Hitachi Chemical) is used. The fluorinated polyimide resin is coated in a thickness from 10 to 20 μm by spin coating, and then cured by heating under a given condition.

Figure 16C:
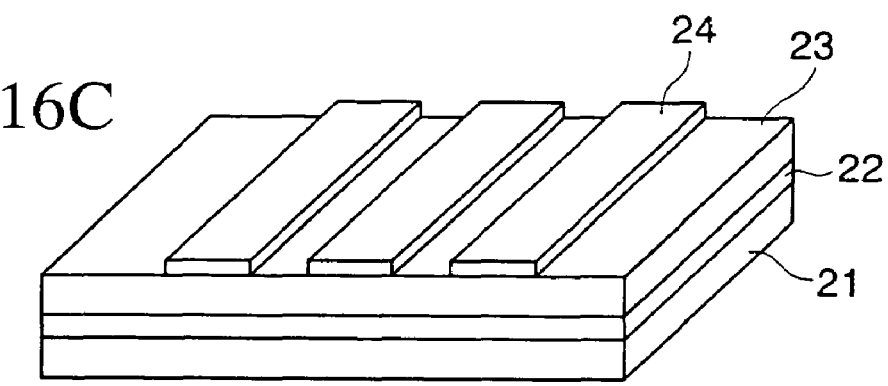

Subsequently, an optical waveguide pattern is formed with an aluminum layer 24 by means of sputtering and etching (FIG. 16C).

Figure 16D:
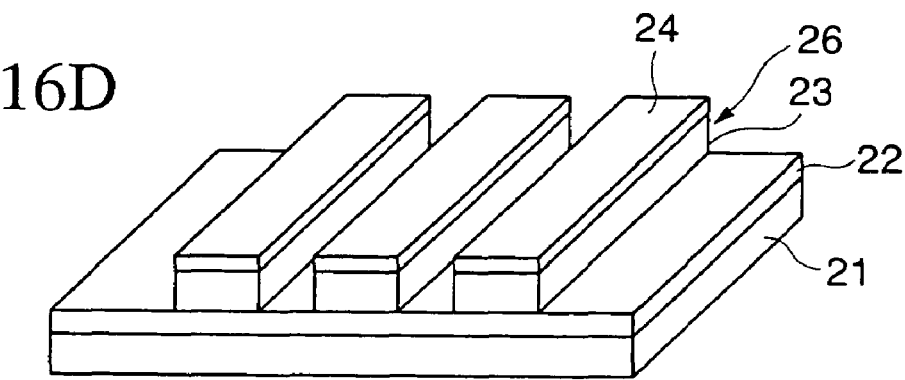
Figure 16E:
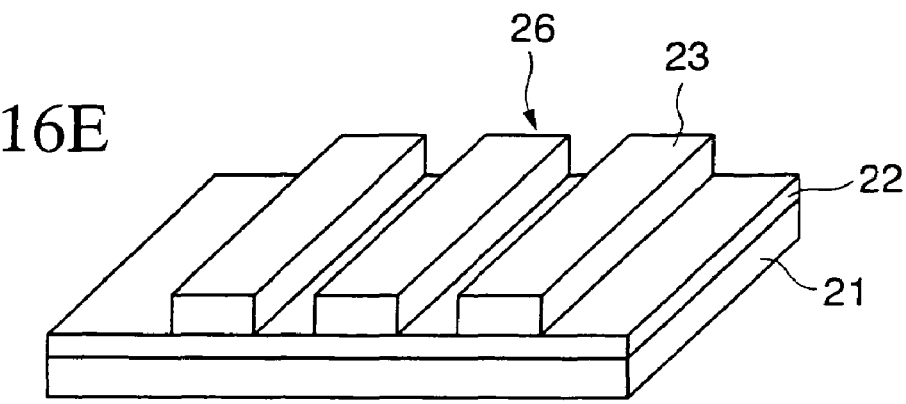

The core layer 22 is subjected to dry etching (RIE) by use of the optical waveguide pattern made of the aluminum layer 24 as a mask, whereby rectangular core patterns 26 for being optical waveguides are formed (FIG. 16D). The aluminum layer 24 formed as the optical waveguide pattern is removed with an acid, whereby the core patterns 26 are exposed (FIG. 16E).

Figure 16F:
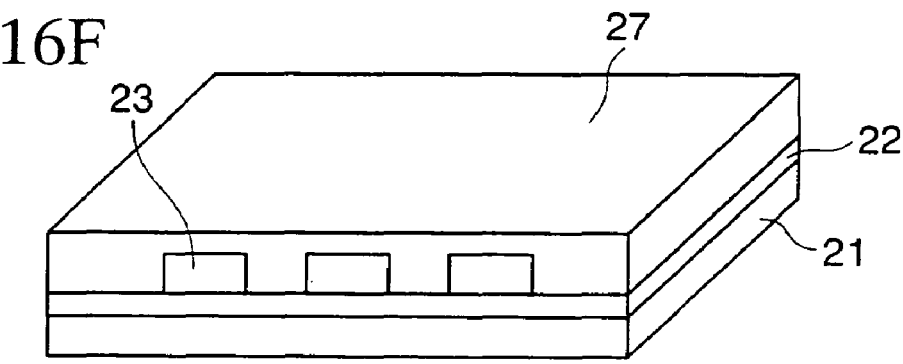

Subsequently, the over cladding layer 27 is laminated so as to cover the cladding layer 22 and the core layer 23 (FIG. 16F). As a material for the cladding layer in this case, fluorinated polyimide resin Op1-N3205 (refractive index=1.52, Hitachi Chemical) is used. The fluorinated polyimide resin is coated and then cured by heating under a given condition.

Figure 16G:
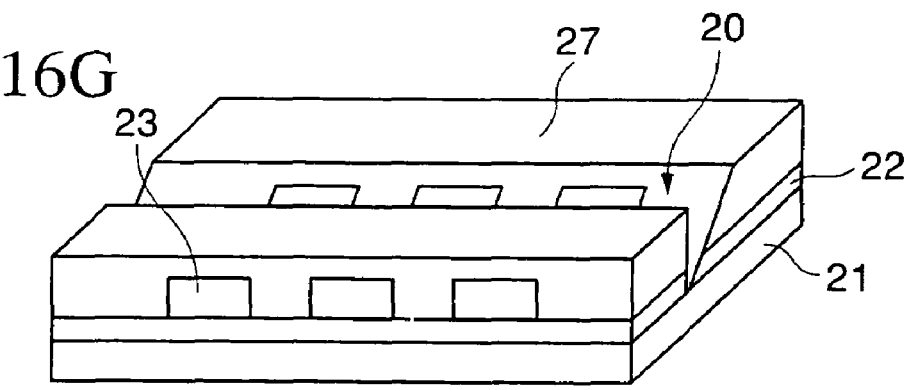

An excimer laser is irradiated onto a portion from an upper face of the over cladding layer 27 to the substrate 21 in order to form a groove 20 having an inclined face of 45°, thus forming optical via holes (FIG. 16G).

Figure 16H:
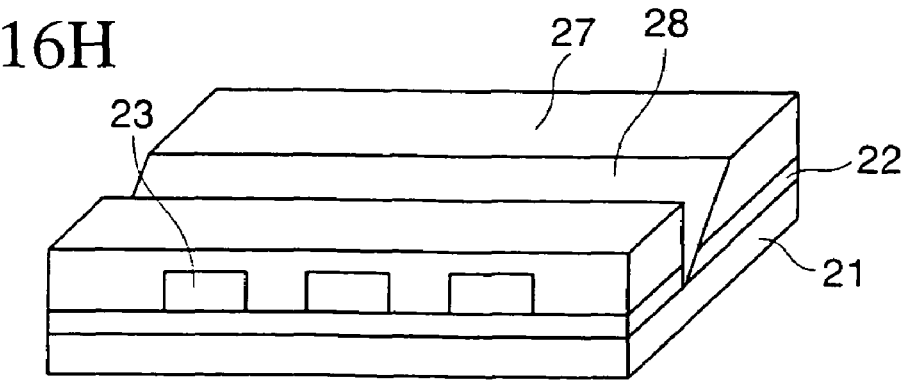

In addition, a thin film of gold is formed on the inclined face of the groove 20 by sputtering, thus forming a reflective layer 28 (FIG. 16H).

Next, a constitution of an assembly of the above-described optical wiring substrate for the purpose of connection with the outside will be described with reference to FIG. 17 and FIG. 18.

Figure 17:
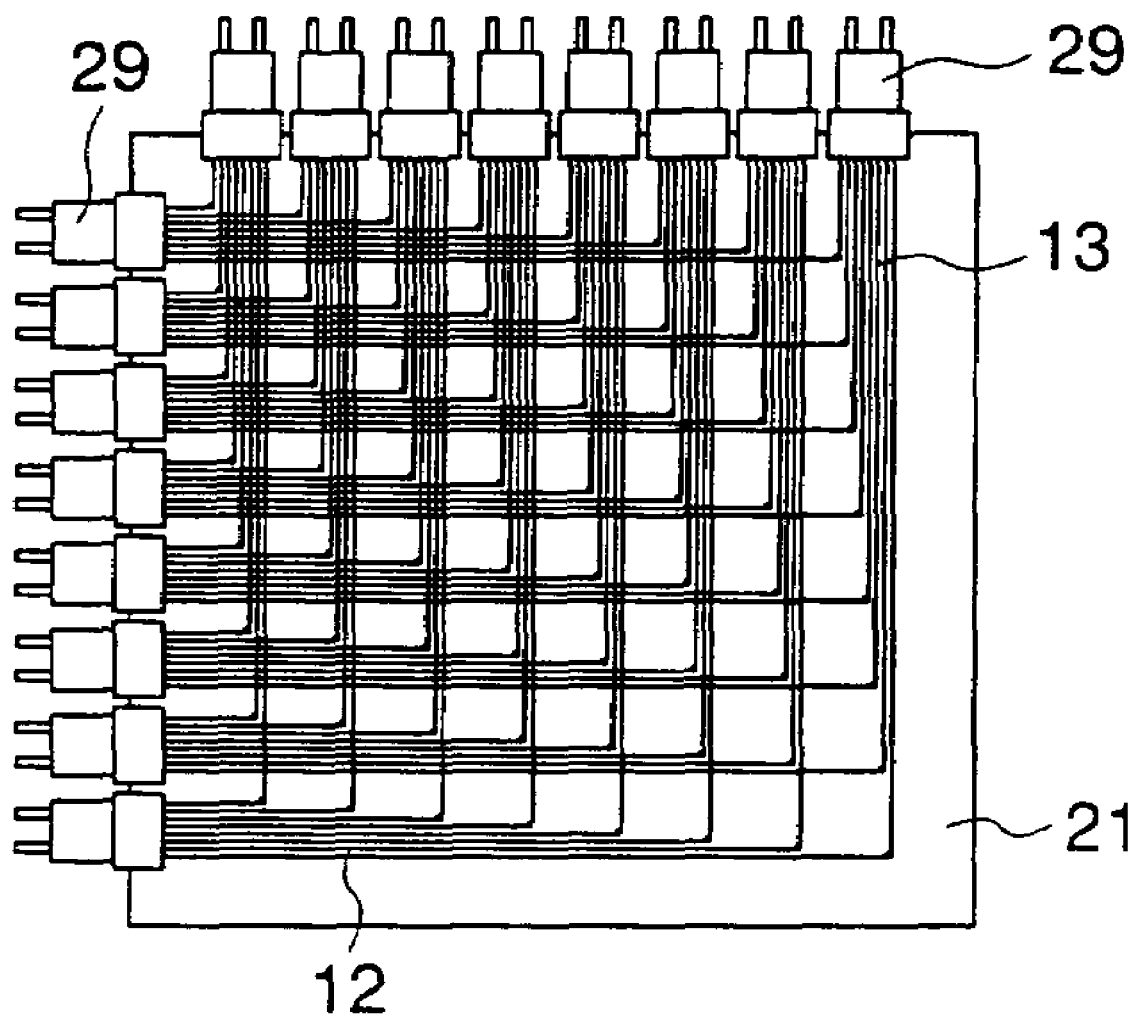
FIG. 17 is a plan view showing an assembly example of the optical wiring substrate according to the second embodiment of the present invention.

FIG. 17 is a plan view showing an assembly example of an optical wiring substrate of the present invention. FIG. 17 shows the example where optical connectors 29 are attached to the input terminals of the input wiring 12 and the output terminals of the output wiring 13 so as to separate the input terminals and the output terminals into groups of each plurality of optical fibers.

Figure 18:
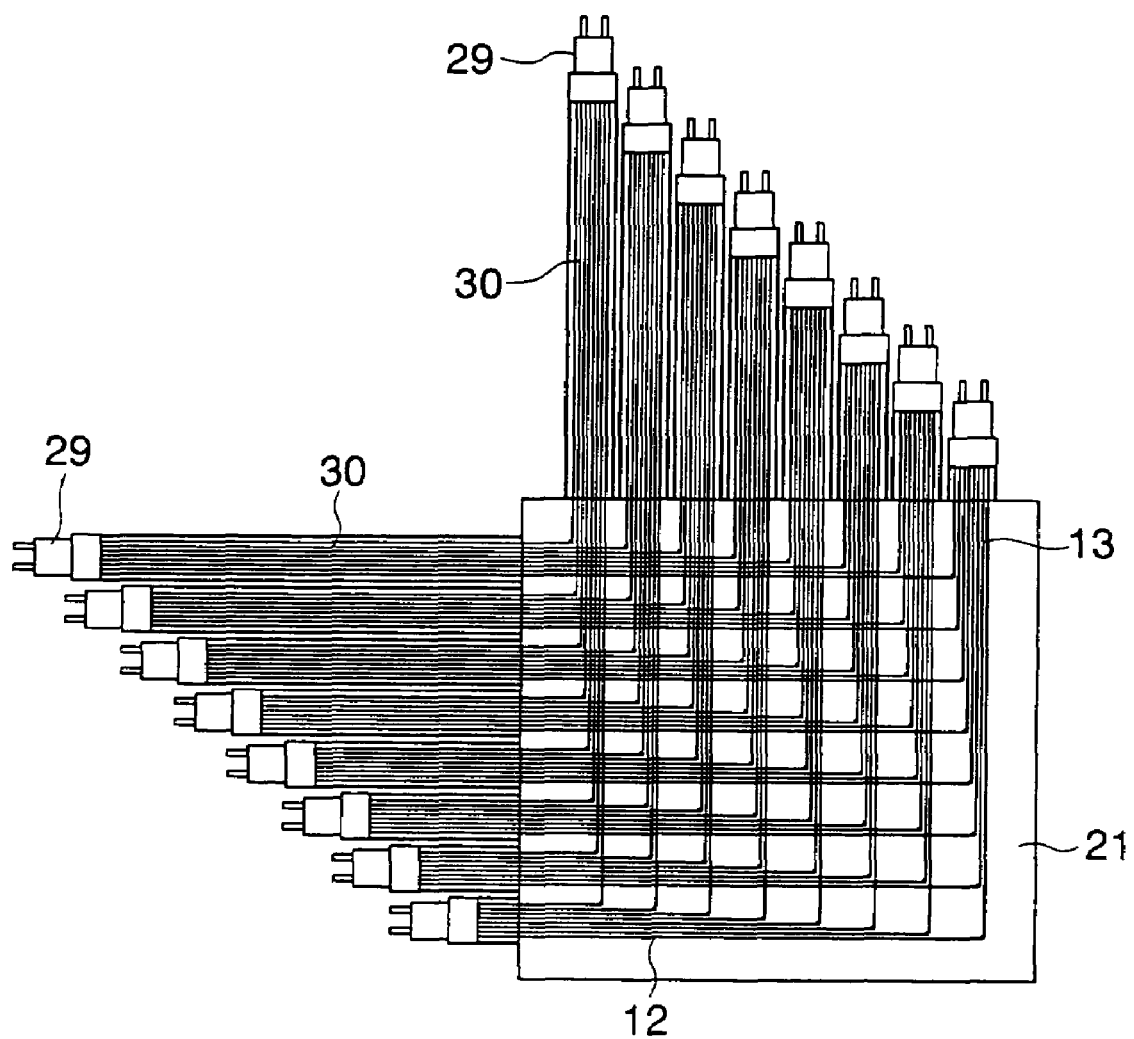
FIG. 18 is a plan view showing another assembly example of the optical wiring substrate according to the second embodiment of the present invention.

FIG. 18 shows an example in which multicore optical fibers or optical waveguide tapes 30, which have stepwise different optical path lengths, are connected with the input terminals of the input wiring 12 and the output terminals of the output wiring 13. Stepwise differences of the lengths of the connected optical fibers can equalize a total length of each of the optical fibers, whereby a demand for synchronicity of optical signals passing through the optical fibers on the substrate 21 can be satisfied.

Moreover, if optical wiring being connected with each of the input terminals of the input wiring 12 and the output terminals of the output wiring 13 is formed of the same material as the material of the optical wiring substrate 21, dispersion of losses in the event of converting the optical signals into electric signals can be reduced by rendering the total wiring lengths uniform.

In addition, if means for attenuating the light, such as a metallic film, is disposed in the vicinity of the core of the optical wiring substrate, dispersion of losses in the event of converting the optical signals into electric signals can be reduced.

Next, description will be made regarding another constitution example of the optical wiring substrate of the second embodiment.

Figure 19A:
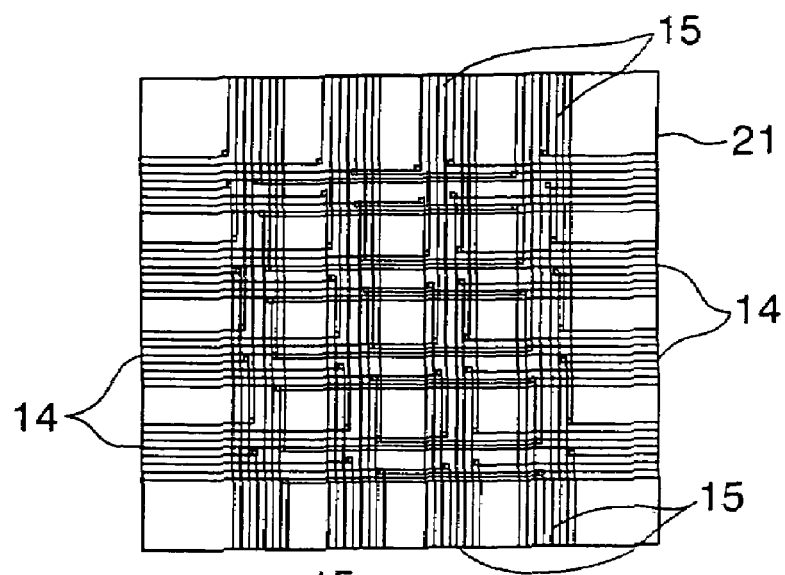
FIG. 19A to FIG. 19C are plan views showing one embodiment of a layout state of optical wiring according to the second embodiment of the present invention.
Figure 19B:
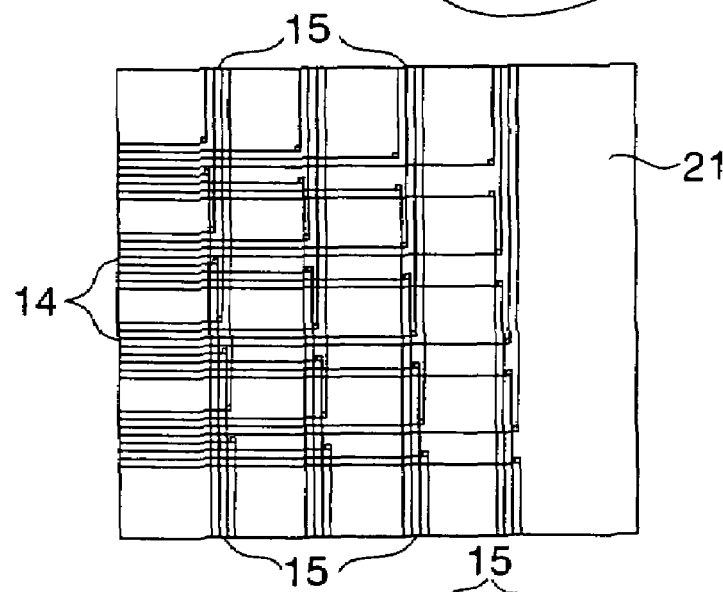
Figure 19C:
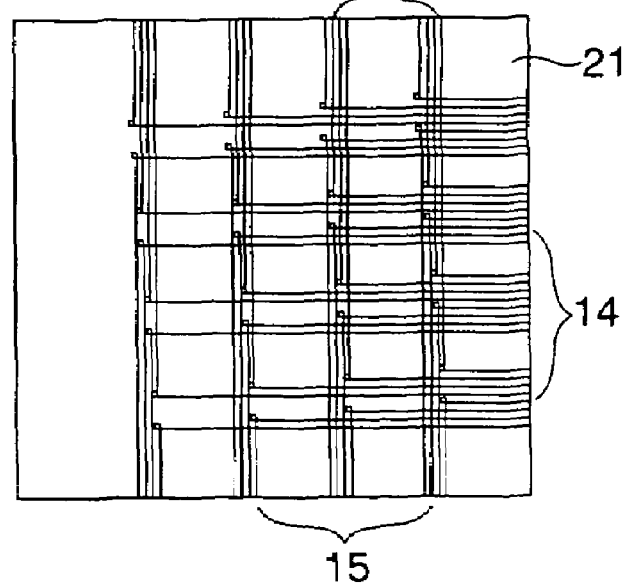

FIG. 19A is a plan view of an optical wiring substrate. As shown in the drawing, N pieces of input terminals 14 are provided on a pair of opposing sides of a rectangular substrate 21, and meanwhile, N pieces of output terminals 15 are provided on another pair of opposing sides of the rectangular substrate 21. Such a configuration can be obtained by superimposing an optical wiring pattern shown in FIG. 19B on an optical wiring pattern shown in FIG. 19C.

An ordinary multicore optical fiber has a pitch of 250 μm. When optical waveguides are laid with the same pitch as the above, a substrate with a side length of 25 cm or larger will be required in the case of 1,000 channels. However, this constitution just requires a substrate as large as about a half of the above-mentioned substrate.

Figure 20:
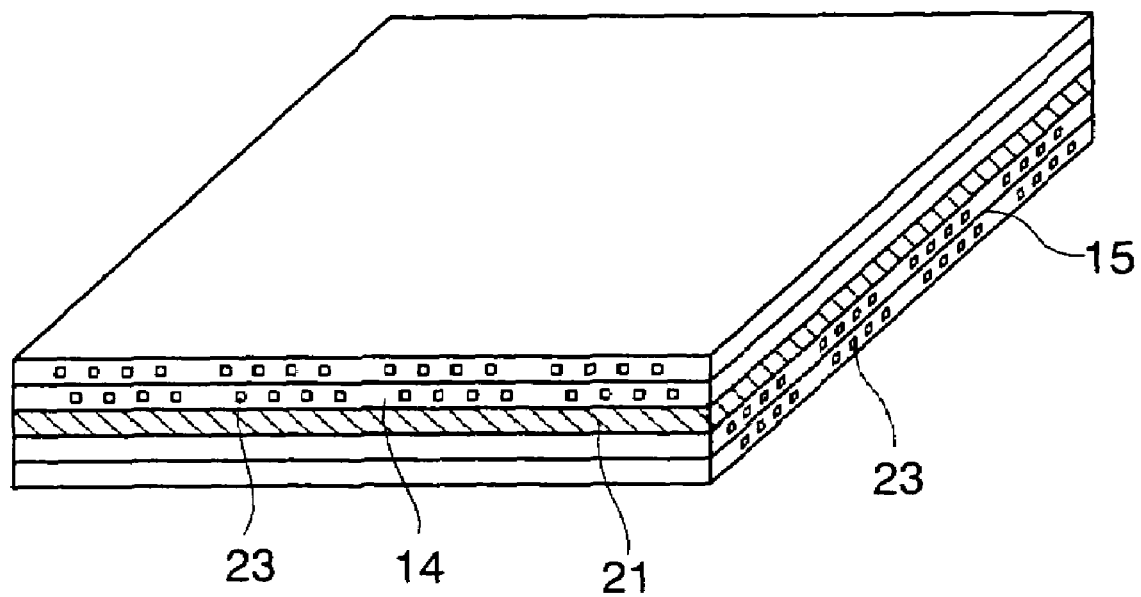
FIG. 20 is a perspective view showing another constitution example of the optical wiring substrate according to the second embodiment of the present invention.

FIG. 20 is a perspective view showing still another constitution example of the optical wiring substrate. The optical wiring consists of four layers of optical waveguide layers in which two layers are laminated on each of upper and lower faces of the substrate 21. When viewed from the side of the input terminals 14 and the side of the output terminals 15, arrangement of cores of the layers forms a staggered arrangement.

This constitution also can be formed by superimposing optical waveguide patterns vertically, as described regarding FIG. 19. A compact optical wiring substrate is obtainable with such a constitution.

Figure 21:
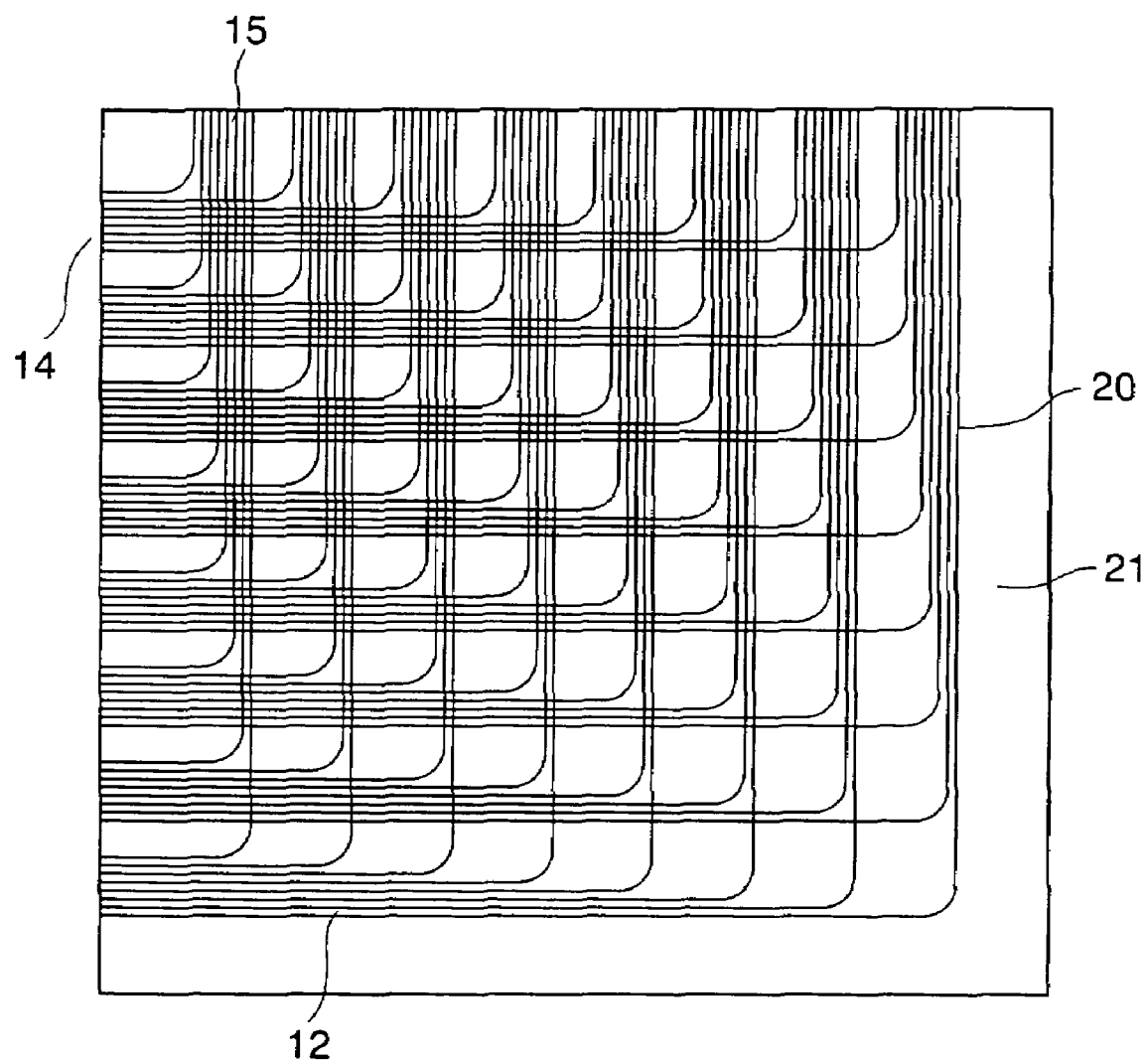
FIG. 21 is a plan view showing still another embodiment of an optical wiring substrate of the present invention.

FIG. 21 is a plan view showing still another constitution example of the optical wiring substrate.

Optical fiber strands 12 are laid on the substrate 21 as the optical wiring. On one side of the substrate, N pieces of the input terminals 14 are disposed, and meanwhile, N pieces of the output terminals 15 are disposed on another side of the substrate.

The optical fiber strands 12 are serially laid out in approximately L shapes and then bound on the substrate 21 with resin. Since the optical fiber strands 12 cannot be bent at a right angle, they are laid with approximate L shapes so as to retain the curvature as the same as or greater than the minimum bend radius thereof.

In this case, an optical fiber from an input side of the optical wiring substrate is the same as that from an output side thereof. Accordingly, the optical fibers are laid while having interlocking positions with one another when the direction of the optical path is converted by 90°.

Figure 22A:
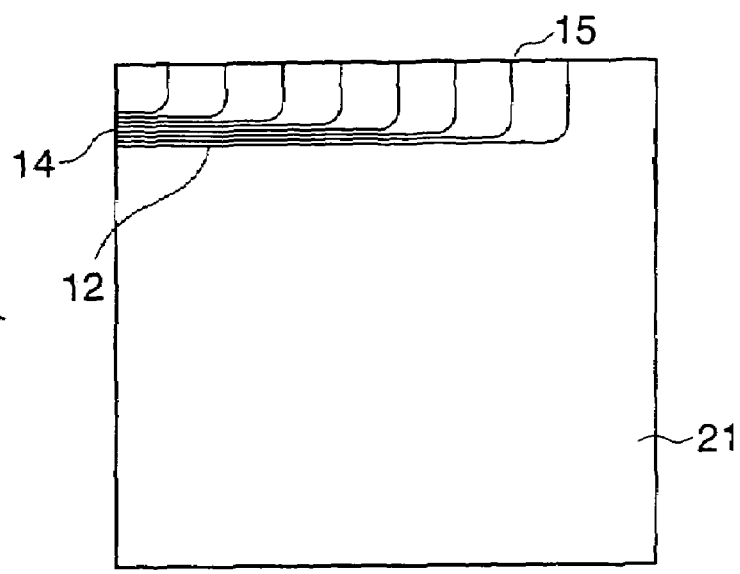
FIG. 22A to FIG. 22C are plan views sequentially showing laying orders for laying out the optical wiring shown in FIG. 21.
Figure 22B:
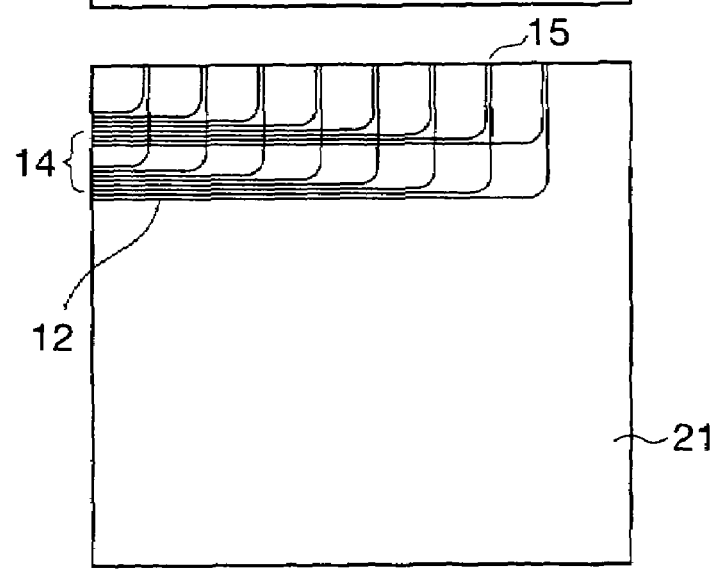
Figure 22C:
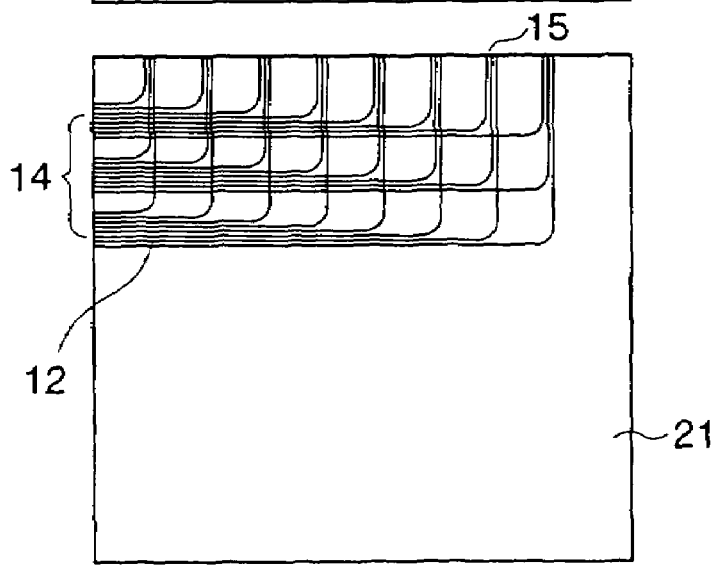

The constitution of the optical wiring substrate shown in FIG. 21 can be obtained by laying the optical fiber strands 12 of either a single mode type or a GI multimode type having an outside diameter of 250 μm, then by additionally laying the optical fiber strands 12 in series as shown in FIG. 22B and FIG. 22C.

Next, a multilayer optical wiring substrate of a third embodiment according to the present invention will be described with reference to FIG. 23 to FIG. 31.

Figure 23:
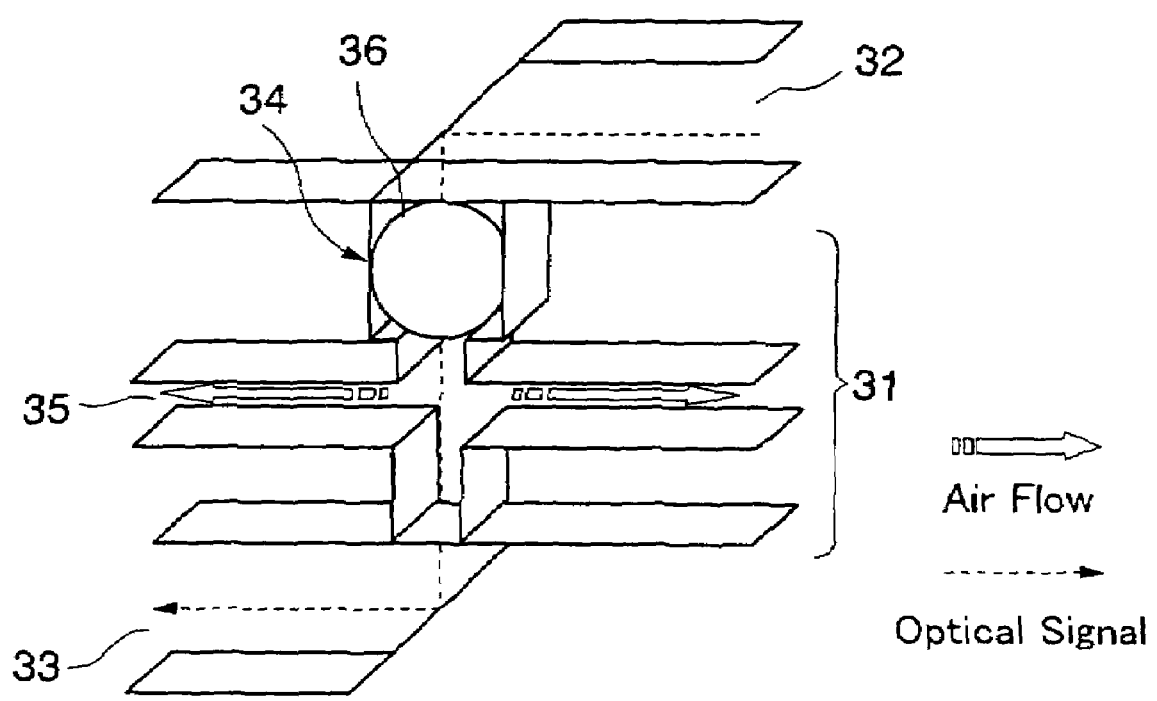
FIG. 23 is a schematic constitutional view of a multilayer optical wiring substrate showing a third embodiment of the present invention.

FIG. 23 is a schematic constitutional view showing the multilayer optical wiring substrate of this embodiment. The drawing shows a constitution in which optical waveguides 32 and 33 are provided on both upper and lower faces of a substrate 31.

An optical via hole 34, which is an interlayer optical transfer portion for allowing light from the optical waveguide 32 to transfer to the optical waveguide 33, is disposed on the substrate 31. Inside the substrate 31, formed is a groove 35 of a tunnel structure for communicating the optical via hole 34 with the outside.

A spherical lens 36 as an optical condenser is disposed within the optical via hole 34. The groove 35 is filled with air or with a liquid.

Japanese Patent Laid-Open Hei 10(1998)-62825 discloses an example of providing a groove in a multilayer optical wiring substrate. However, the groove is provided in a core layer in the example. Meanwhile, Japanese Patent Laid-Open Hei 10(1998)-73775 describes on filling a refractive index matching fluid, which has the same refractive index as that of an intersecting portion, into an optical waveguide from a slit. However, the description is different from the present invention in that the groove of the present invention is aimed at relaxation of stress being incurred by pressure attributed to air voids inside the optical via hole.

Japanese Patent Laid-Open Hei 9(1997)-283776 and Japanese Patent Laid-Open Hei 8(1996)-179178 disclose mounting of a spherical lens on a module. However, the spherical lens is not used for an interlayer optical transfer portion between the optical waveguide layers as in the present invention.

Furthermore, Japanese Patent Laid-Open Hei 5(1993)-241044 discloses coupling of an optical fiber with a convex lens. However, it does not disclose an optical via hole for transfer between optical waveguide layers, or a spherical lens. Japanese Patent Laid-Open Hei 6(1994)-250031 discloses exposure of a section of a through hole being provided on an optical wiring substrate. However, the optical via hole of the present invention has a constitution of being sandwiched with the upper and the lower faces of the substrate.

As mentioned above, the present invention is obviously different from all the disclosures of the prior art in terms of the constitution and the intention.

The multilayer optical wiring substrate of the present invention as shown in FIG. 23 adopts ridge waveguides 32 and 33. Regarding materials for the waveguides, polyimide for optical components OPI-N3205 made by Hitachi Chemical Co. Ltd. is used as a material for cladding.

A spin coater is used for lamination of the cladding material. After laminating resin as an under cladding layer, laminated is resin for a core layer that has a refractive index different from the refractive index of the cladding layer.

Figure 24:
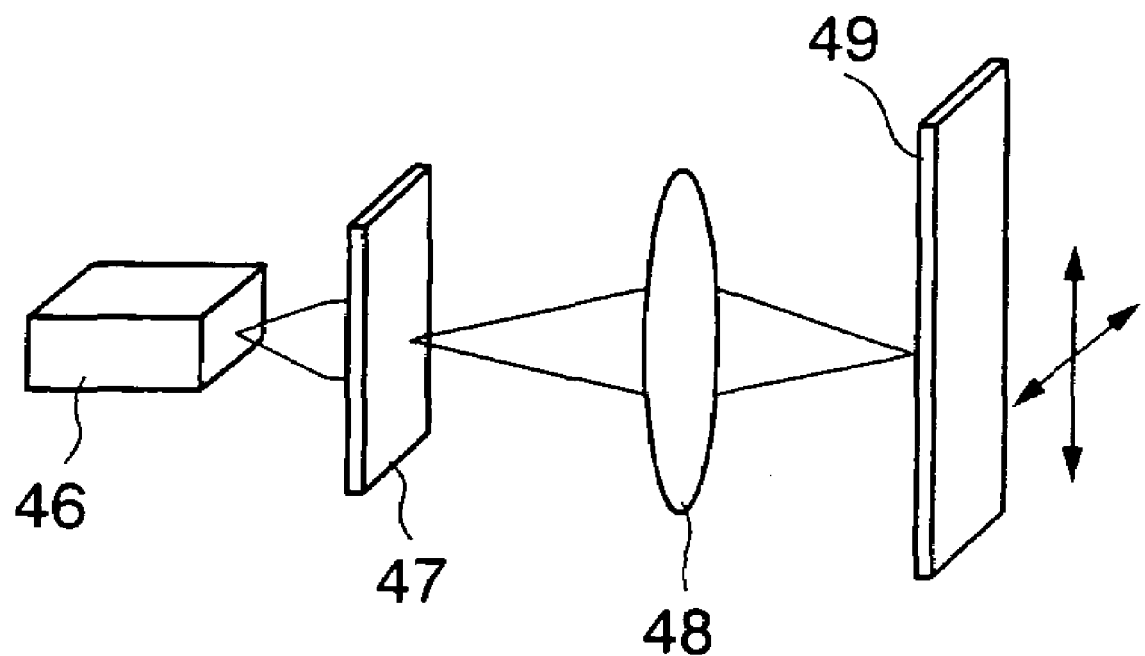
FIG. 24 is a view describing a patterning method for an optical waveguide with a laser process according to the third embodiment of the present invention.

As a material for the core layer, polyimide for optical components OPI-N3405 made by Hitachi Chemical Co. Ltd. is used. Optical waveguide patterns are formed on the core layer by laser processing as shown in FIG. 24.

On a surface of the core layer 49, the optical waveguide patterns are formed with a laser beam from a laser 46 via a mask 47 and a focusing lens 48.

In addition, an over cladding layer is laminated on the surface of the core layer 49 where the optical waveguide patterns are formed, thus forming optical waveguides.

In the embodiment as shown in FIG. 23, pressure incurred in the optical via hole 34 is released by providing the groove 35 of a tunnel structure formed as a vent, whereby stress is relaxed.

Moreover, light loss inside the optical via hole 34 is reduced by inserting the spherical lens 36 as an optical condenser. Since the lens is spherical, a difficulty with orientation accuracy upon insertion of the lens into the optical via hole is reduced.

In addition, since the inside of the optical via hole can be filled with air, condensing efficiency is increased because of a large difference of refractive indices between air and the spherical lens.

Moreover, in case of adaptation to a multilayer wiring substrate, accuracy of positioning is improved because the spherical lens serves as a mark upon multi-layering.

Next, concrete description will be made regarding components of the optical wiring substrate of the above-described third embodiment.

Figure 25:
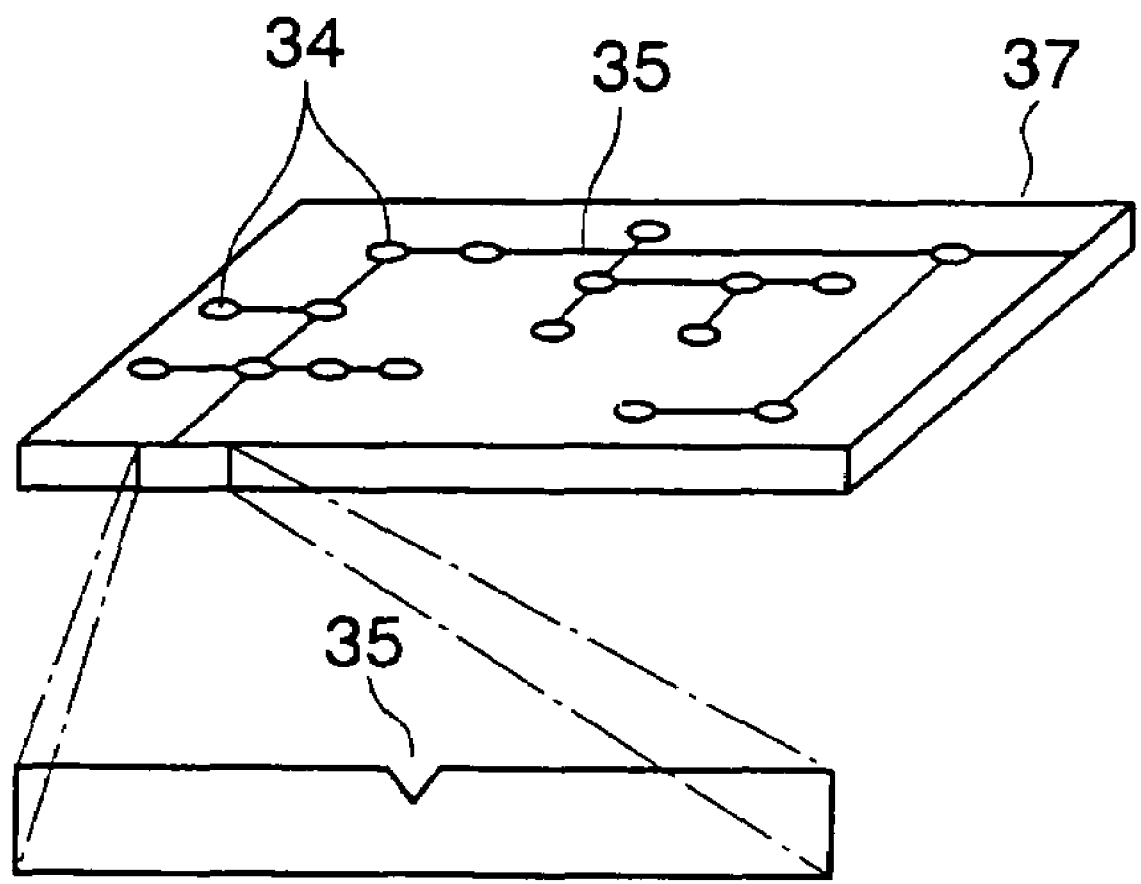
FIG. 25 is a view showing a state that a groove for ventilation is formed on a cladding layer of the optical waveguide in the optical wiring substrate according to the third embodiment of the present invention.

FIG. 25 is a view showing a state in which a groove for a vent is formed on a cladding layer of an optical waveguide of the present invention.

The drawing shows that the plurality of optical via holes 34 and the groove 35 for connecting the optical via holes 34 are formed on a cladding layer 37. The groove 35 communicates with the outside at two places in the drawing, and it is ventilated inside. The groove 35 is formed by laser processing as previously shown in FIG. 24.

Figure 26:
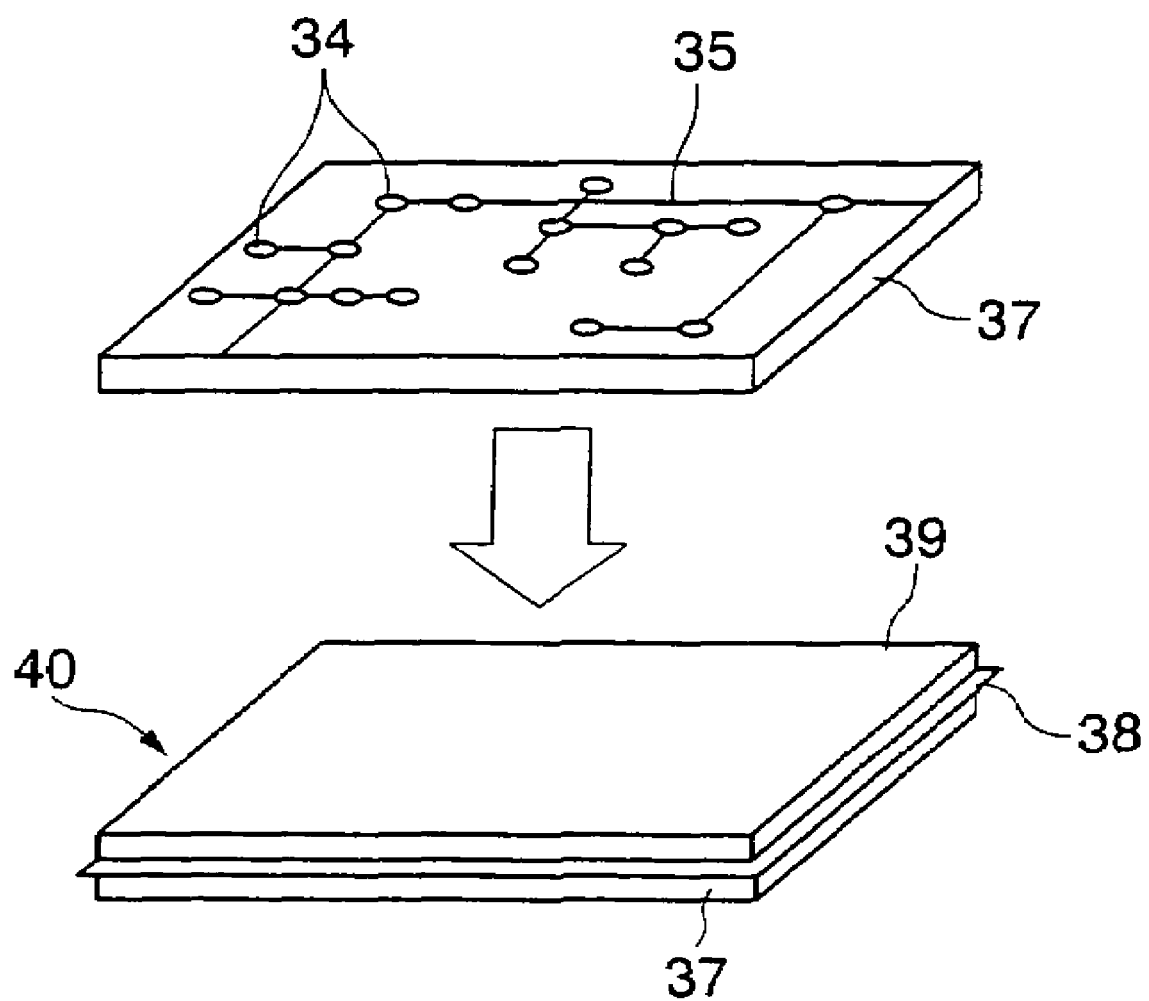
FIG. 26 is a view describing a formation process of the cladding layer of the optical waveguide according to the third embodiment of the present invention.

Next, as shown in FIG. 26, a film 38 is placed on one face of the cladding layer 37. And another cladding layer 39 is laminated, thus forming an under cladding layer 40. The film 38 is used for protecting the optical via holes 35 from being buried with resin in the course of forming the cladding layer 39.

An unillustrated core layer is laminated on the under cladding layer 40. The plurality of optical via holes 34 and the groove 35 for connecting these optical via holes 34 are thereby formed within the cladding layer 37.

Figure 27:
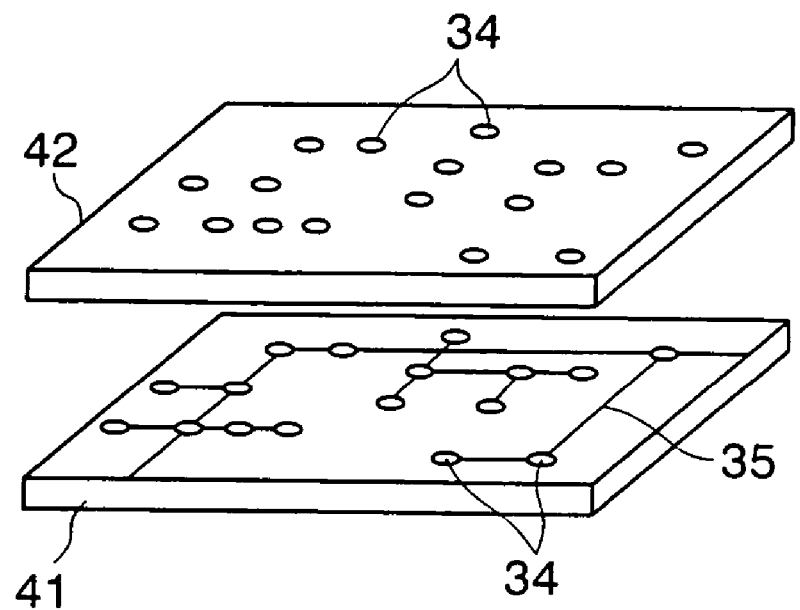
FIG. 27 is a view describing a formation process of a supporting substrate according to the third embodiment of the present invention.

FIG. 27 is a view describing a formation process of a supporting substrate that shows one embodiment of the present invention.

It is an example of constituting the supporting substrate by laminating two substrates, and forming a plurality of optical via holes and a groove within the supporting substrate.

The grove 35 for ventilation is formed on one substrate 41 by patterning with a laser. Another substrate 42 is laminated on the substrate 41, and then the optical via holes 34 are formed from the upside by use of a laser or a drill. The groove is formed only on one substrate.

Figure 28:
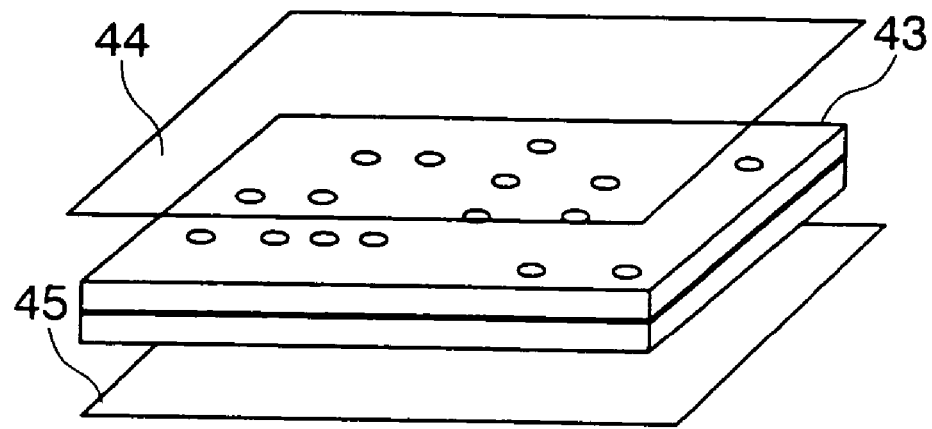
FIG. 28 is a view describing a process of forming the optical waveguides on upper and lower faces by use of the supporting substrate according to the third embodiment of the present invention.

Thereafter, as shown in FIG. 28, unillustrated under cladding layers for optical waveguides are formed on both faces of the supporting substrate 43 composed of two substrates, via films 44 and 45 respectively on each face.

Figure 29:
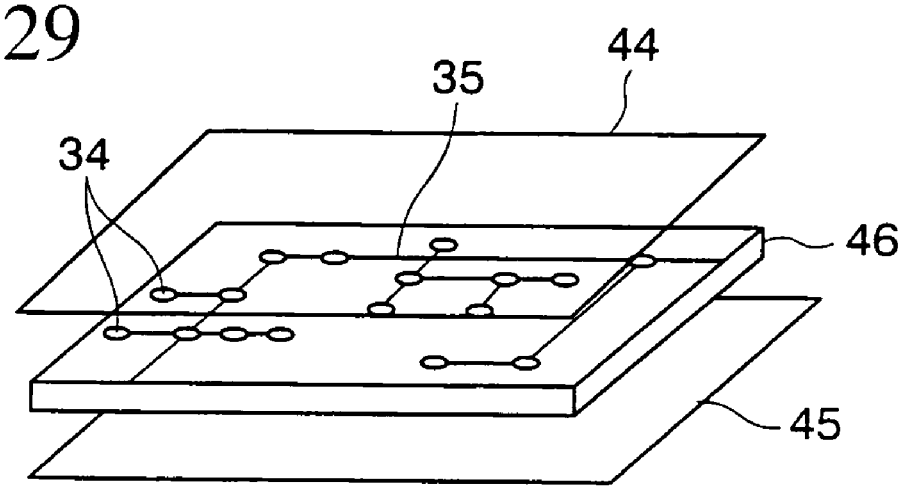
FIG. 29 is a view describing a process of forming the optical waveguides by use of the supporting substrate with grooves formed on the upper and the lower faces according to the third embodiment of the present invention.

FIG. 29 shows an example of forming grooves on both substrates. In the drawing, the groove on the lower face is not illustrated.

It is an example of forming the plurality of optical via holes 34 and the grooves 35 for connecting these via holes and connecting to the outside for ventilation, severally on upper and lower faces of one substrate 46.

On both faces of the substrate 46, under cladding layers for upper-layer and lower-layer optical waveguides of the substrate are laminated via films 44 and 45, respectively.

Figure 30:
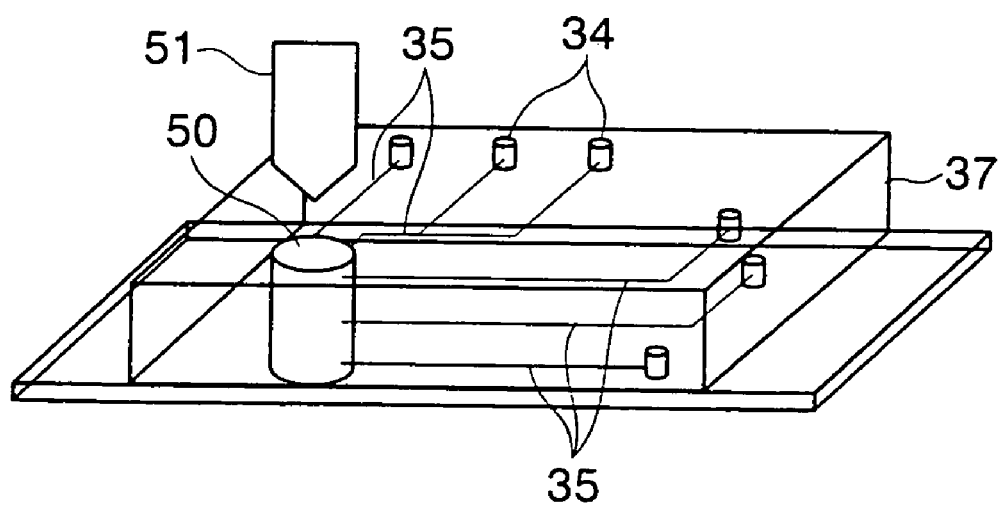
FIG. 30 is a schematic view showing an example of providing a vent that can ventilate a plurality of the grooves in the cladding layer together, which shows the third embodiment of the present invention.

FIG. 30 is a schematic diagram showing an example of providing a vent that can ventilate the plurality of grooves in the cladding layer together.

The plurality of grooves 35 that severally connect with the plurality of optical via holes 34 are connected all together with a vent 50 provided perpendicularly from an upper surface of the cladding layer 37. The vent 50 is formed at a last step of manufacturing the cladding layer by use of a drill 51.

Figure 31:
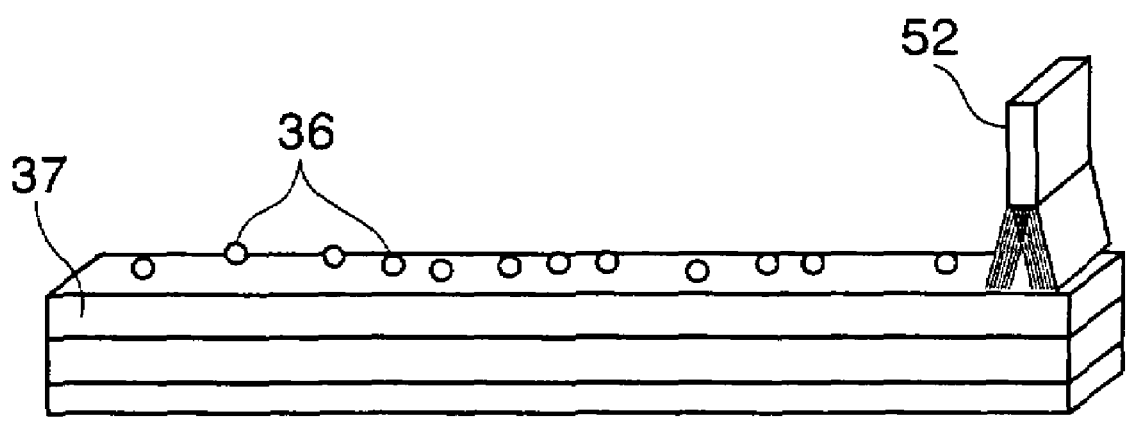
FIG. 31 is a view describing a process of inserting spherical lenses into optical via holes of a multilayer optical wiring substrate according to the third embodiment of the present invention.

FIG. 31 is a view describing a process of inserting spherical lenses 36 severally into the plurality of optical via holes formed on the cladding layer 37.

The plurality of spherical lenses 36 are sprinkled on an upper face of the cladding 37. By sweeping the upper face of the cladding 37 with a squeegee 52, the spherical lenses 36 are allowed to drop from apertures into empty optical via holes. The sweeping operation is performed like an operation in screen printing, whereby the spherical lenses 36 are received by the optical via holes.

Next, a fourth embodiment of an optical wiring substrate of the present invention will be described with reference to FIG. 32 to FIG. 37.

Figure 32:
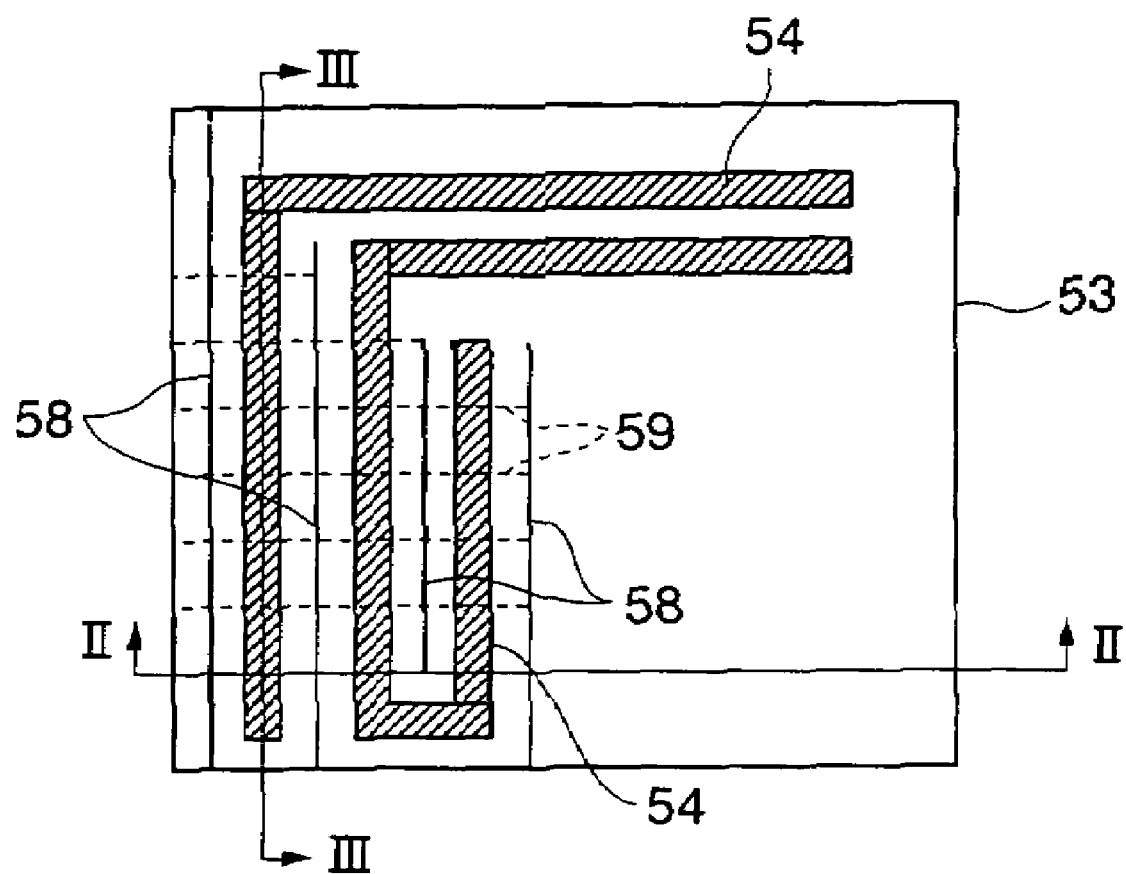
FIG. 32 is a plan view schematically showing a constitution of an optical wiring substrate according to a fourth embodiment of the present invention.

FIG. 32 is a plan view schematically showing a constitution of an optical wiring substrate according to a fourth embodiment of the present invention.

Figure 33:
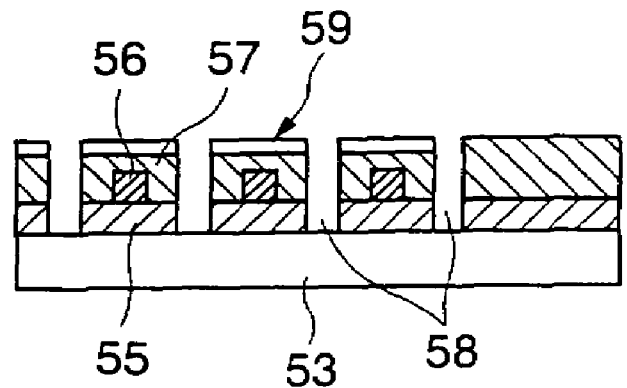
FIG. 33 is a cross-sectional view of FIG. 32 taken along a line II—II.
Figure 34:
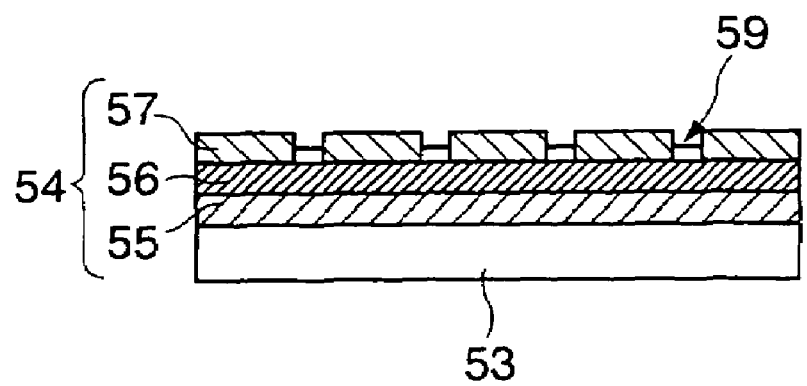
FIG. 34 is a cross-sectional view of FIG. 32 taken along a line III—III.

FIG. 33 is a cross-sectional view of FIG. 32 taken along a line II—II, and FIG. 34 is a cross-sectional view of FIG. 32 taken along a line III—III.

As shown in FIG. 32, a plurality of optical waveguides 54 are provided rectilinearly on a substrate 53. Each of the plurality of optical waveguides 54 is composed of an under cladding layer 55, a core layer 56 and an over cladding layer 57, as severally shown in FIG. 33 and FIG. 34.

On both sides of the rectilinear optical waveguide 54, a pair of slits 58 is provided almost parallel with each other. With these slits 58, each of the plurality of optical waveguides is formed into a shape being sectioned off from another on the substrate. There may be also a case in which another optical waveguide 54 is disposed so as to intersect a rectilinear direction of the slit 58 almost perpendicularly.

Grooves 59 are formed between the pairs of slits 58 for communicating one another. As shown in FIG. 34, the grooves 59 are formed by carving the over cladding layer 57 so as to cross the rectilinear core layer 56 perpendicularly.

Either the slit 58 or the groove 59 communicates with the outside air at an end of the substrate 53.

Figure 35:
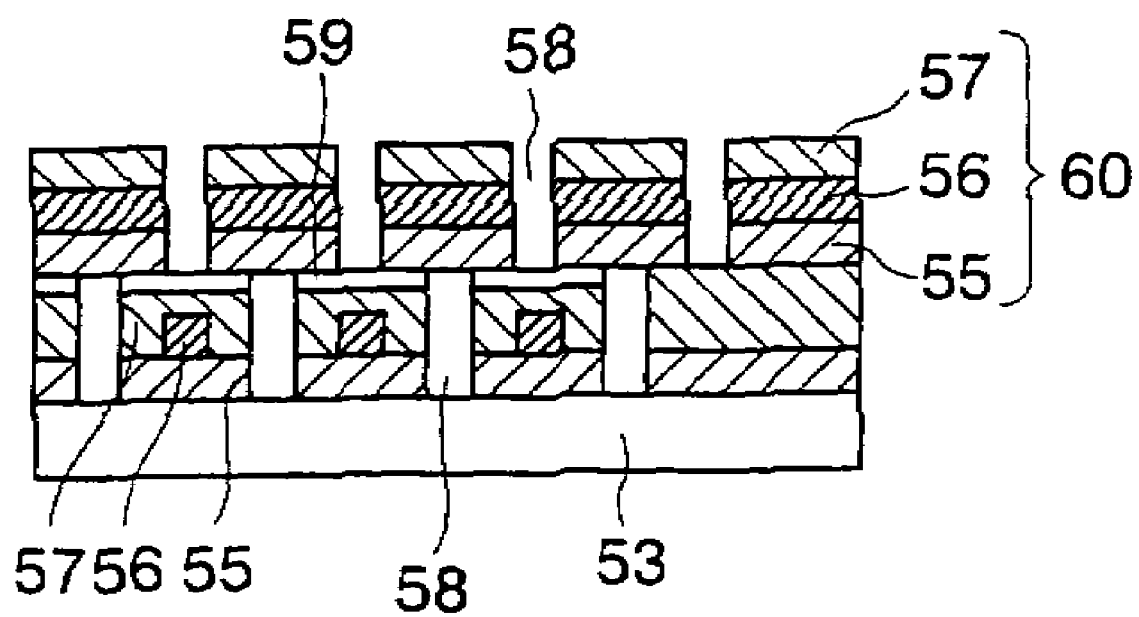
FIG. 35 is a cross-sectional view showing a state that optical waveguide layers according to the fourth embodiment of the present invention are layered.

FIG. 35 shows a state that a second optical waveguide 60 is layered on the over cladding layer 57 of a first optical waveguide shown in FIG. 34.

In the second optical waveguide 60, the slits 58 are formed so as to cut the core layer 56 perpendicularly to a longitudinal direction thereof. Individual slits provided on the first optical waveguide 54 and the second optical waveguide 60 communicate one another via the grooves 59.

Next, a method of manufacturing an optical wiring substrate of the present invention will be described with reference to FIG. 36A to FIG. 36D.

A first example for manufacturing will be described below.

Figure 36A:
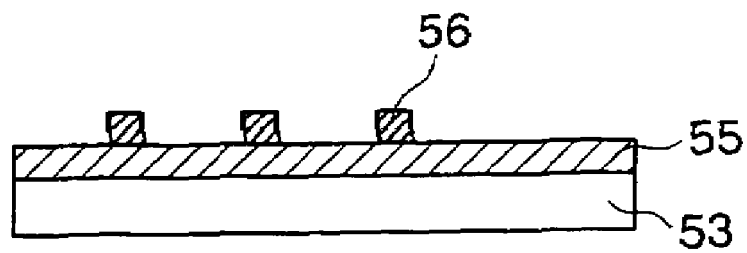
FIG. 36A to FIG. 36D are views showing steps of a manufacturing method of the optical wiring substrate according to the fourth embodiment of the present invention.

As shown in FIG. 36A, photo-curing epoxy resin as the under cladding layer 55 was formed into a film in a thickness of 15 μm on the silicon substrate 53 and then photo-cured. The photo-curing epoxy resin has a refractive index of 1.505 with respect to light having a wavelength of 830 nm, and the resin of which trade name is UVR6128 (made by Union Carbide) is used.

Subsequently, photo-curing epoxy resin as a core layer is formed into a film in a thickness of 20 μm. A waveguide pattern is formed by optical irradiation via a mask, and then cores 56 are formed from a core pattern for being optical waveguides by etching with the waveguide pattern as a mask.

Figure 37:
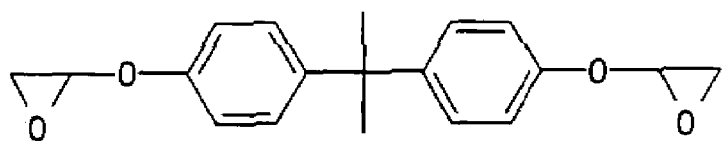
FIG. 37 is a chemical formula of a main ingredient of a core layer used in the embodiment as shown in FIG. 36A to FIG. 36D.

The core 56 in this case has a refractive index of 1.520 with respect to light having a wavelength of 830 nm, and is composed of a mixture of a plurality of epoxy resin obtained by adjusting the refractive index thereof, of which a main ingredient is bisphenol A diglycidyl expressed with a chemical formula shown in FIG. 37.

Figure 36B:
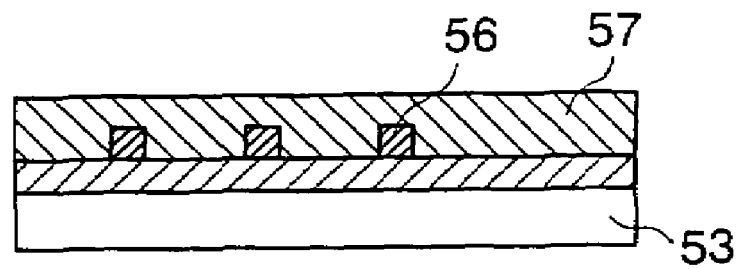

Subsequently, as shown in FIG. 36B, after exposing the cores 56 by removing the optical waveguide pattern layer, the photo-curing epoxy resin is formed into a film in a thickness of 15 μm to form the over cladding layer 57, and then photo-cured.

The over cladding layer 57 in this case has a refractive index of 1.505 with respect to light having a wavelength of 830 nm, and the resin of which trade name is UVR6128 (made by Union Carbide) is used.

Figure 36C:
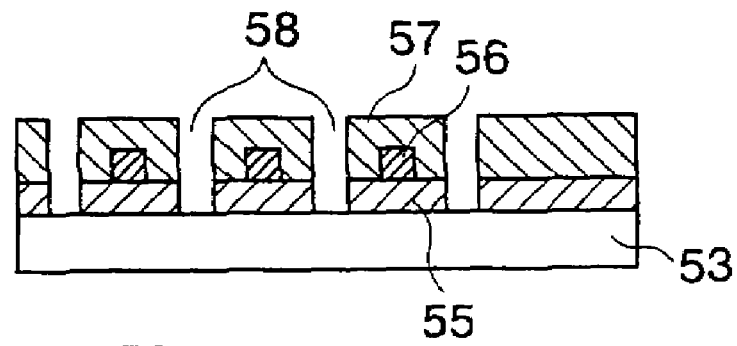

After planarizing an upper face of the over cladding layer 57, a pair of slits are formed by carving with an excimer laser such that the slits are located along both sides of the core 56 approximately parallel to a longitudinal direction thereof, and as deeply as they reach the surface of the substrate 53 (FIG. 36C). In the drawing, the plurality of optical waveguides on the substrate 53 are sectioned by slits 58.

Figure 36D:
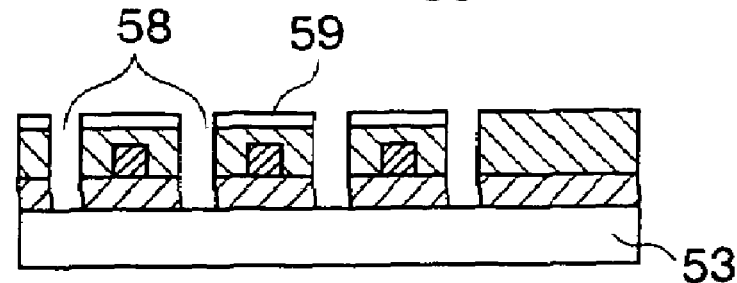

Moreover, the upper face of the over cladding layer 57 is scraped by a thickness of 5 μm with the excimer laser, thus forming the groove 59 for connecting the slits (FIG. 36D). As described above, the optical wiring substrate of this embodiment can be manufactured.

The above-described constitution of laminating the optical waveguide layers as shown in FIG. 35 may be constituted as a two-layered structure of the optical waveguides, by layering another waveguide film separately produced with photo-curing epoxy resin by means of adhesion with a film laminator.

In the following description for a second example of manufacturing, a constitution thereof is identical to that of the first example of manufacturing except the points enumerated hereunder.

Specifically, an optical waveguide of a first layer being formed on a silicon substrate is produced by use of photo-curing epoxy resin. After liquid silicon resin is formed into a film on the optical waveguide of the first layer, an optical waveguide of a second layer is laminated by film-forming with photo-curing epoxy resin. In this case, silicon oil may be used as the liquid silicon resin.

In a third example of manufacturing to be described hereinbelow, fluororesin is formed into a film in a thickness of 10 μm as the under cladding layer 55 on the silicon substrate 53, and then sintered at 150° C. Thereafter, fluororesin is formed into a film in a thickness of 10 μm as a core layer, and then sintered at 150° C.

After sputtering aluminum on the core layer, patterning with a line width of 10 μm was performed by use of a resist. Subsequently, the fluororesin for the core layer was etched, and the aluminum was etched with a mixture of phosphoric acid and nitric acid, whereby a square waveguide in a width of 10 μm was produced.

Fluororesin for the over cladding layer 57 was formed into a film on the core layer, and then an upper face thereof was planarized. The aforementioned slits 58 and the grooves 59 were produced by use of an excimer laser similarly to the first example of manufacturing.

Photo-curing epoxy resin is coated on the optical waveguide of the first layer thus produced. Thereafter, the optical waveguide of the second layer is laminated thereon.

As for the optical waveguide of the second layer, fluororesin is formed into a film as the under cladding layer 55, and then sintered at 150° C. After patterning the core layer, the over cladding layer 57 is formed into a film, and then sintered at 150° C. The photo-curing epoxy resin was cured by irradiation with a high-pressure mercury-vapor lamp. In this way, the optical wiring substrate of this embodiment can be manufactured.

Next, an interlayer optical transfer portion, which is a fifth embodiment of an optical wiring substrate according to the present invention, and a method of manufacturing the same will be described with reference to FIG. 38 to FIG. 43.

Figure 38:
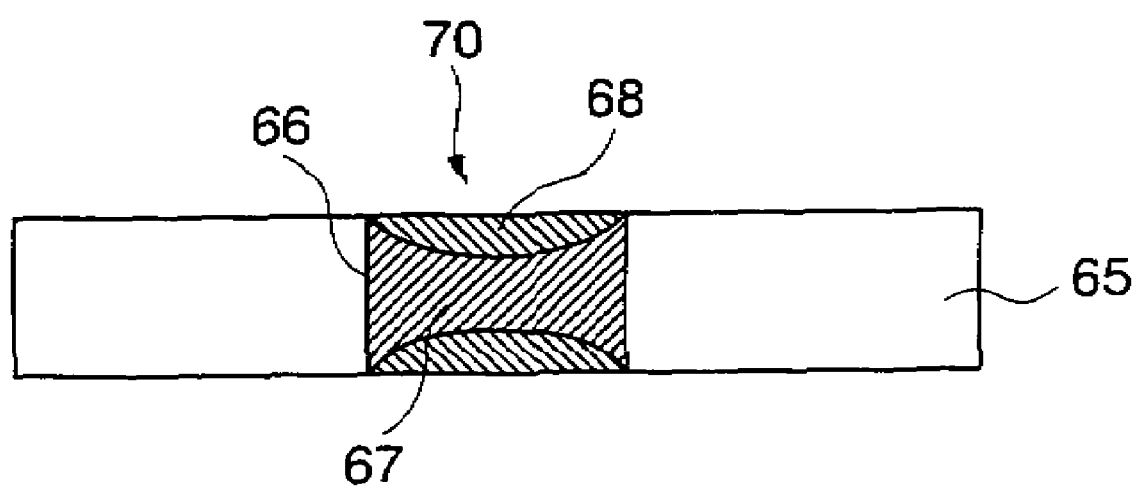
FIG. 38 is a cross-sectional view showing a constitution of an interlayer optical transfer portion of an optical wiring substrate according to a fifth embodiment of the present invention.

FIG. 38 is a cross-sectional view showing a constitution of an interlayer optical transfer portion of an optical wiring substrate of this embodiment.

A through hole 66 is provided on a substrate 65. Low-refractive resin 67 with upper and lower faces formed into concave shapes is inserted in the through hole 66, and high-refractive resin 68 is filled in cavities of the concave faces. The high-refractive resin 68 is planarized along surfaces of the substrate whereby a pair of concave lenses 69 are formed. Thus an interlayer optical transfer portion 70 is formed.

The above-described constitution functions as an optical via hole for connecting an optical path between optical waveguides, for example, which are arranged on two faces on the upper and lower of the substrate 65.

FIG. 39A to FIG. 39F are views showing manufacturing steps of the interlayer optical transfer portion 70 of the optical wiring substrate shown in FIG. 38.

Figure 39A:
FIG. 39A to FIG. 39F are views showing manufacturing steps of the interlayer optical transfer portion 70 of the optical wiring substrate shown in FIG. 38.
Figure 39B:
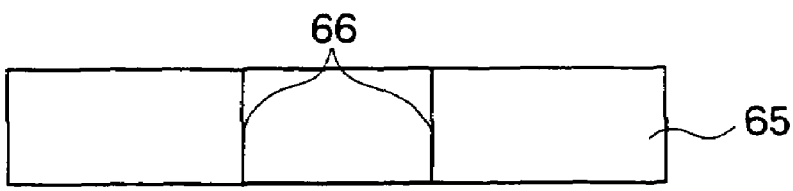

The substrate 65 shown in FIG. 39A consists of glass epoxy resin, and the through hole 66 is provided thereon by drilling with a laser drill, for example (FIG. 39B).

Figure 39C:
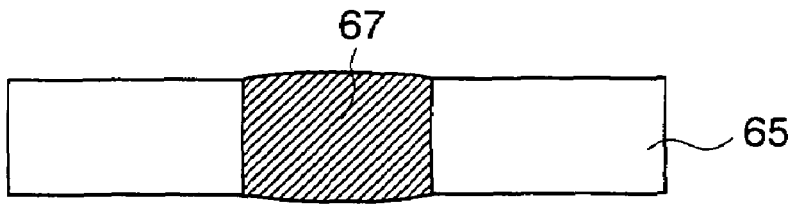

Next, fluorinated epoxy resin 67 which is a low-refractive resin is coated all over an upper face of the substrate 65, and then a squeegee is allowed to sweep on the face of the substrate, thus filling the resin 67 into the through hole 66. Thereafter, the resin 67 is sintered (FIG. 39C).

Figure 39D:
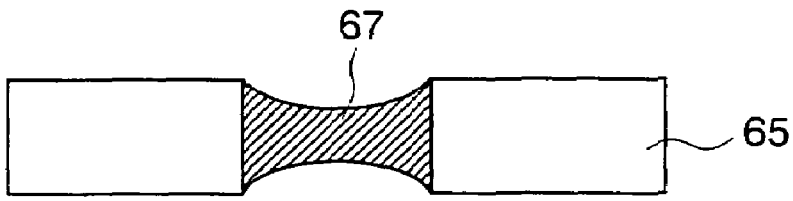

Surfaces of the low-refractive resin 67 is subjected to polishing under a condition in that a polishing velocity on the substrate 65 is made smaller than a polishing velocity on the low-refractive resin 67, whereby the surfaces are formed into concave shapes (FIG. 39D).

In this event, curvature of the concave faces can be arbitrarily designed by varying polishing time, a pressure condition and the like.

Figure 39E:
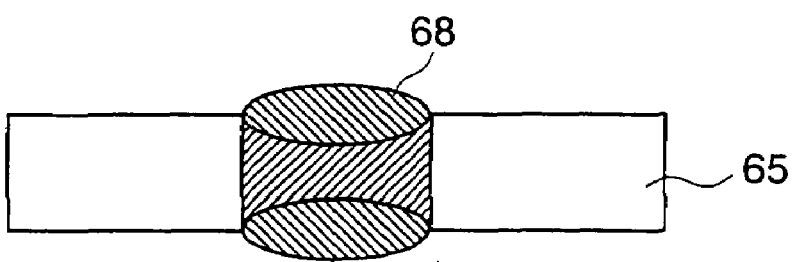

Next, epoxy resin with bisphenol as a curing agent is filled in the concave faces of the low-refractive resin 67 as high-refractive resin 68, and then sintered (FIG. 39E).

Figure 39F:
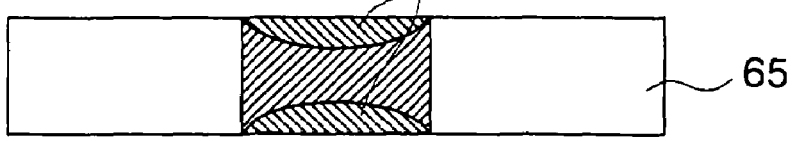

The high-refractive resin 68 is then subjected to polishing along the surfaces of the substrate 65 for planarization, thus forming a pair of concave lenses 69 on the both surfaces of the substrate (FIG. 39F).

In this event, locations of the pair of concave lenses 69 are defined when the through hole 66 was formed, and such locations are accurately set with no risk of shifting. Therefore, the optical via hole is capable of optically connecting an optical path between the optical wiring arranged on the upper and lower faces of the substrate 65, via the pair of the concave lenses of which the centers are vertically aligned.

Next, an optical wiring substrate according to this embodiment will be described with reference to FIG. 40.

Figure 40:
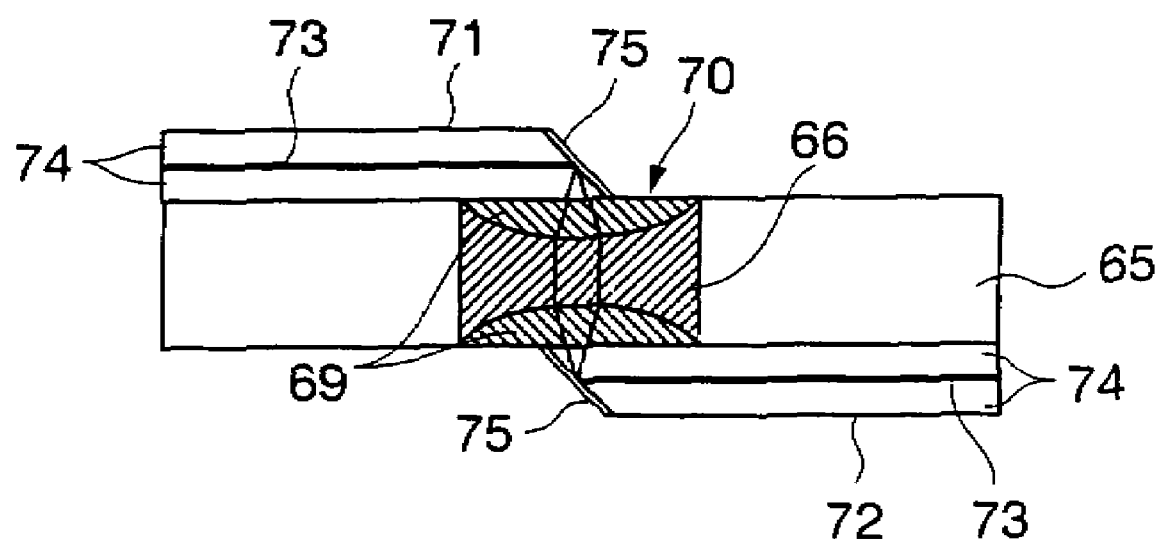
FIG. 40 is a cross-sectional view showing a constitution of an optical wiring substrate, which is one mode of the fifth embodiment of the present invention.

In FIG. 40, a constitution of an optical via hole portion being an interlayer optical transfer portion provided on a substrate 65 is identical to the constitution shown in FIG. 38. Therefore, the same reference numerals are affixed and description thereon will be omitted.

Optical waveguides 71 and 72 are laid on the upper and lower faces of the substrate 65, respectively. Each of the waveguides 71 and 72 is composed of a core layer 73 and a cladding layer 74. On an end face of each of the waveguides, provided is a 45-degree mirror 75 having an inclination of 45° above a face of the optical via hole 70.

A direction of light traveling parallel to the substrate 65 in the optical waveguide 71 is converted by 90° with the 45-degree mirror 75. The light is diffused and condensed by the pair of the concave lenses 69 within the optical via hole 70, and then propagated toward the other optical waveguide 72.

Next, other steps of manufacturing the optical wiring substrate according to the fifth embodiment of the present invention will be described with reference to FIG. 41A to FIG. 41C.

Figure 41A:
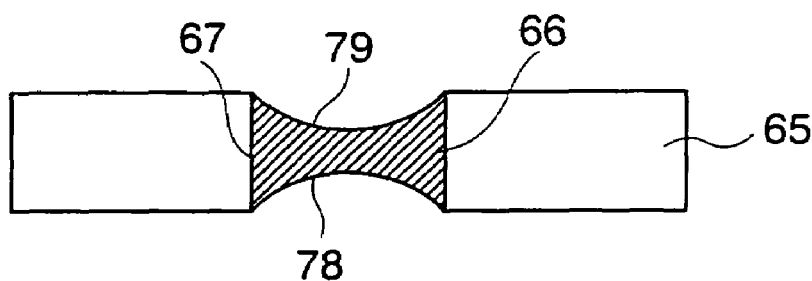
FIG. 41A to FIG. 41C are views showing manufacturing steps of an optical wiring substrate according to the fifth embodiment of the present invention.

Regarding upper and lower surfaces of low-refractive resin 67 to be filled into the through hole 66 formed on the substrate 65 shown in FIG. 41A, a polishing depth on a concave face 79 is allowed to be deeper than that of another concave face 78. Variation of polishing conditions of the both faces can differentiate curvature of one concave face from curvature of the other.

Figure 41B:
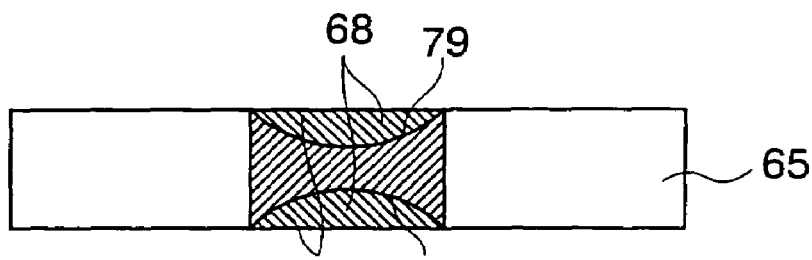

After high-refractive resin 68 is filled in the concave faces 78 and 79, surfaces of the high-refractive resin is subjected to planarization along the faces of the substrate, thus forming the concave lenses 69 with different curvature (FIG. 41B).

Figure 41C:
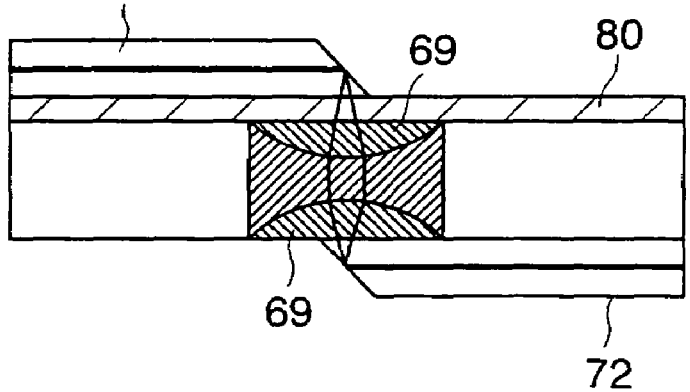

Next, the optical waveguide 71 is laid on an upper face of the substrate 65 via a spacer 80, and meanwhile, another optical waveguide 72 is laid on a lower face of the substrate (FIG. 41C).

Due to the presence of the spacer 80, light from the optical waveguide 71 will have a wider radiation area. However, since the concave lens 69 has a significant focal effect because of high curvature of the concave face 79, the light is effectively propagated toward the other optical waveguide 72 via the other concave lens 69.

Next, steps of manufacturing another optical wiring substrate of this embodiment will be described with reference to FIG. 42A to FIG. 42D.

Figure 42A:
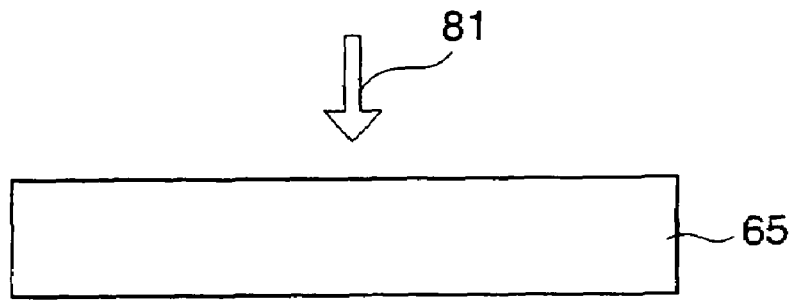

The substrate 65 shown in FIG. 42A consists of glass epoxy resin, and the through hole 66 is provided thereon by drilling with a laser drill 81, for example (FIG. 42B).

The through hole 66 can be obtained by irradiation of a carbon dioxide gas laser 81 on the substrate 65. The carbon dioxide gas laser 81 is allowed to move spirally for executing a circular process, whereby a side face of the through hole 66 is formed to have a tapered section.

Next, fluorinated epoxy resin 67 which is a low-refractive resin is coated all over an upper face of the substrate 65, and then a squeegee is allowed to move on the face of the substrate, thus filling the resin 67 into the through hole 66 from a larger aperture thereof. Thereafter, the resin 67 is sintered.

Subsequently, surfaces of the low-refractive resin 67 is subjected to polishing under a condition in that a polishing velocity on the substrate 65 is made smaller than a polishing velocity on the low-refractive resin 67, whereby the surfaces are formed into concave shapes.

Next, epoxy resin with bisphenol as a curing agent is filled into the concave faces of the low-refractive resin 67 as high-refractive resin 68, and then sintered.

Figure 42C:
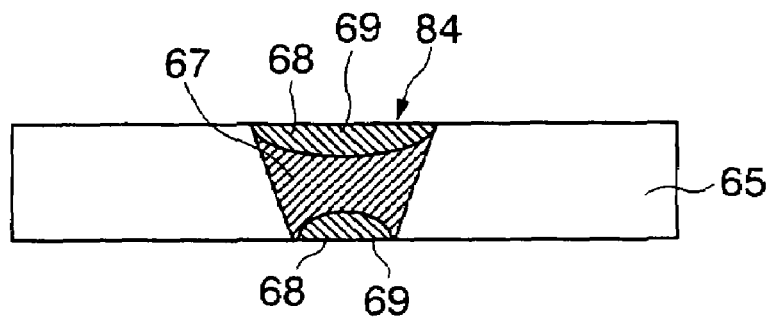

The high-refractive resin 68 is then subjected to polishing along the surfaces of the substrate 65 for planarization, thus forming the pair of concave lenses 69 on the both surfaces of the substrate. An optical interface 84 is thereby completed (FIG. 42C).

Figure 42D:
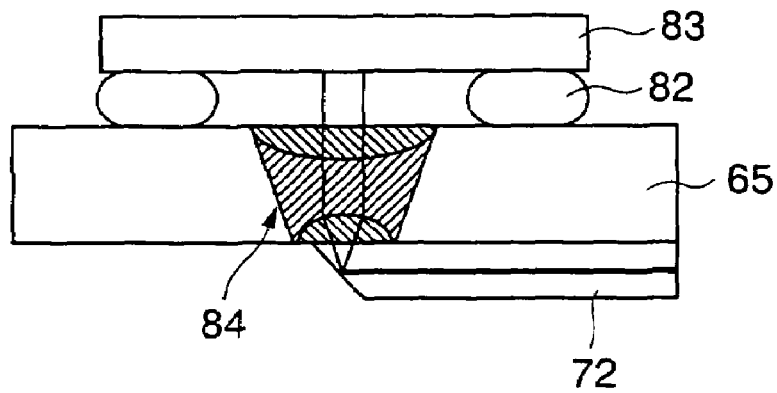

On one face of the substrate 65 in which the optical interface 84 is formed, an optical waveguide 72 is laid. Light in which an optical path direction is converted via the optical interface 84 is accepted by a light-receiving element 83 fixed on the other face of the substrate 65 with fixing portions 82 (FIG. 42D).

In this event, the light from the optical waveguide 72 at one face of the substrate 65 is diffused with a certain emergent angle within the optical interface 84. However, since the through hole 66 is formed as a tapered shape, the light passing through the through hole 66 does not contact with the substrate 65 so that it can efficiently reach the light-receiving element 83 at the other face of the substrate 65.

Figure 43A:
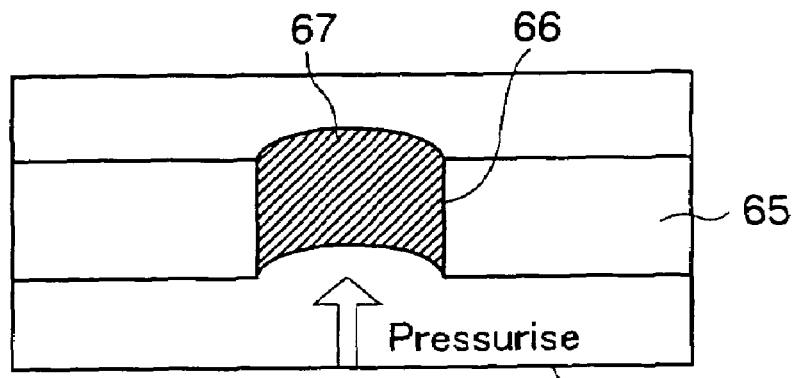
FIG. 43A to FIG. 43C are views showing manufacturing steps of an optical wiring substrate which is still another example of the fifth embodiment of the present invention.
Figure 43B:
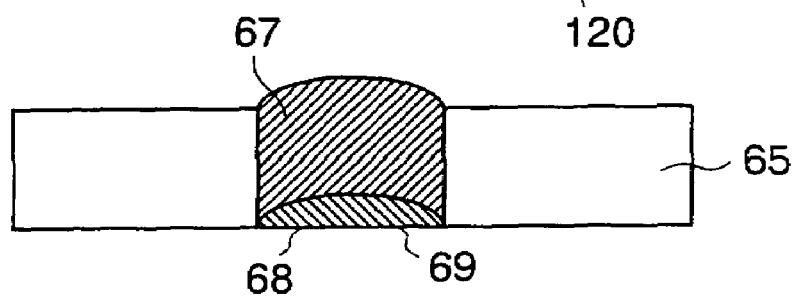
Figure 43C:
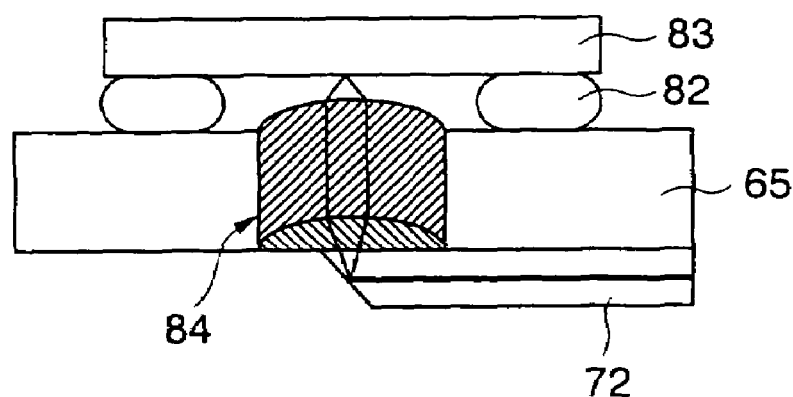

Next, steps of manufacturing another optical wiring substrate of this embodiment will be described with reference to FIG. 43A to FIG. 43C.

The through hole 66 is formed on the substrate 65. The fluorinated epoxy resin 67 composed of a low-refractive material is inserted into the through hole 66 and pressurized from one end of the through hole 66 in an oven 120 (FIG. 43A).

As a result, one end of the fluorinated epoxy resin 67 is formed into a concave face while the other end thereof is formed into a convex face, and then sintered.

The high-refractive resin 68 is filled into the concave face and sintered. Thereafter, a surface of the high-refractive resin is polished for planarization, whereby the concave lens 69 is formed (FIG. 43B).

On one face of the substrate 65 in which an optical via hole 70 is formed, an optical waveguide 72 is laid out. Light in which an optical path direction is converted via the optical via hole 70 is accepted by the light-receiving element 83 fixed on the other face of the substrate 65 with the fixing portions 82 (FIG. 43C).

In this event, as for the convex portion of the fluorinated epoxy resin 67, a difference of a refractive index thereof from a refractive index of air becomes large at a portion contacting with air, hence higher condensing capability is obtained. For this reason, efficient optical connection can be realized between the optical waveguide 72 at one surface of the substrate and the photodetector 83 on the other surface of the substrate 65.

Next, a sixth embodiment of an optical wiring substrate of the present invention will be described with reference to FIG. 44 and FIG. 45.

Figure 44:
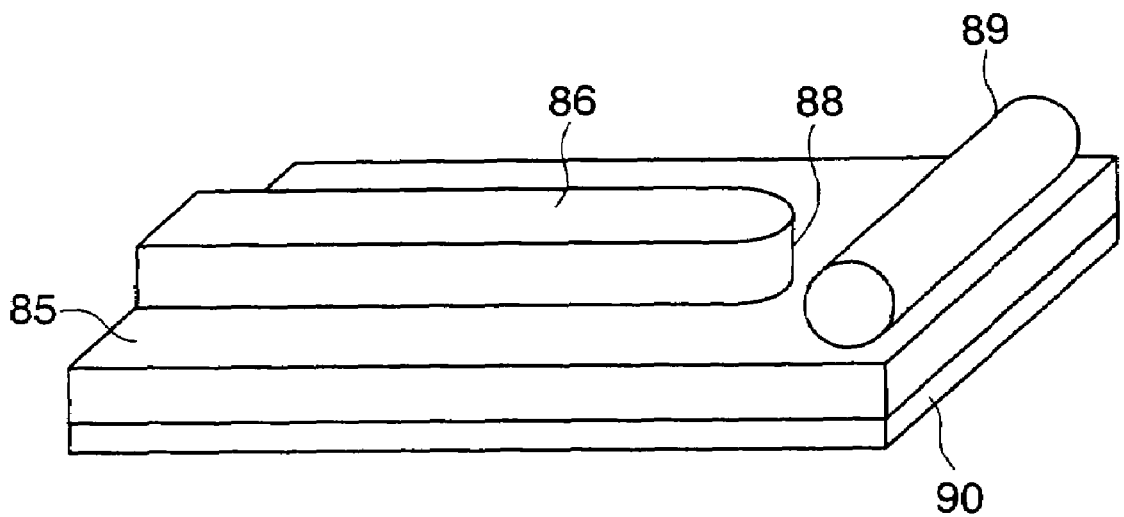
FIG. 44 is a schematic perspective view showing a constitution of an optical waveguide according to a sixth embodiment of the present invention.

FIG. 44 is a schematic perspective view showing a constitution of an optical waveguide that shows the sixth embodiment of the present invention.

As shown in FIG. 44, a cladding layer 85 and a core layer 86 are laminated on a substrate 90 by a spin coating method. A tip portion for emitting light from the core layer 86 is subjected to etching with a metal mask to form a convex shape, thus forming a convex tip portion 88.

A cylindrical lens 89 is disposed on the cladding layer 85 in a position facing the convex tip portion 88. In this event, the cylindrical lens 89 and the core layer 86 are disposed such that the center of curvature of the cylindrical lens 89 is located on an extension of the centerline of the core 86 in a longitudinal direction thereof.

Figure 45:
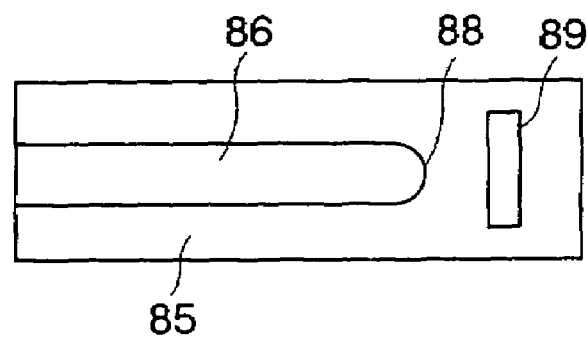
FIG. 45 is a plan view of the optical waveguide shown in FIG. 44 according to the sixth embodiment of the present invention.

FIG. 45 is a plan view of the optical waveguide shown in FIG. 44.

The convex tip portion of the core layer 86 may be composed of another member as far as the member has the same refractive index as the refractive index of a core 86.

Figure 46:
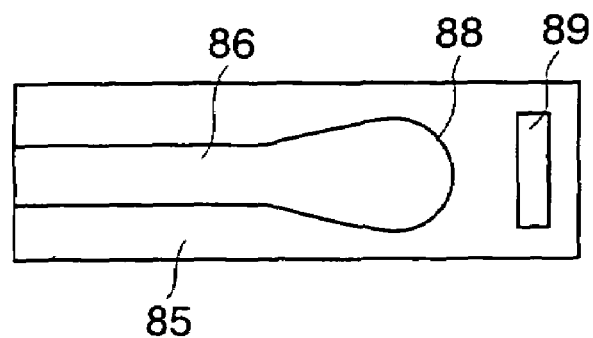
FIG. 46 is a plan view of an optical waveguide showing another example of the embodiment shown in FIG. 44.

FIG. 46 is a plan view of an optical waveguide showing another example of the core 86 shown in FIG. 45. The core 86 has a broadened shape toward its tip portion, and the tip portion has a convex shape.

Figure 47:
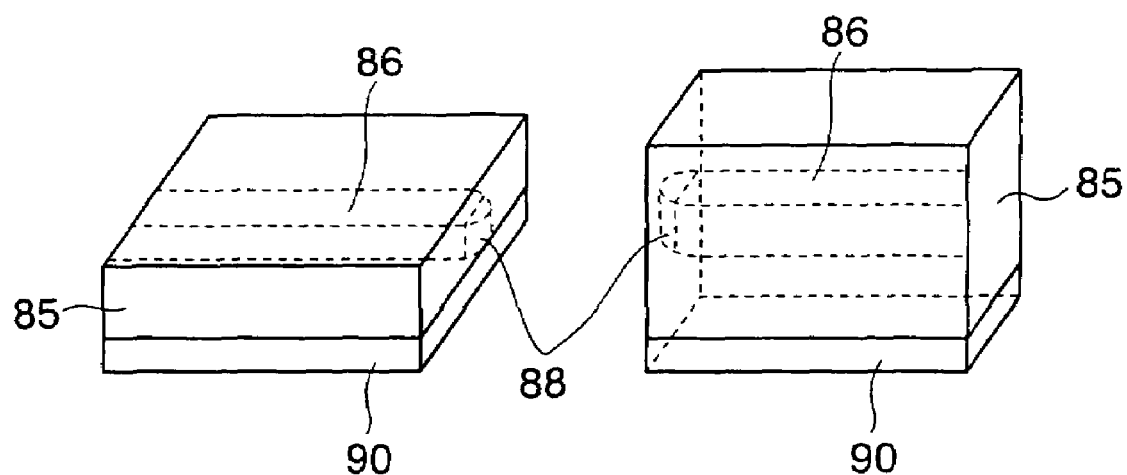
FIG. 47 is a perspective view showing an aspect in which the optical waveguides according to the sixth embodiment are optically connected with each other.

FIG. 47 is a perspective view showing an aspect in which the optical waveguides are optically connected with each other.

One optical waveguide is composed of the core 86 and a cladding 85 which surrounds the core 86, the cladding having a refractive index different from the refractive index of the core.

The core 86 is supported on a substrate 90 in a state that the tip portion thereof is exposed to air out of the cladding 85.

In a position opposite to the one optical waveguide, disposed is another optical waveguide to be optically connected. The core 86 thereof has the tip portion 88 exposed to air and is surrounded by the cladding 85. The refractive index of the cladding is different from the refractive index of the core.

Light emitted from the exposed convex tip portion 88 of the one optical waveguide is condensed by the exposed convex tip portion 88 of the other optical waveguide. An optical connection structure capable of propagating optical signals with high connection efficiency can be thereby obtained.

Next, an optical wiring substrate, a method of manufacturing the same and a multilayer optical wiring substrate according to a seventh embodiment of the present invention will be described with reference to FIG. 48 to FIG. 61.

Figure 48:
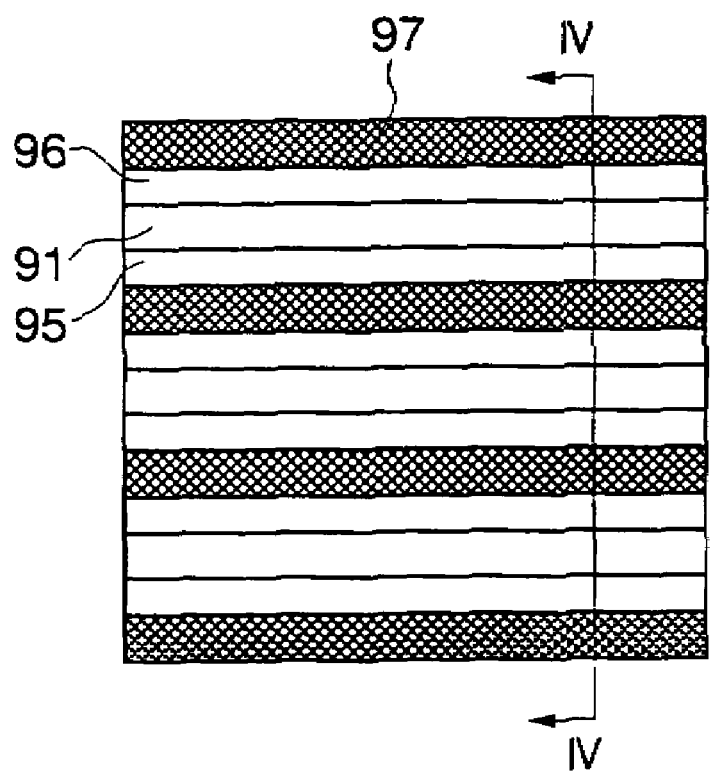
FIG. 48 is a plan view showing an optical wiring substrate according to a seventh embodiment of the present invention, which shows a first optical waveguide layer with optical waveguides arranged parallel to the x-axis direction.
Figure 49:
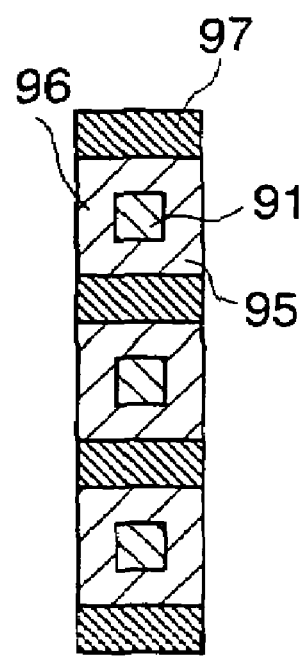
FIG. 49 is a cross-sectional view of FIG. 48 taken along a line IV—IV.

FIG. 48 is a plan view showing one optical waveguide layer and FIG. 49 is a cross-sectional view of FIG. 48 taken along a line IV—IV.

FIG. 48 and FIG. 49 show optical wiring in which three optical waveguides are arranged parallel to the x-axis direction on a substrate. Each optical waveguide is composed of a core 91 and claddings 95 and 96 surrounding the core 91. On both sides of each of the optical waveguides, optical absorbers 97 with low optical transmittance are buried collaterally in axisymmetry with respect to the center of the core 91, thus forming an optical waveguide layer of a first layer.

Figure 50:
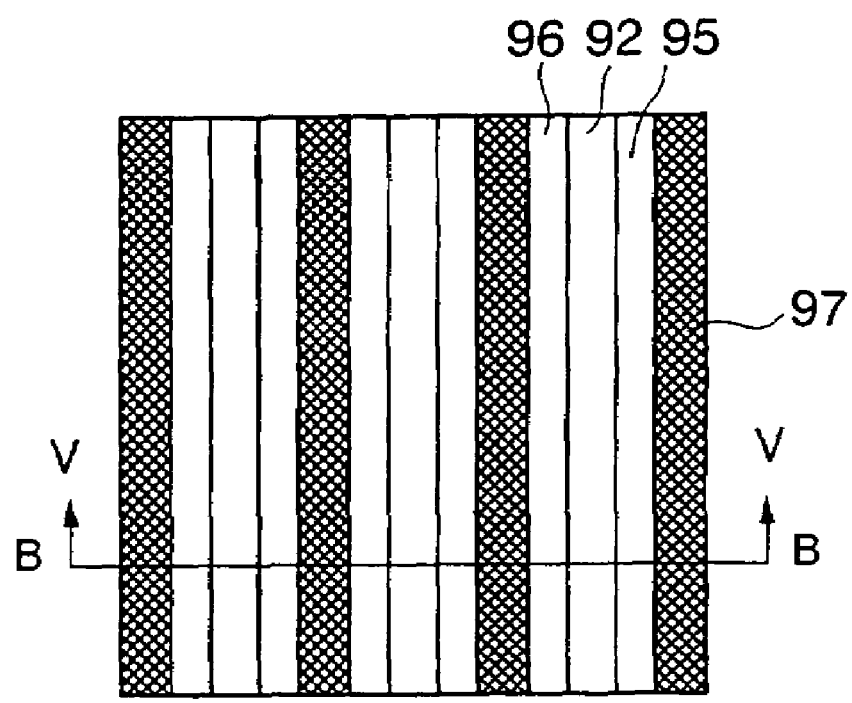
FIG. 50 is a plan view showing the optical wiring substrate according to the seventh embodiment of the present invention, which shows a second optical waveguide layer with optical waveguides arranged parallel to the y-axis direction.
Figure 51:
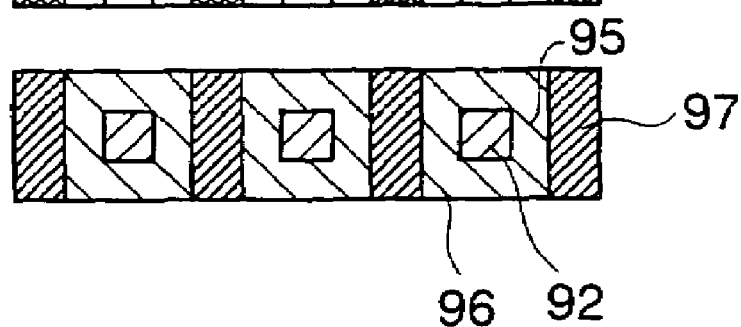
FIG. 51 is a cross-sectional view of FIG. 50 taken along a line V—V.

FIG. 50 is a plan view showing a second optical waveguide layer and FIG. 51 is a cross-sectional view of FIG. 50 taken along a line V—V.

FIG. 51 shows optical wiring in which three optical waveguides are arranged parallel to the y-axis direction. On both sides of each of the optical waveguides respectively composed of the core 91 and the claddings 95 and 96, the optical absorbers 97 with low optical transmittance are buried collaterally in axisymmetry with respect to the center of the core 92, thus forming an optical waveguide layer of a second layer.

Since the optical absorbers 97 are provided, optical waveguide portions are clearly discernible when light is irradiated perpendicularly onto the optical waveguide layers shown in FIG. 48 and FIG. 50.

Figure 52:
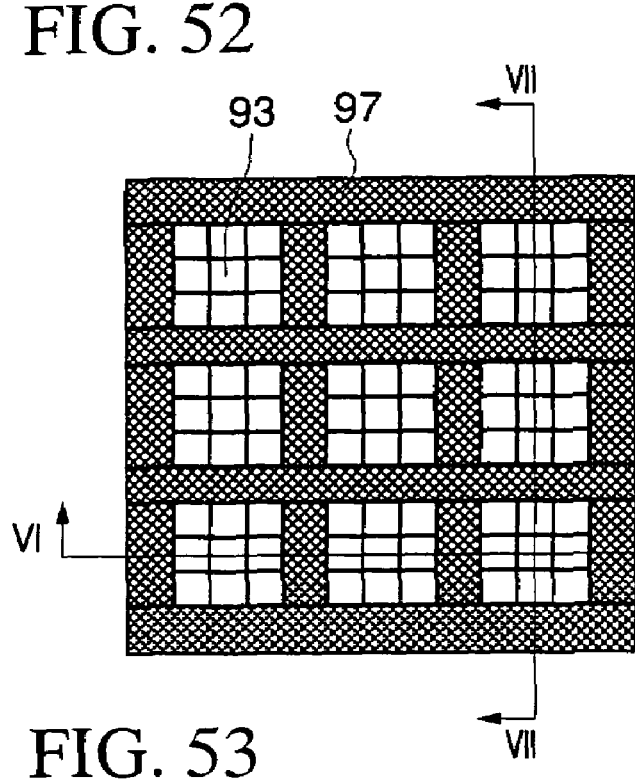
FIG. 52 is a plan view of a layered optical waveguide layer obtained by laminating the optical waveguide layer shown in FIG. 48 and the optical waveguide layer shown in FIG. 50.

As shown in FIG. 52, when the second optical waveguide layer is laminated on the first optical waveguide layer and light is irradiated thereon, intersecting portions of the waveguides of the two layers become clearly discernible in a lattice fashion. A center 93 of each lattice represents a center of intersection of the waveguides.

Figure 54:
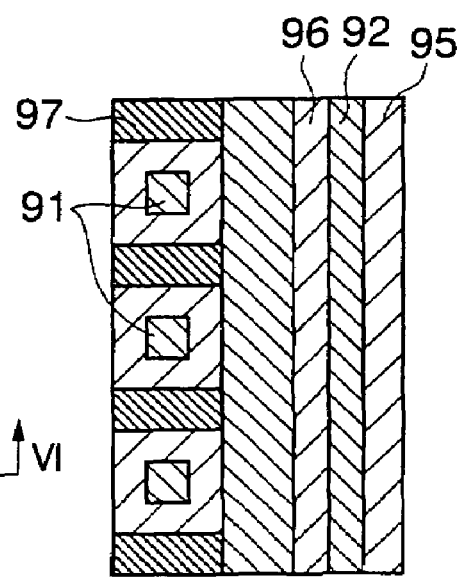
FIG. 54 is a cross-sectional view of the FIG. 52 taken along a line VII—VII.
Figure 53:
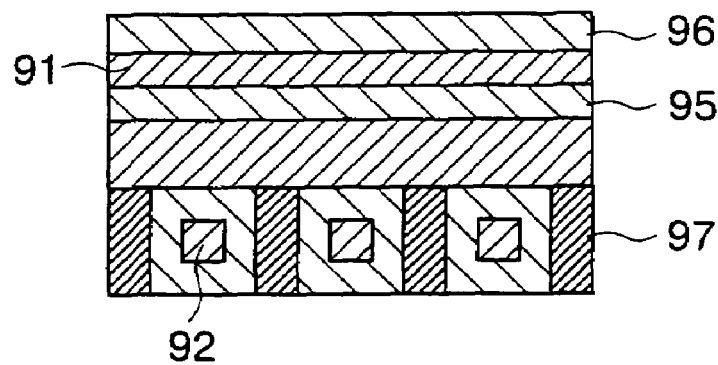
FIG. 53 is a cross-sectional view of the FIG. 52 taken along a line VI—VI.

FIG. 53 is a cross-sectional view of the FIG. 52 taken along a line VI—VI, and FIG. 54 is a cross-sectional view of the FIG. 52 taken along a line VII—VII.

Next, a manufacturing process of the optical waveguide layer shown in the cross-sectional view of FIG. 51 will be described with reference to FIG. 55A to 55G.

Figure 55A:
FIG. 55A to FIG. 55G are cross-sectional views sequentially showing manufacturing steps of the optical waveguide layer shown in the cross-sectional view of FIG. 51.

Low-refractive resin is coated on a substrate 98, and is photo-cured, thus forming a first cladding layer 95 (FIG. 55A).

Figure 55B:
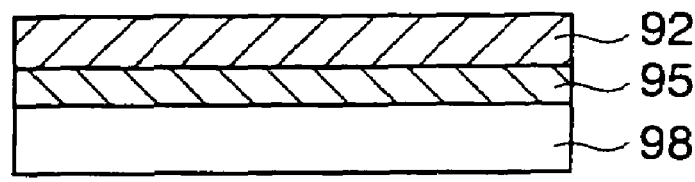
Figure 55C:
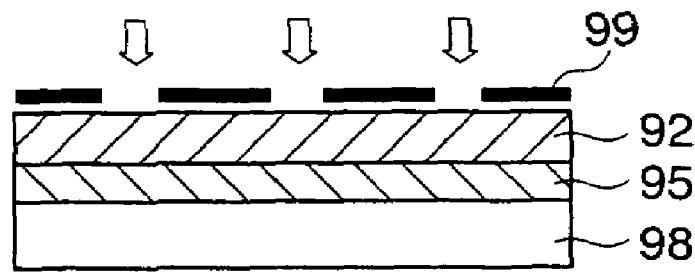
Figure 55D:
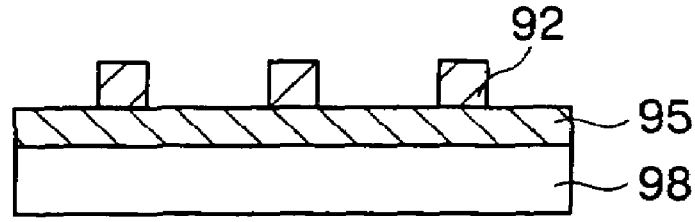

High-refractive resin is coated on the first cladding layer 95, whereby a core layer 92 is formed into a film (FIG. 55B). Thereafter, the core layer is subjected to exposure treatment via a mask 99 (FIG. 55C) and then subjected to developing treatment, thus forming core portions 92 (FIG. 55D).

Figure 55E:
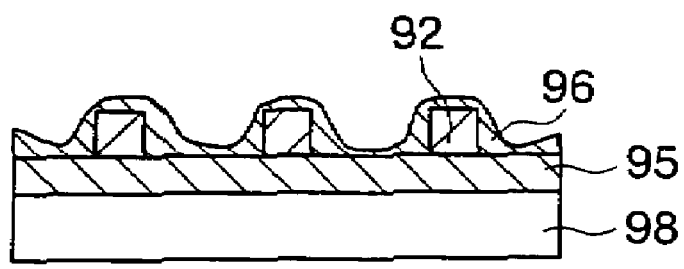

Next, a second cladding layer 96 is formed by a dip method or the like, so as to cover the core portions 92 (FIG. 55E).

Figure 55F:
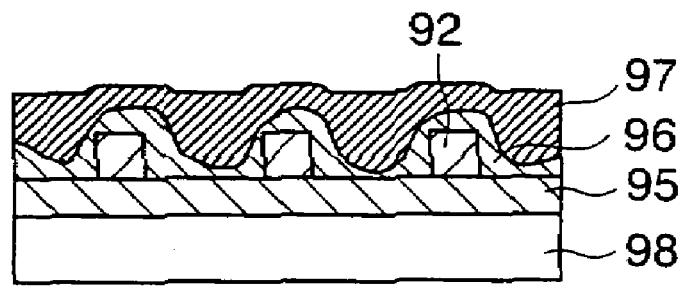
Figure 55G:
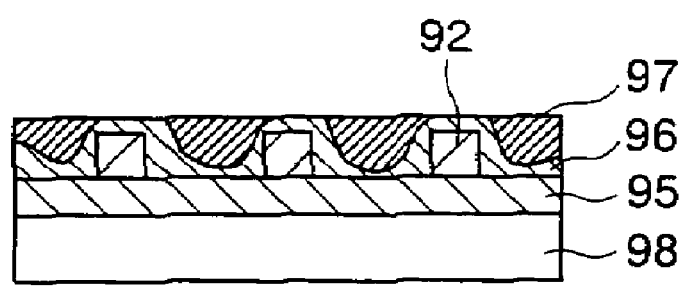

An optical absorber layer 97 is then formed on the second cladding layer 96 with a high-refractive member (FIG. 55F). Next, the optical absorber layer 97 is planarized (FIG. 55G), whereby optical transmittance distributive regions 97 are formed axisymmetrically with respect to the core portions 92.

Figure 56:
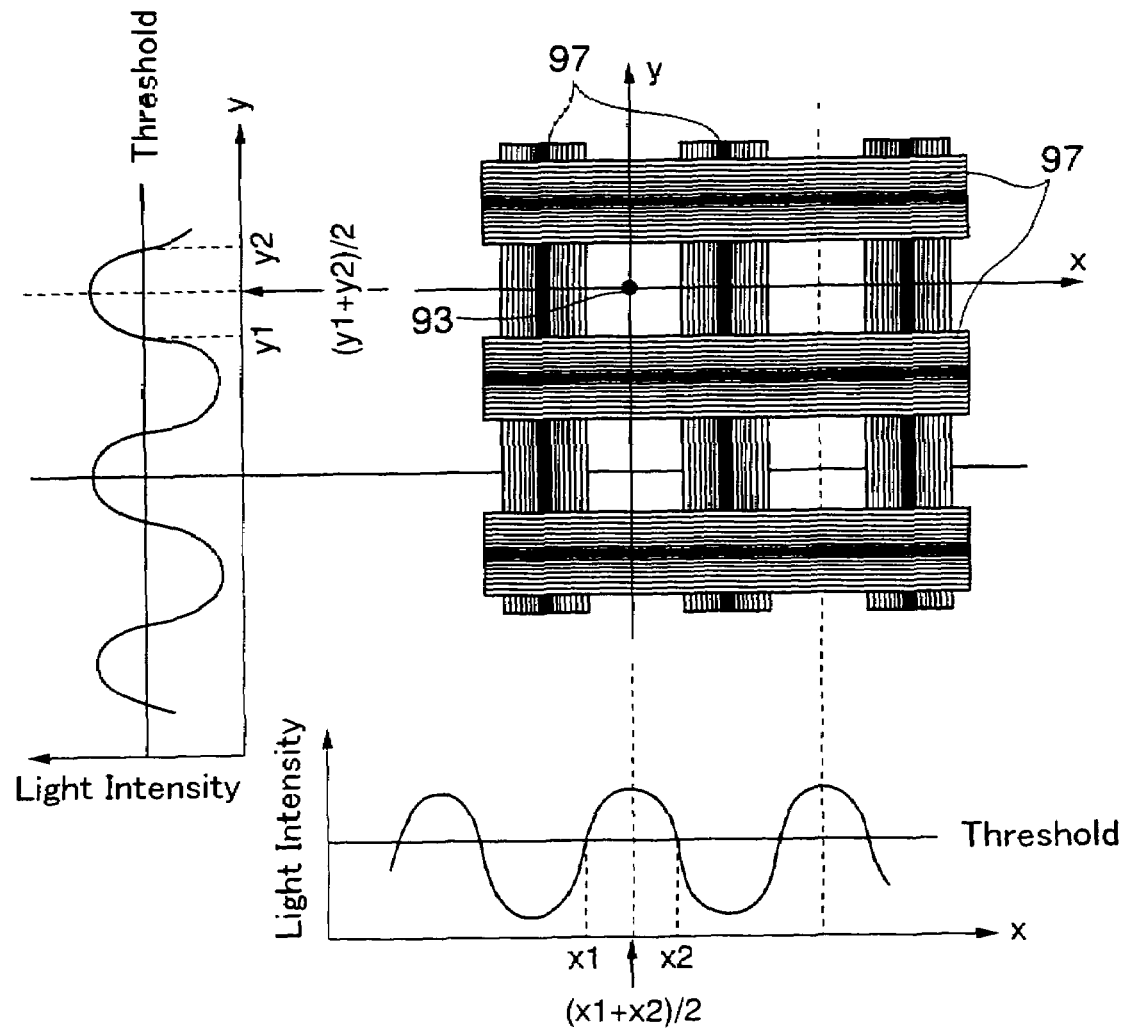
FIG. 56 is a view describing detection of central axes of the optical waveguides and intersecting portions of the both optical waveguides in the case of laminating the optical waveguide layers in the optical wiring substrate according to the seventh embodiment of the present invention.

Next, description will be made with reference to FIG. 56 regarding detection of central axes of the optical waveguides and the intersecting portions of the optical waveguides in the case where the first and the second optical waveguide layers are laminated as described with FIG. 52.

By imaging the optical wiring substrate with a CCD camera or the like with light irradiated on the back thereof, the optical transmittance distributive regions 97 formed axisymmetrically with respect to the core centers can be detected.

Moreover, central coordinates of an intersecting position of the optical waveguides can be found by image processing. As for the central coordinates, coordinates x1 and x2 on the x-axis where light intensity thereof equals to a threshold value are detected, and then the central coordinate of the optical waveguide disposed along a direction of the y-axis will be recognized by a coordinate point calculated as (x1+x2)/2.

Similarly, coordinates y1 and y2 on the y-axis where light intensity thereof equals to a threshold value are detected, and then the central coordinate of the optical waveguide disposed along a direction of the x-axis will be recognized by a coordinate point calculated as (y1+y2)/2.

An intersecting point of center lines on the x-axis and the y-axis as described above may be defined as the central coordinates, and an optical via hole may be provided in this position. Also in the case where a plurality of waveguides on different layers are intersecting with each other, a plurality of the intersecting points are serially recognized as individual coordinates, and the optical via holes are formed thereon.

In the optical via holes, a light-emitting end face and a light-receiving end face are processed into desired shapes with an excimer laser processing machine in order to convert an optical path from one layer of the laminated optical waveguide layers to the other layer.

Figure 57:
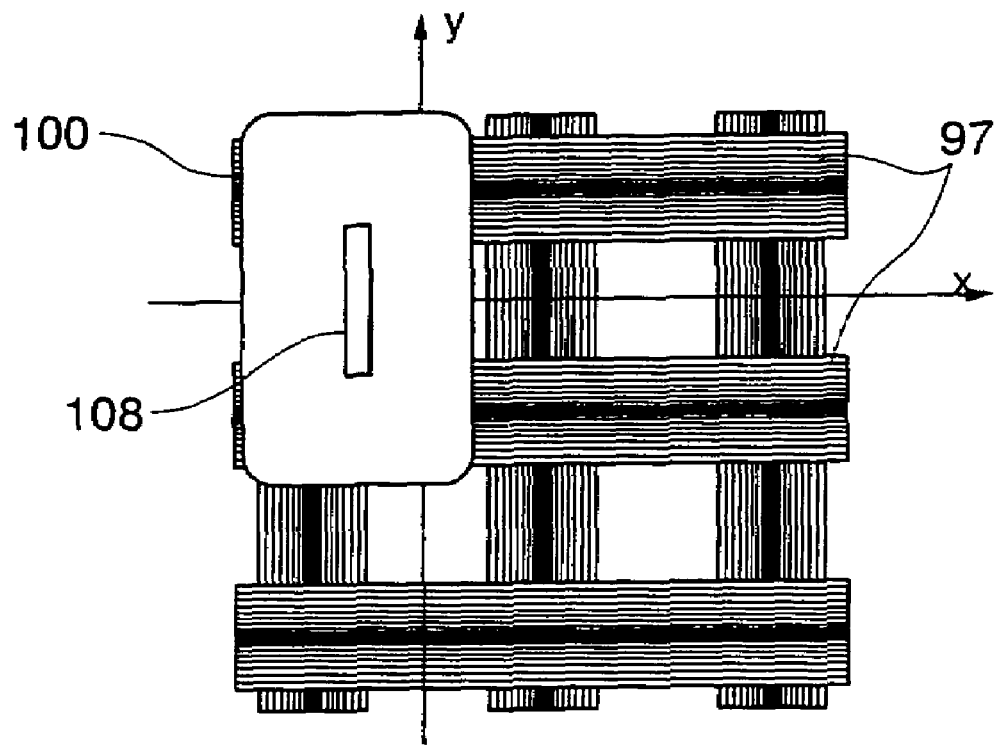
FIG. 57 is a view describing a laser process for forming optical via hole portions shown in FIG. 56.

The excimer laser processing machine is allowed to interlock with operations of a detecting system for the optical waveguide intersecting portions by image recognition as described above. An aperture 108 of a laser processing mask 100 shown in FIG. 57 is allowed to move, and the end faces of the optical waveguides present in positions for the optical via holes as described above are processed with a laser.

Figure 58:
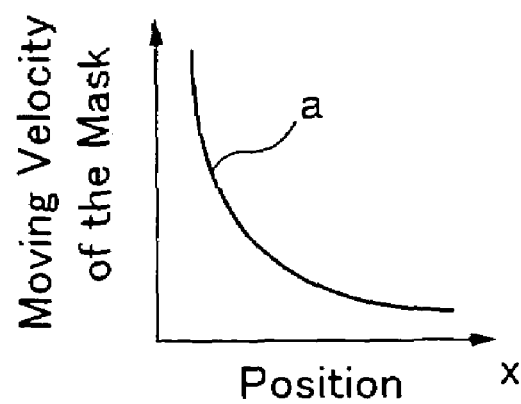
FIG. 58 is a graph of a characteristic showing a relation between a moving velocity of a mask and a process depth in the event of laser processing.

As for depths of the laser process, a shallow process is achieved by fast moving velocity of the mask 100, and a deep process is achieved by slow moving velocity thereof, as shown in a curve a of FIG. 58.

Figure 59:
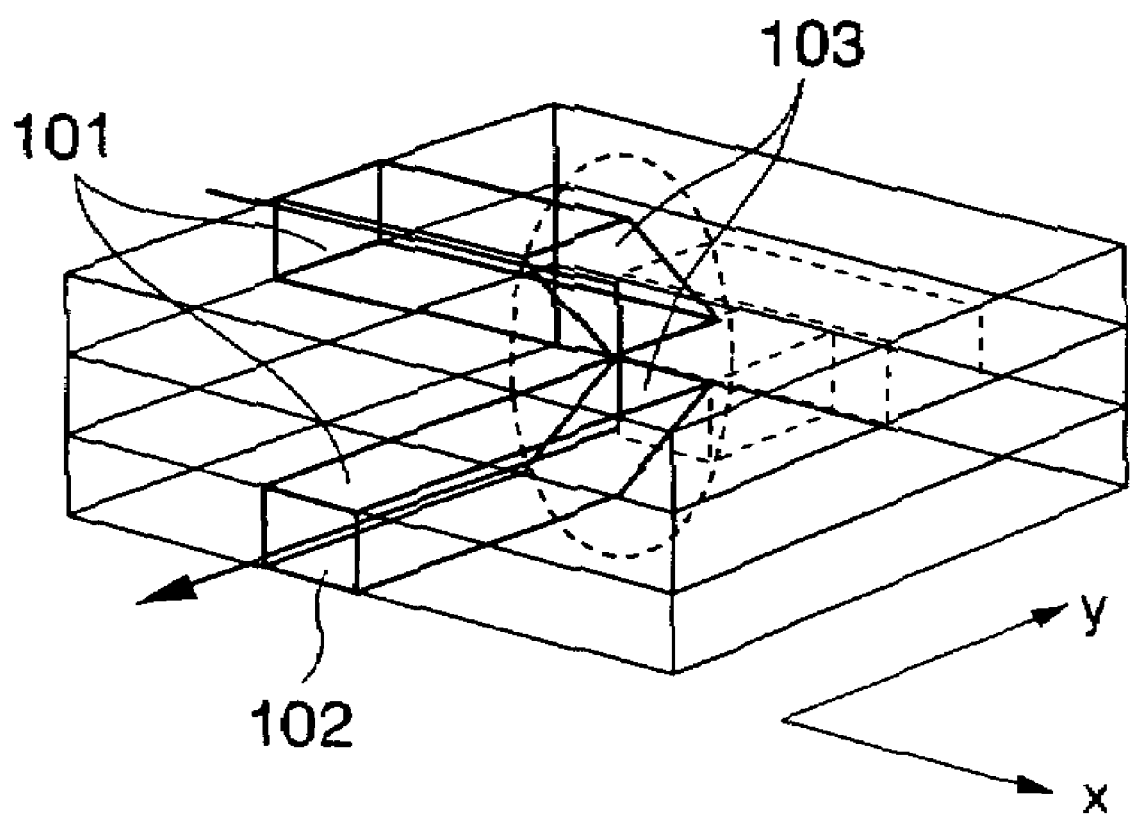
FIG. 59 is a constitutional view showing one example of an optical via hole where optical waveguides on different layers with optical paths rendered orthogonal to each other are optically connected according to the seventh embodiment of the present invention.

FIG. 59 shows an example of the seventh embodiment of the present invention, in which optical waveguides 101 and 102 on different layers are optically connected with each other by processing each end face of the optical waveguides into a shape of a mirror 103 having an inclination of 45°.

Since processing of the optical via holes interlocks with operations of the detecting system of the optical waveguide intersecting portions by image recognition, the processing can be performed while detecting the intersecting positions for processing in each case, whereby processing without misalignment becomes feasible.

Moreover, reflectivity of the light that propagate inside the optical waveguides can be enhanced by forming thin films (not illustrated) on the mirror faces being processed with metal having high reflectivity such as gold (Au) by publicly known methods such as metal sputtering and plating. The optical path is converted by 90° at the optical via hole portion.

Next, an embodiment regarding an optical connecting structure between waveguides on different layers will be described with reference to FIG. 60 to FIG. 62.

Figure 60:
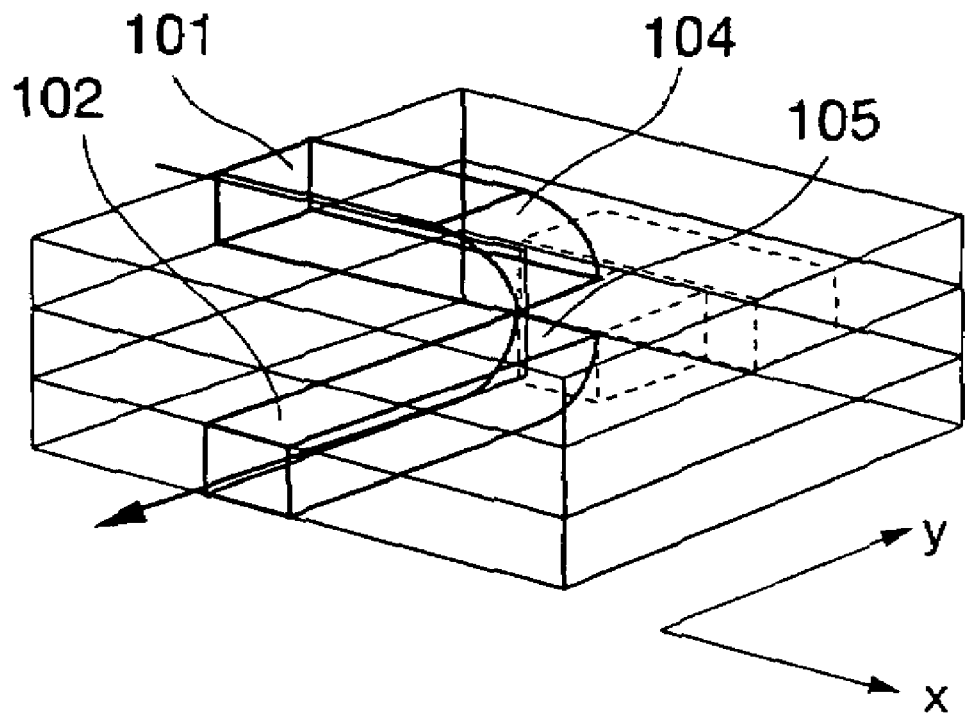
FIG. 60 is a partial perspective view showing a constitution of an optical via hole, which is an example in which end faces of the optical waveguides for optical connection are severally composed of cylindrical mirrors in the optical wiring substrate according to the seventh embodiment of the present invention.

FIG. 60 shows a structure of an optical via hole where end faces of optical waveguides 101 and 102 on different layers are severally constituted as cylindrical mirrors, while the optical waveguides are disposed such that the axes thereof are orthogonal to each other.

A method of processing a cylindrical face for forming a cylindrical mirror can be performed by adjusting moving velocity of the slit mask 100 shown in FIG. 57 during laser processing.

Figure 61:
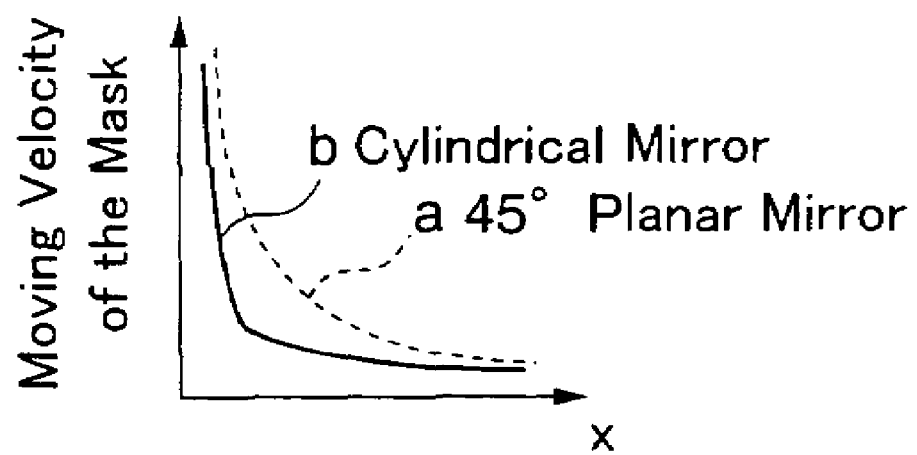
FIG. 61 is a graph of characteristics comparatively showing that a relation between a moving velocity of a mask and a process depth in the event of laser processing in the case of 45-degree planar mirrors shown in FIG. 59 is different from such a relation in the case of the cylindrical mirrors.
Figure 62:
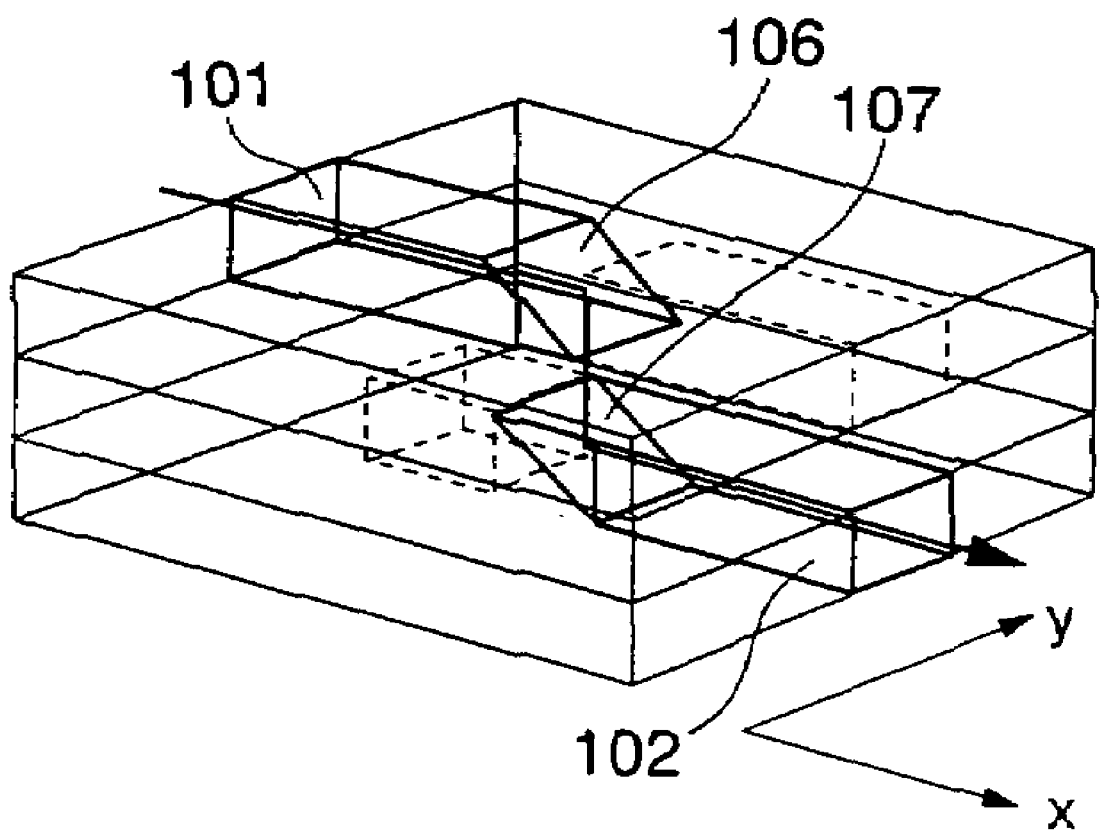
FIG. 62 is a partial perspective view showing a constitution of an optical via hole where optical waveguides on different layers with optical paths rendered straight are optically connected with each other in the optical wiring substrate according to the seventh embodiment of the present invention.

As shown in FIG. 61, in a motion curve b of a mask upon production of a cylindrical mirror, initial velocity is made faster, and finishing velocity is made slower in comparison with the motion curve a of the mask upon production of a 45-degree planar mirror. The cylindrical face is thereby obtained.

In the case of a multimode waveguide, light loss due to dispersion tends to occur in the event of passing through an optical via hole, because a traveling direction of propagating light is not constant. As described above, by forming the pair of 45-degree mirrors into cylindrical faces with the axes thereof orthogonal to each other, such an optical connecting structure is implemented with light focal power, whereby coupling efficiency thereof can be enhanced.

Even in a case where axes of optical waveguides on different layers are disposed as twisted and approximately orthogonal to each other, cylindrical faces can be formed such that the axes thereof are orthogonal to each other, by applying similar laser processing on each end face thereof.

Next, with reference to FIG. 62, description will be made on an example in which the optical waveguides 101 and 102 are disposed parallel such that they are rectilinear on different layers.

45-degree mirrors 106 and 107 are formed on respective end faces of the optical waveguides 101 and 102 for optical coupling. If the optical transmittance distributive regions are formed axisymmetrically with respect to the axes of the optical waveguide layers 101 and 102, then the centers of the both optical waveguides are recognizable, whereby an arbitrary position on the center of the axes may be decided as an optical via hole portion.

What is claimed is:

1. An optical wiring substrate comprising:
a multilayer substrate;
a plurality of N input optical wiring structures on an input side of said multilayer substrate, each of said input wiring structures having N input terminals formed on one face of said multilayer substrate; and
a corresponding plurality of N output optical wiring structures on an output side of said multilayer substrate, each of said output optical wiring structures having N output terminals formed on another face of said substrate such that said output terminals are orthogonalized with said input terminals on said substrate, each input terminal of each of said plurality of input optical wiring structures being connected with an output terminal of one of said plurality of output optical wiring structures across different layers of said multilayer substrate at an interlayer transfer portion, wherein the input terminals of each input optical wiring structure are respectively connected to output terminals of different output optical wiring structures.

2. The optical wiring substrate according to claim 1, wherein all of said input terminals are provided on a first side of said substrate, and
all of said output terminals are provided on a second side adjacent to the first side of said substrate.

3. The optical wiring substrate according to claim 1, wherein said input terminals are provided on two opposite sides of said substrate, and
said output terminals are provided on two opposite sides different from said two opposite sides of said substrate.

4. The optical wiring substrate according to claim 1, wherein each of said input and output optical wiring structures comprises at least one optical waveguide layer, and
further comprising a pair of slant mirrors opposing to each other for orthogonally converting an optical path, one of the mirrors in said pair being positioned on an optical waveguide of said input side and the other one of the mirrors in said pair being positioned on a corresponding optical waveguide of said output side in said interlayer transfer portion between the input and output waveguide layers.

5. The optical wiring substrate according to claim 1, wherein said multilayer substrate comprises four optical waveguide layers comprising a plurality of optical core structures, and
wherein the optical core structures in adjacent layers are in a staggered arrangement.

6. The optical wiring substrate according to claim 1, wherein optical fibers are connected to at least one of said input terminals and one of said output terminals, for supplementing different lengths of optical paths on said substrate such that total lengths 6f said optical paths become uniform.

* * * * *

UNITED STATES PATENT AND TRADEMARK OFFICE
CERTIFICATE OF CORRECTION

PATENT NO. : 7,068,871 B2 Page 1 of 1
APPLICATION NO. : 10/949906
DATED : June 27, 2006
INVENTOR(S) : Sugama et al.

It is certified that error appears in the above-identified patent and that said Letters Patent is hereby corrected as shown below:

At column 28, line 62, "6f" should be -- of --.

Signed and Sealed this

Eighth Day of August, 2006

JON W. DUDAS
*Director of the United States Patent and Trademark Office*